United States Patent [19]
Numazaki

[11] Patent Number: 5,900,863
[45] Date of Patent: May 4, 1999

[54] METHOD AND APPARATUS FOR CONTROLLING COMPUTER WITHOUT TOUCHING INPUT DEVICE

[75] Inventor: Shunichi Numazaki, Yokohama, Japan

[73] Assignee: Kabushiki Kaisha Toshiba, Kawasaki, Japan

[21] Appl. No.: 08/614,502

[22] Filed: Mar. 13, 1996

[30] Foreign Application Priority Data

Mar. 16, 1995 [JP] Japan ..................................... 7-083460
Sep. 28, 1995 [JP] Japan ..................................... 7-250418

[51] Int. Cl.⁶ ...................................................... G09G 5/08
[52] U.S. Cl. .......................... 345/158; 345/156; 345/157; 345/159; 345/175
[58] Field of Search ..................................... 345/158, 157, 345/156, 159, 160, 12, 7, 175; 348/140, 141

[56] References Cited

U.S. PATENT DOCUMENTS

| | | | |
|---|---|---|---|
| 4,782,328 | 11/1988 | Denlinger | 345/175 |
| 4,988,981 | 1/1991 | Zimmerman et al. | 345/156 |
| 5,168,531 | 12/1992 | Sigel | 345/157 |
| 5,367,315 | 11/1994 | Pan | 345/158 |
| 5,459,488 | 10/1995 | Geiser | 345/156 |
| 5,686,940 | 11/1997 | Kuga | 345/159 |
| 5,686,942 | 11/1997 | Ball | 345/158 |

FOREIGN PATENT DOCUMENTS 7-057103 3/1995 Japan .

OTHER PUBLICATIONS

30th General Conference (Zenkoku Taikai) of Information Processing, Society of Japan, pp. 1249–1250 (1985 Spring).

Primary Examiner—Jeffery A. Hofsass
Assistant Examiner—John Tweel, Jr.
Attorney, Agent, or Firm—Oblon, Spivak, McClelland, Maier & Neustadt, P.C.

[57] ABSTRACT

A distance image representing a distribution of distances, each measured between the apparatus and each conceivable point existing on an object is input. The minimum points in the distance image are detected. The minimum points are some of the conceivable points on the object which have smaller distance values than the other conceivable points. The time differences, each representing a change which each point in the distance image assumes as time passes, are detected. A designating point for designating a command to the system is determined. The designating point is one of the minimum points which has changed in the time difference detected. A system is controlled in accordance with motion of the designating point determined.

33 Claims, 46 Drawing Sheets

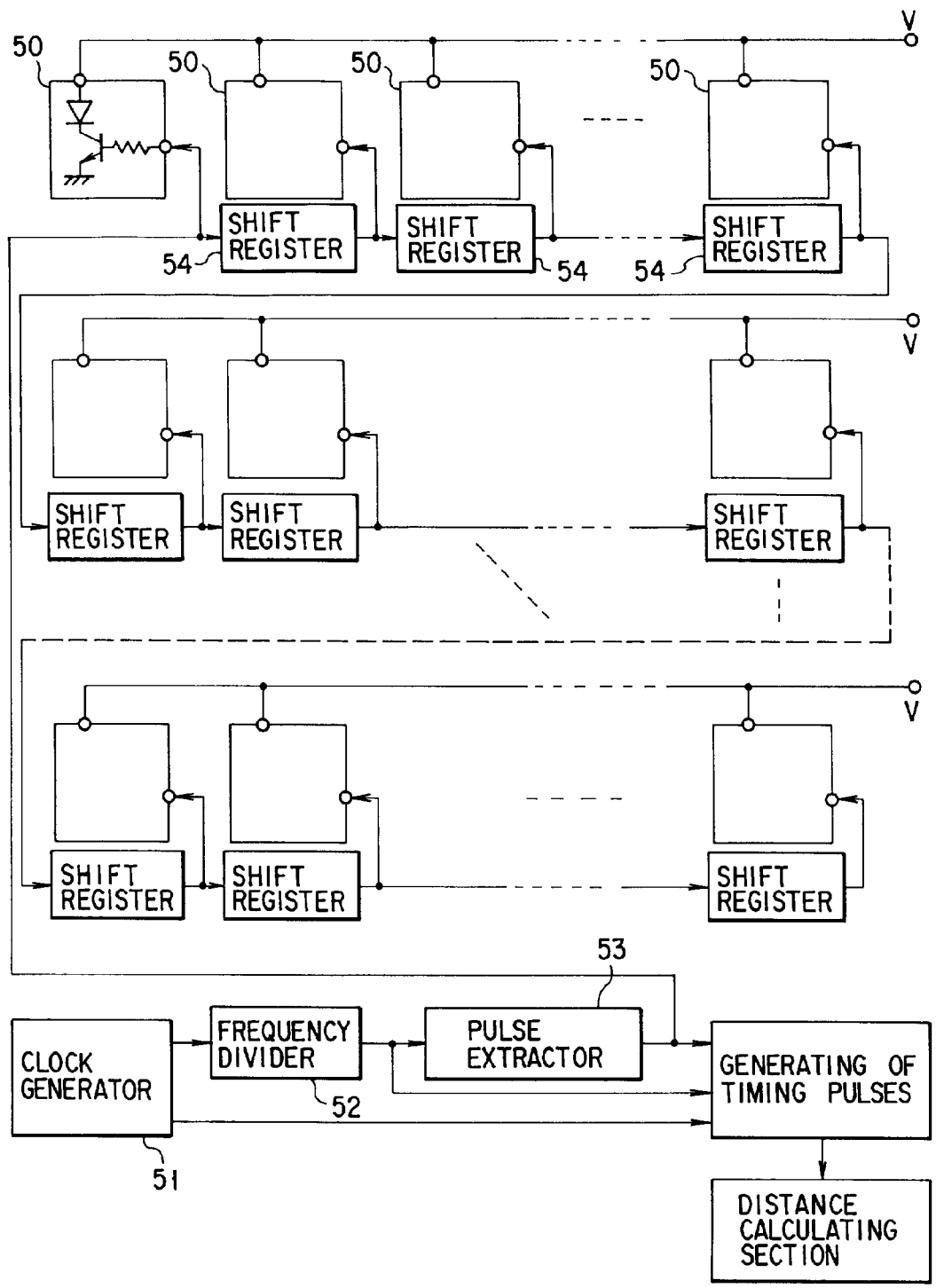
F I G. 7

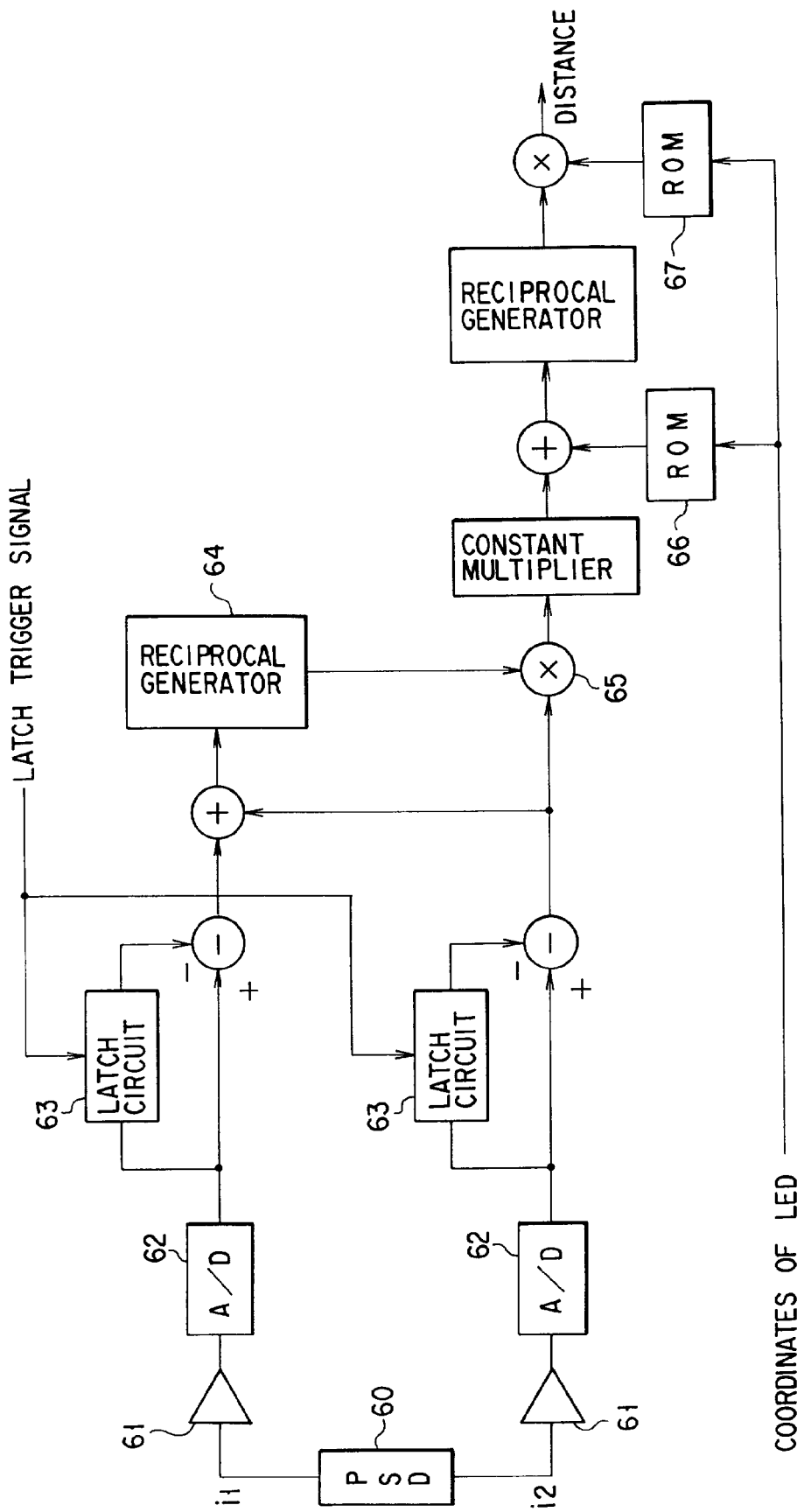
F I G. 8

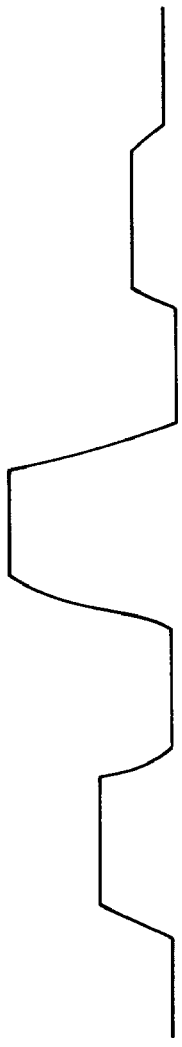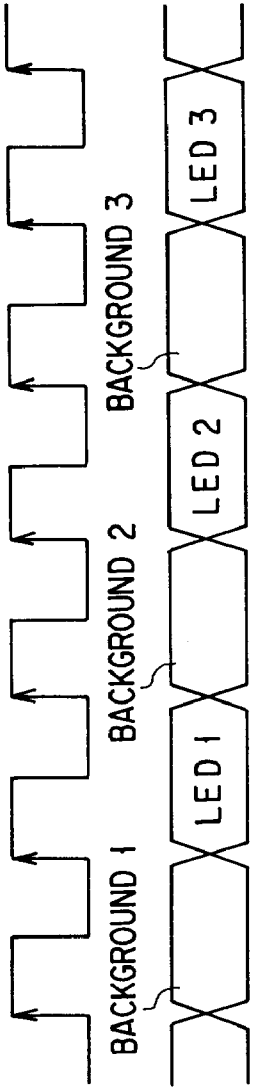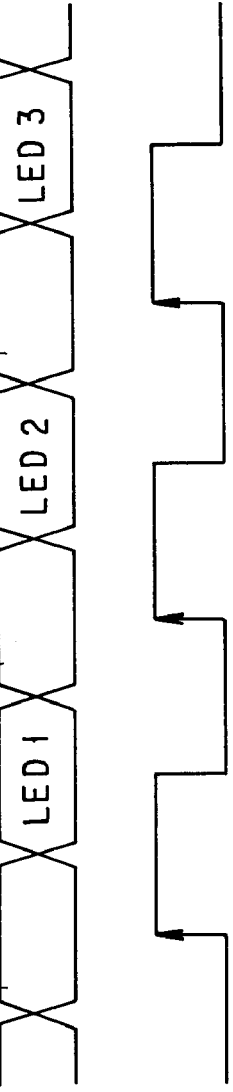
FIG. 9A  70 OUTPUT OF PSD
FIG. 9B  71 A/D TRIGGER SIGNAL
FIG. 9C  72 OUTPUT OF A/D
FIG. 9D  73 LATCH TRIGGER SIGNAL
FIG. 9E  74 OUTPUT OF LATCH
FIG. 9F  75 OUTPUT EXCLUDING BACKGROUND VALUE

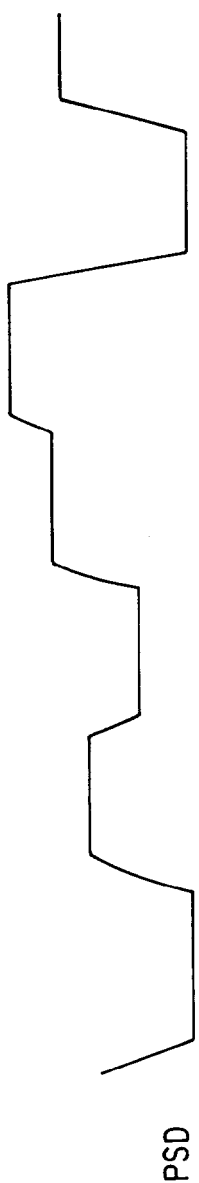
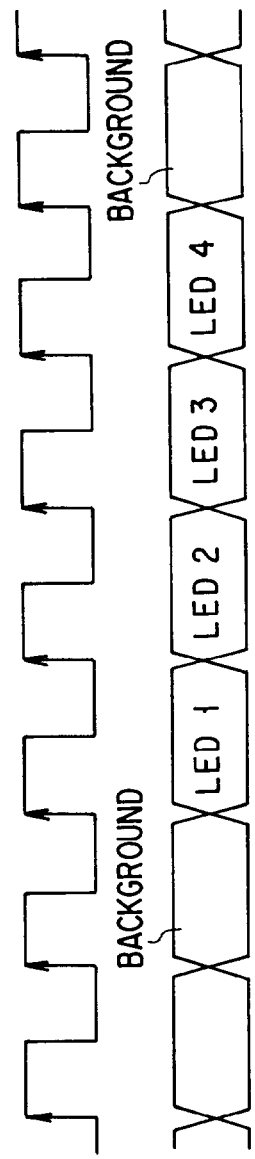
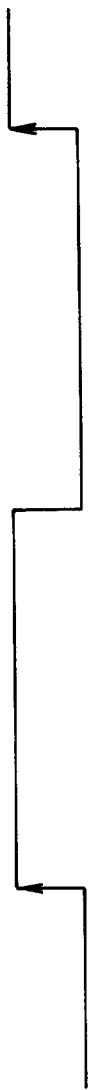
FIG. 10A  80 OUTPUT OF PSD
FIG. 10B  81 A/D TRIGGER SIGNAL
FIG. 10C  82 OUTPUT OF A/D
FIG. 10D  83 LATCH TRIGGER SIGNAL
FIG. 10E  84 OUTPUT OF LATCH
FIG. 10F  85 OUTPUT EXCLUDING BACKGROUND VALUE

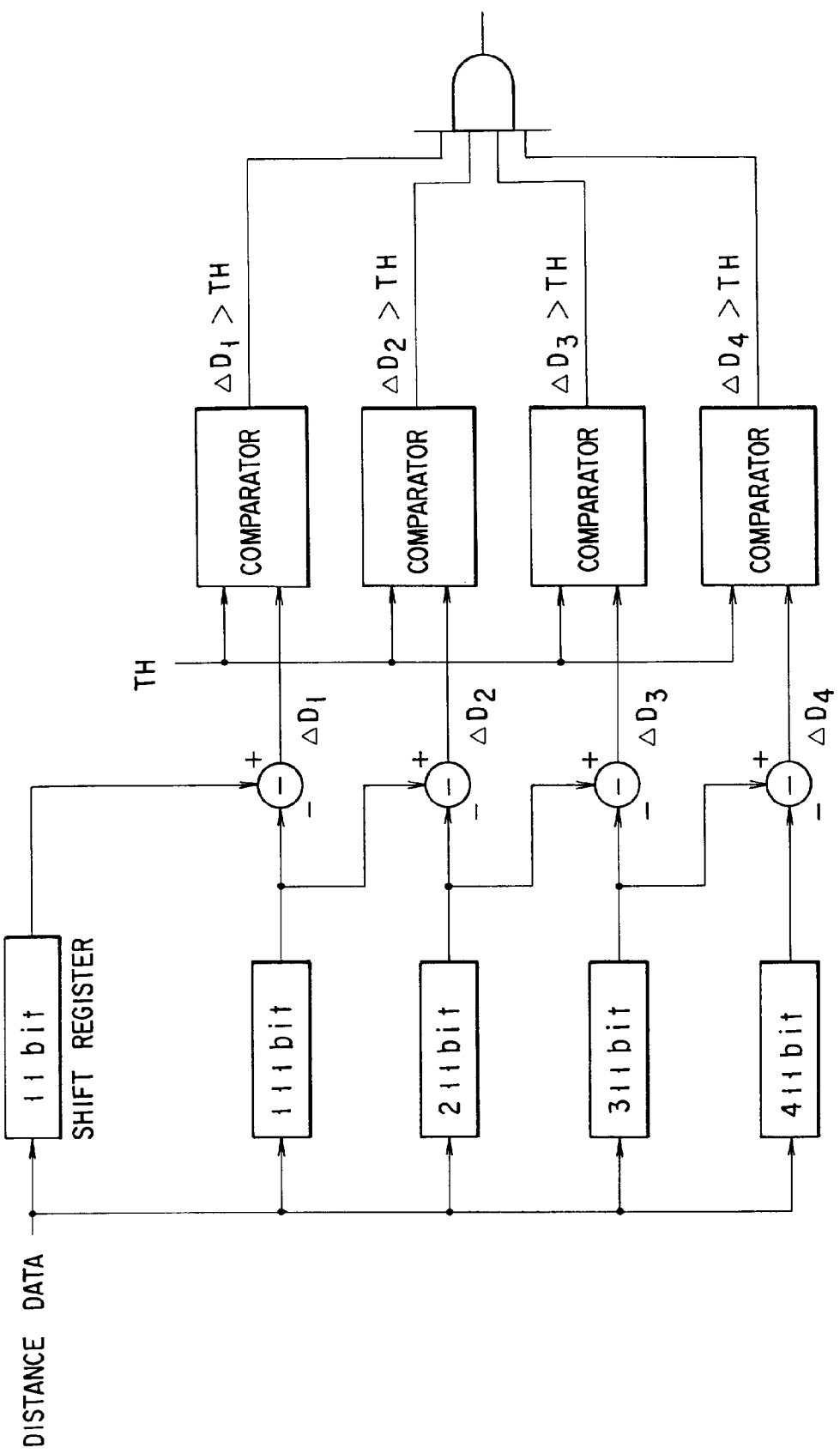
F I G. 12

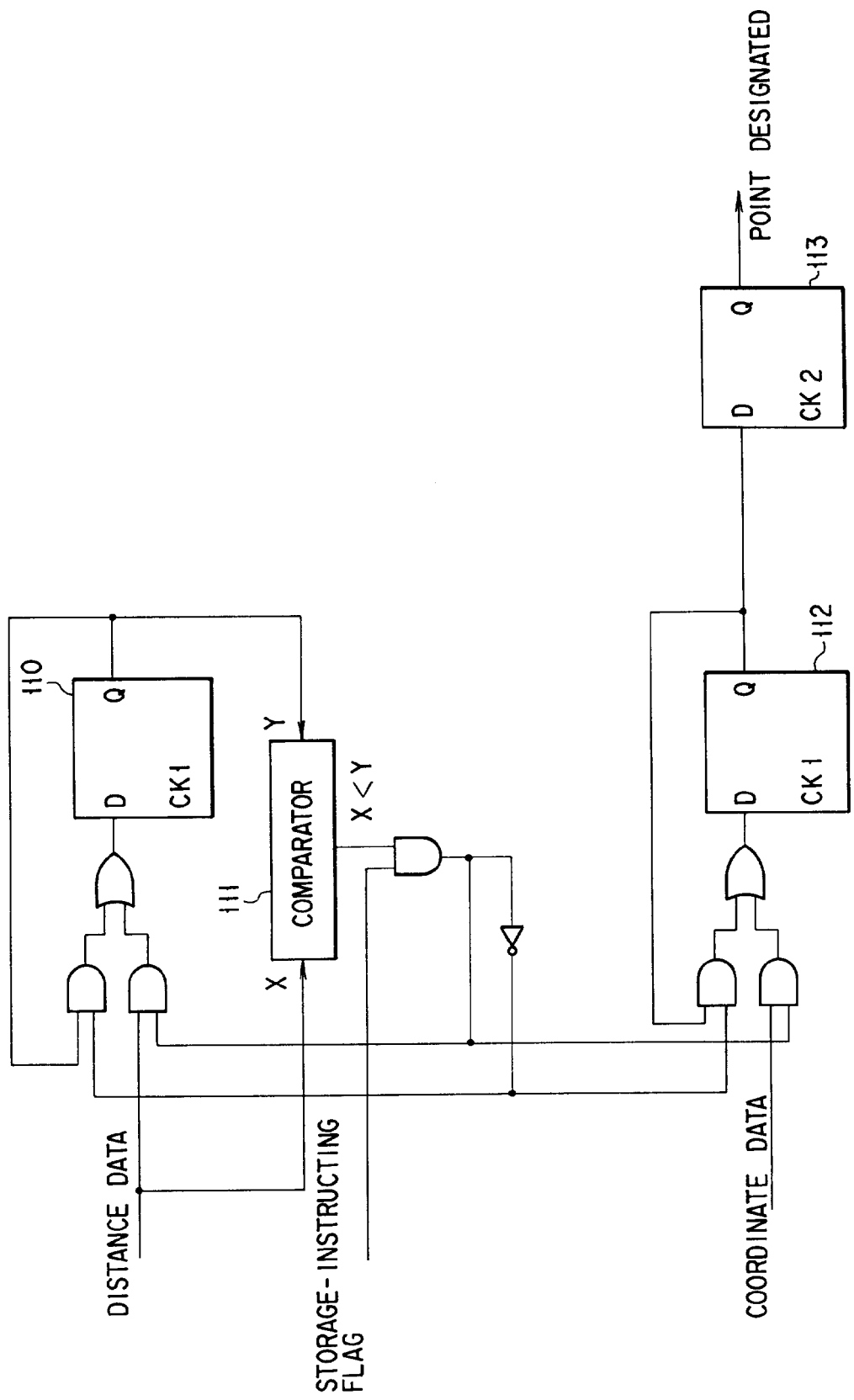
F I G. 13

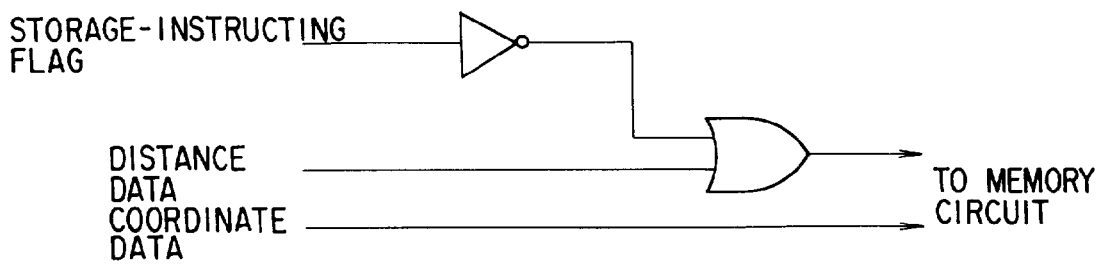
FIG. 16
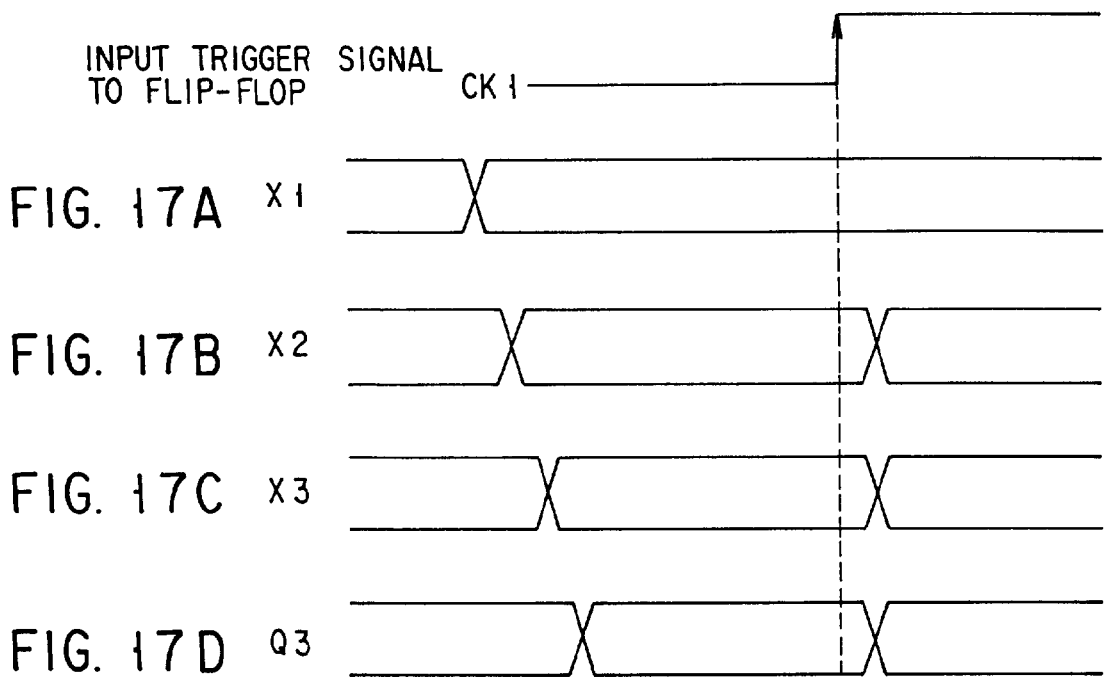
FIG. 17A X1
FIG. 17B X2
FIG. 17C X3
FIG. 17D Q3

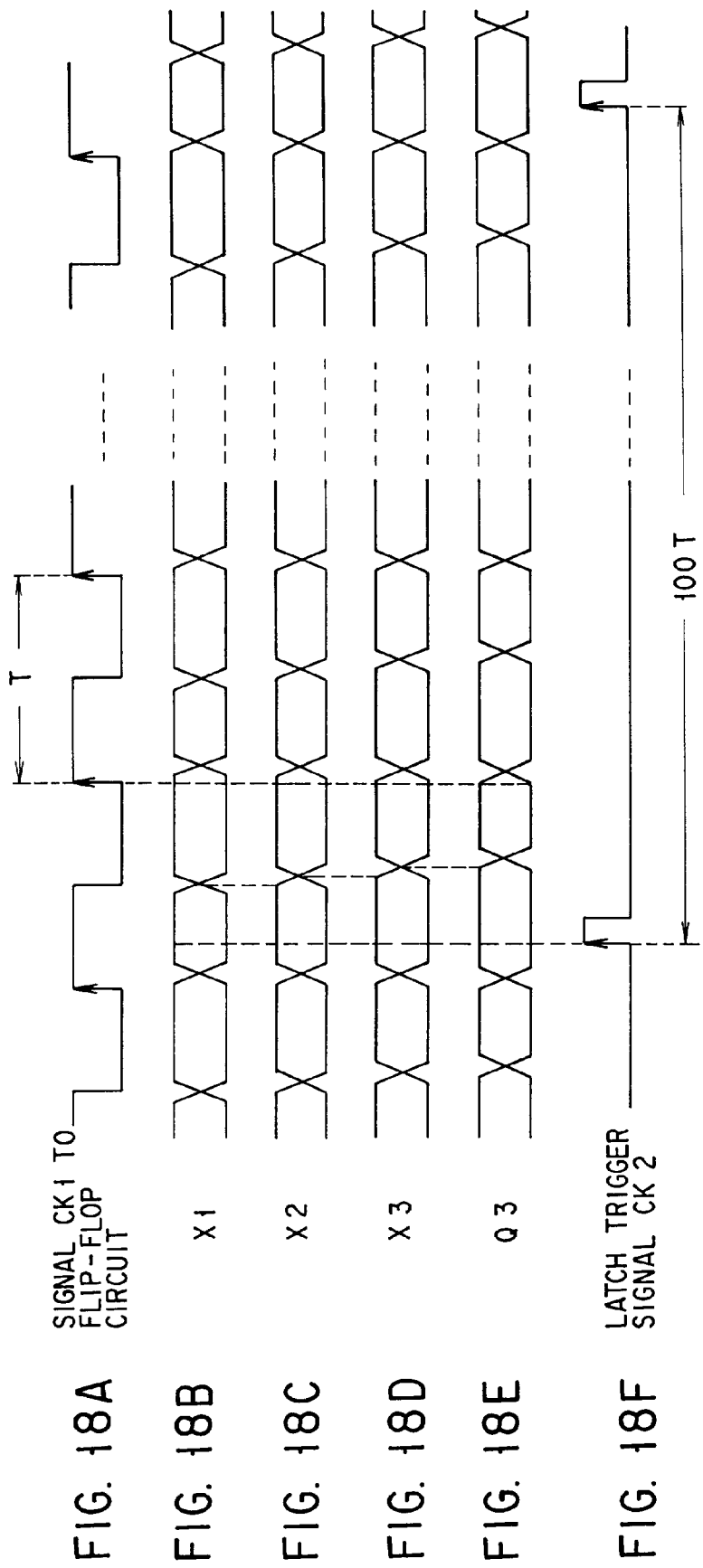

FIG. 25A CURRENT FOR DRIVING LED
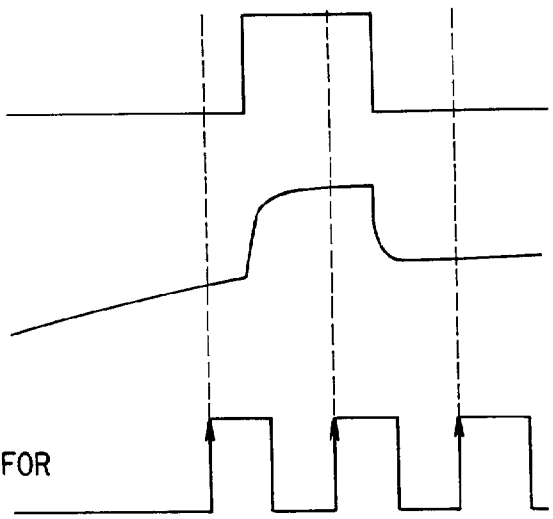
FIG. 25B CURRENT OUTPUT FROM PSD
FIG. 25C TRIGGER SIGNAL FOR A/D CONVERSION
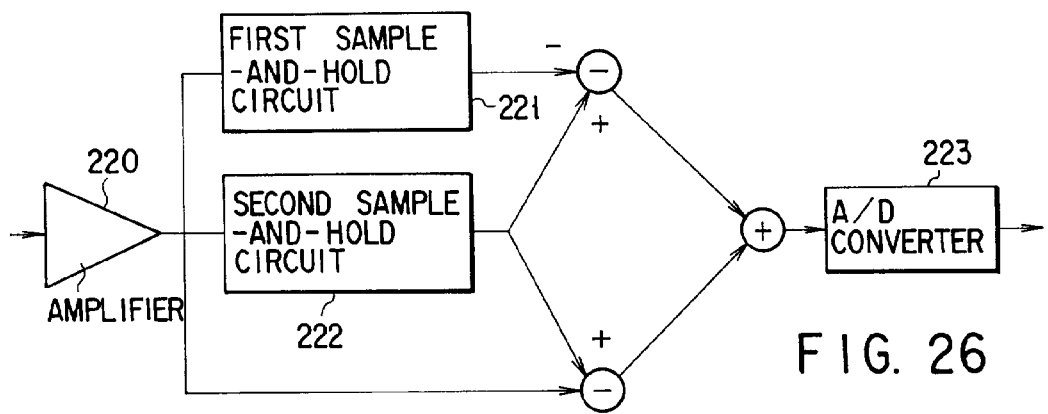
FIG. 26
FIG. 27A CURRENT FOR DRIVING LED
FIG. 27B CURRENT OUTPUT FROM PSD
FIG. 27C SIGNAL FOR TRIGGERING FIRST SAMPLE-AND-HOLD CIRCUIT
FIG. 27D SIGNAL FOR TRIGGERING SECOND SAMPLE-AND-HOLD CIRCUIT
FIG. 27E TRIGGER SIGNAL FOR A/D CONVERSION

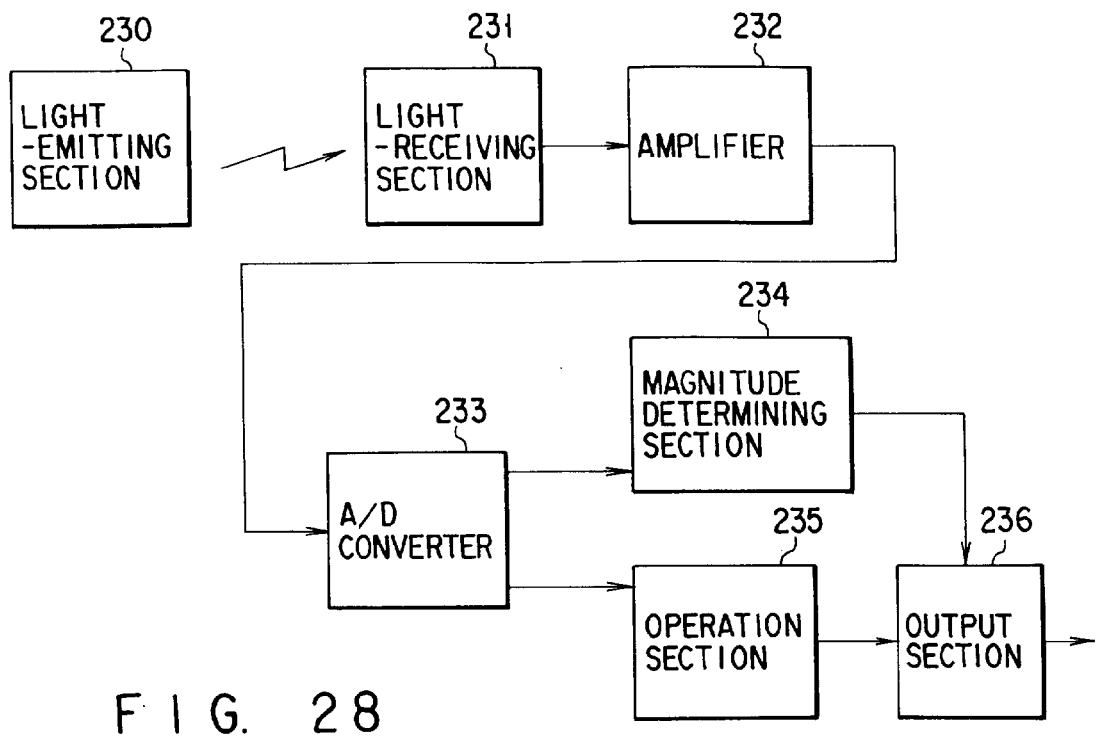
F I G. 28
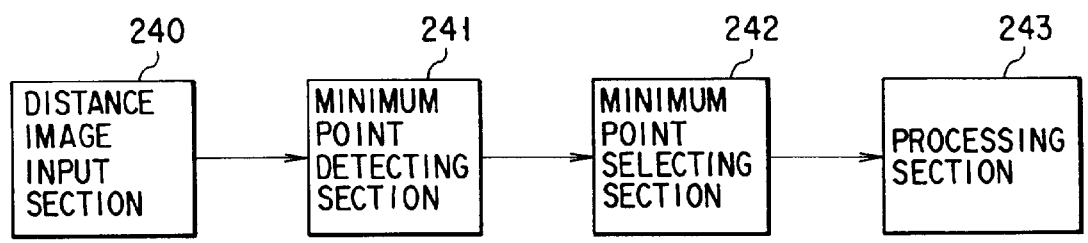
F I G. 29
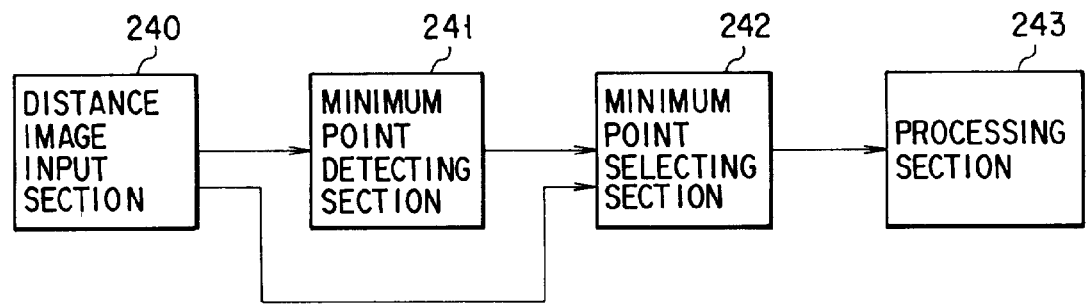
F I G. 30

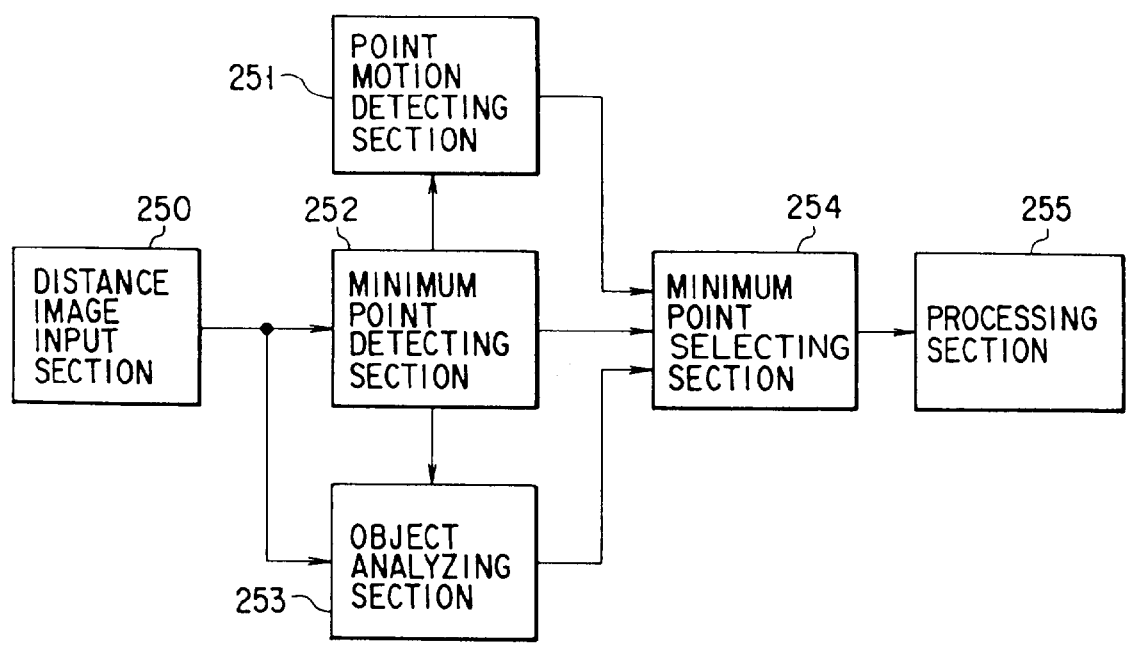
F I G. 31

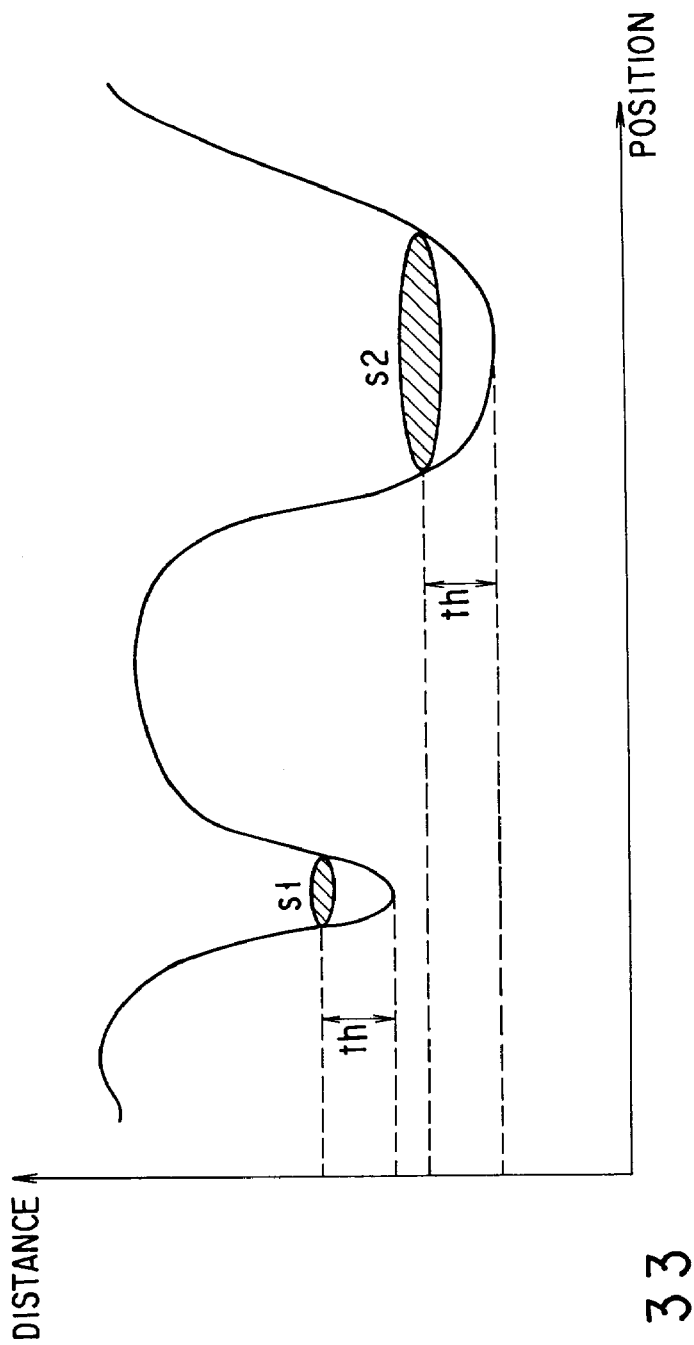
F I G. 33
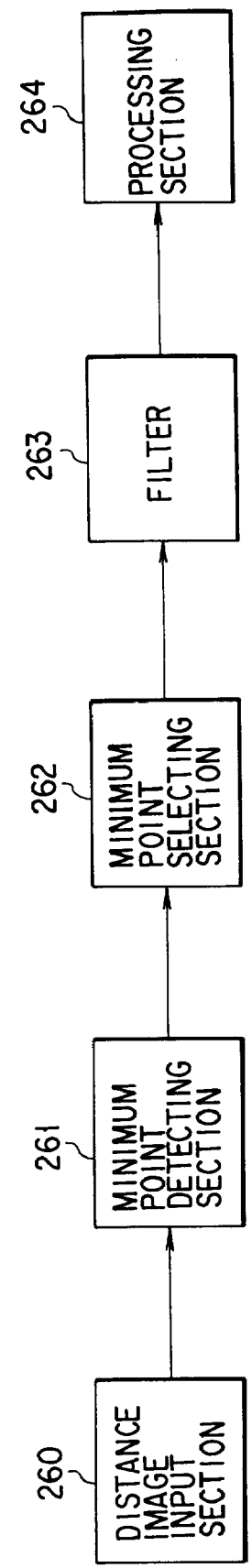
F I G. 34

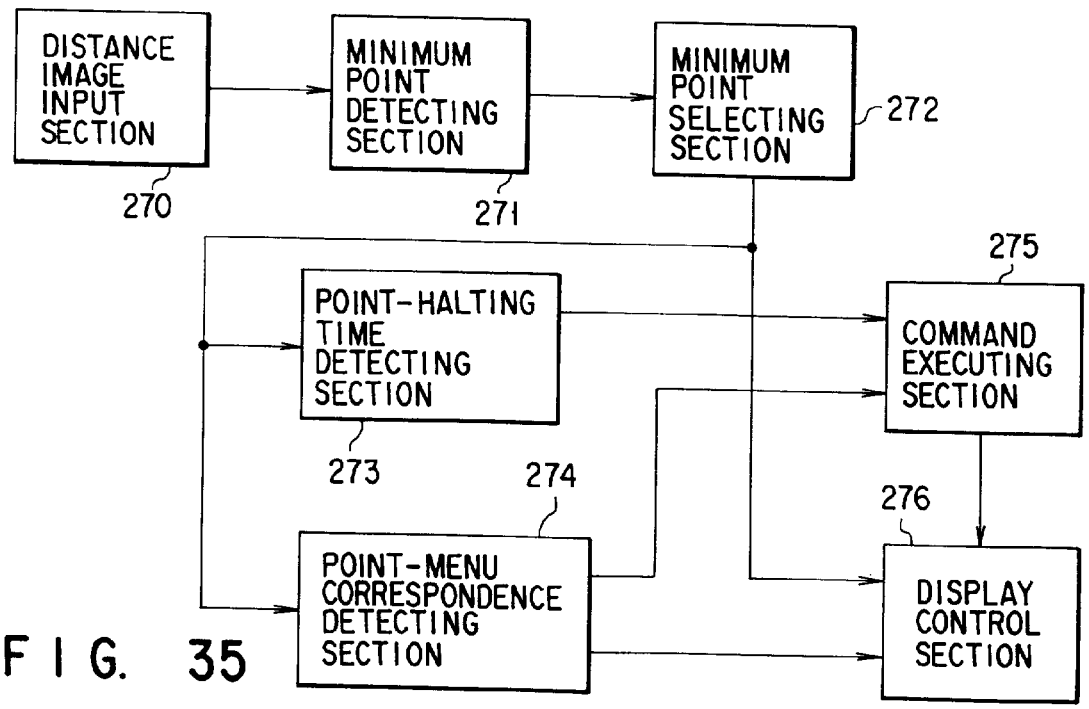
F I G. 35
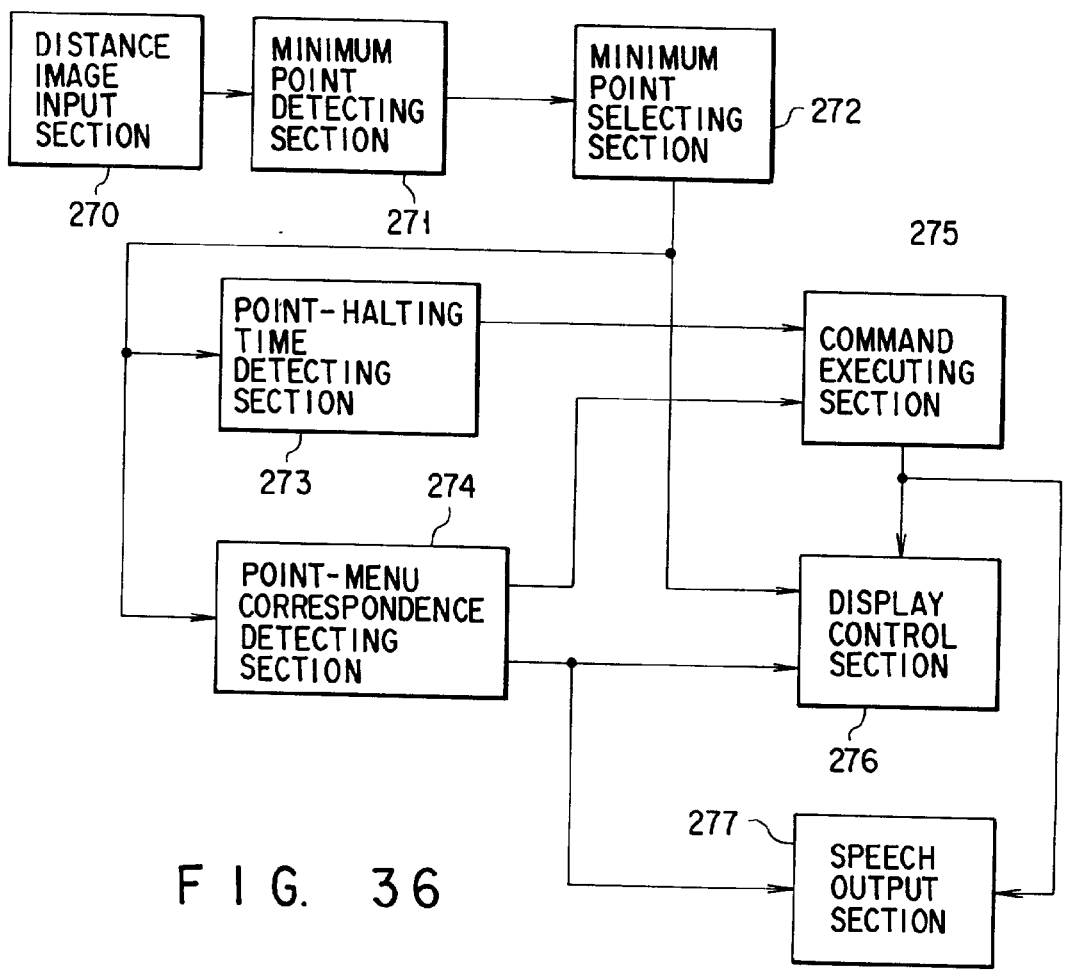
F I G. 36

F I G. 43
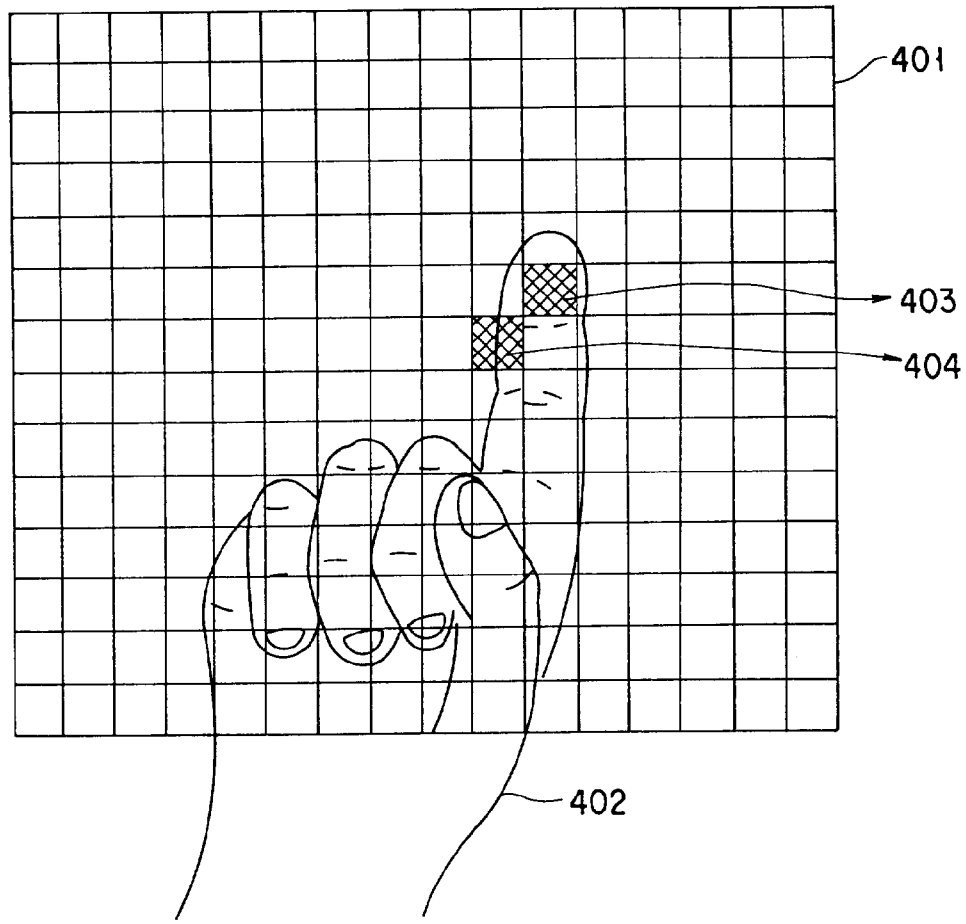
F I G. 45

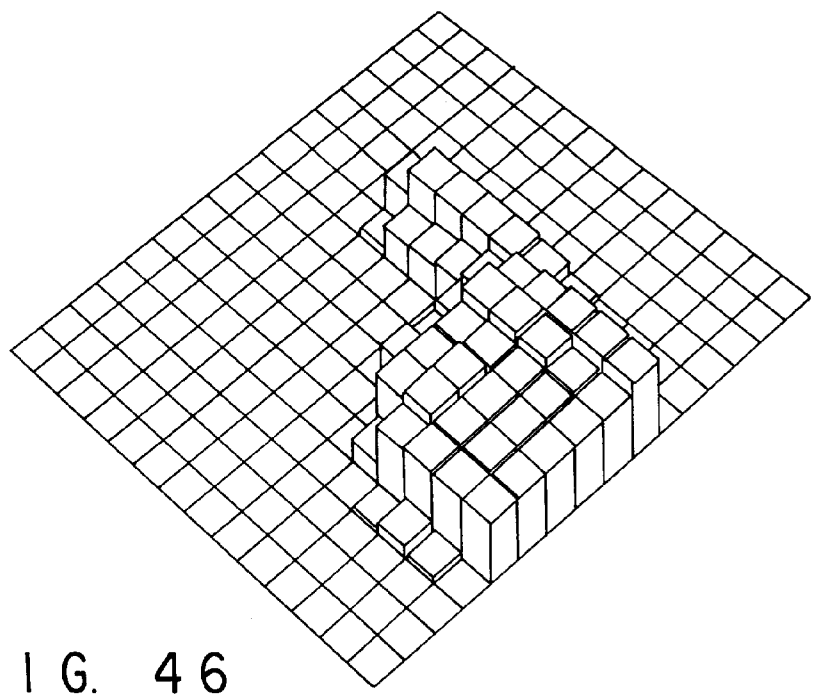
F I G. 46
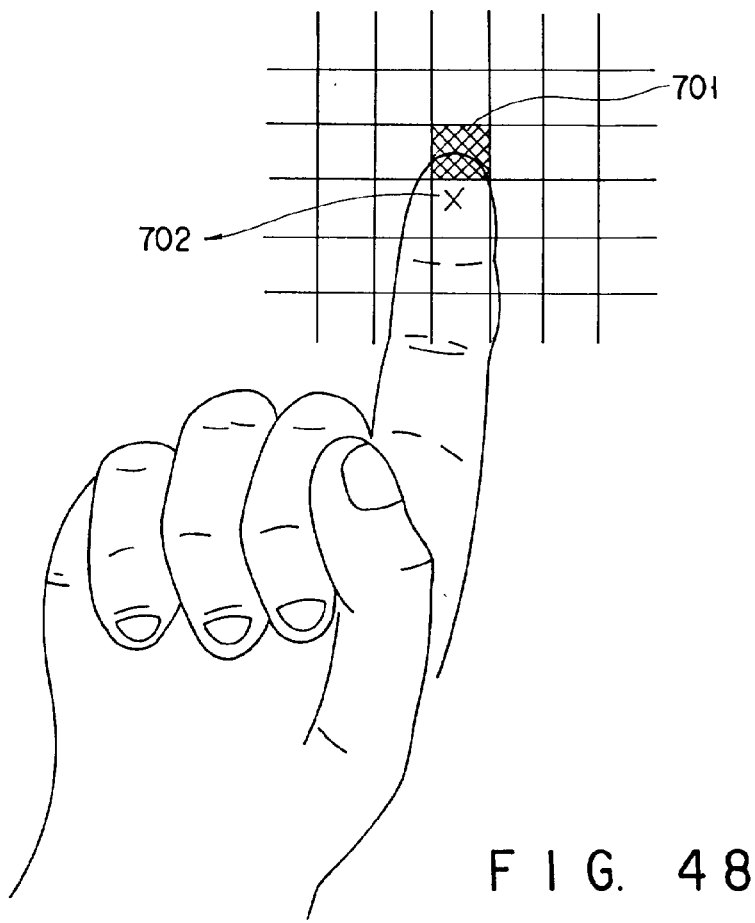
F I G. 48

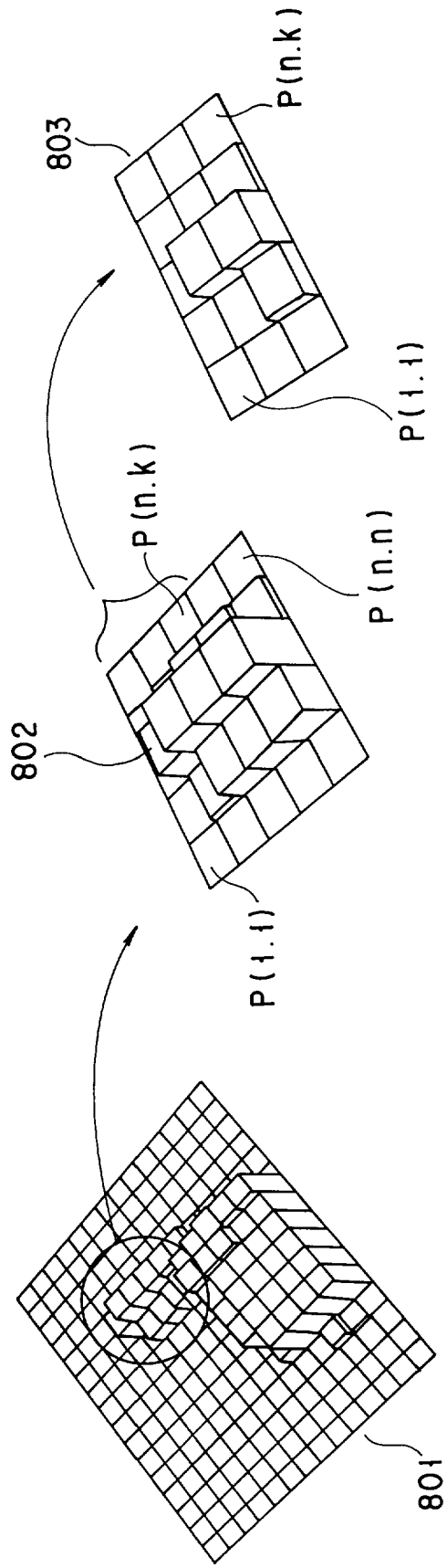
F I G. 49

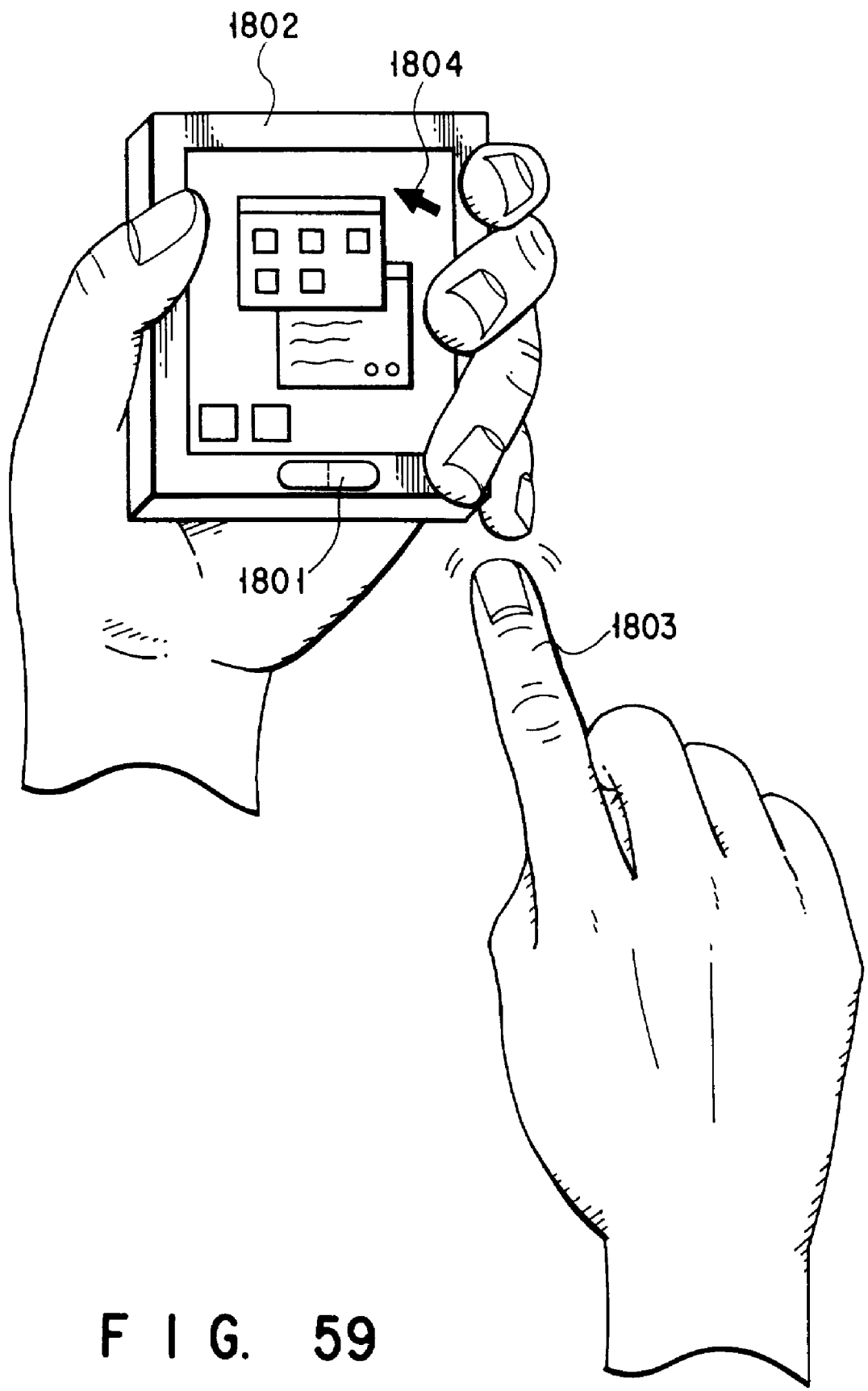
F I G. 59

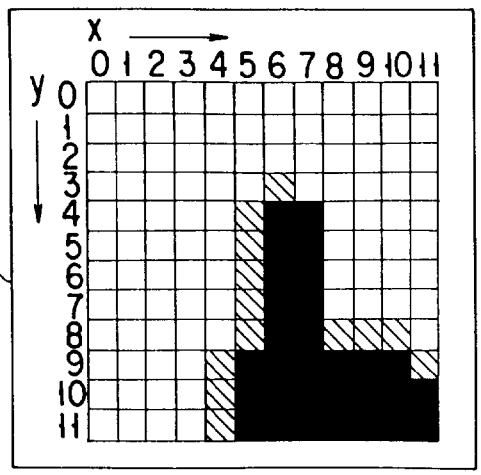
F I G. 61A
2102 — 
infoStick [n] .ystart
infoStick [n] .xstart [i]
infoStick [n] .xend [i]
infoStick [n] . length
infoStick [n] . status
    STICK :
    NOSTICK :
    EXTENDED :
F I G. 61B
2103 — AFTER LARGE-VALUE PIXELS FOUND IN LINE
(y=3) HAVE BEEN REGISTERED AS A NEW
CANDIDATE FOR A RODSHAPED OBJECT
    infoStick [0]. ystart   = 3
    infoStick [0]. xstart[0] = 8
    infoStick [0]. xend [0] = 8
    infoStick [0]. length   = 1
    infoStick [0]. status   = EXTENDED
F I G. 61C AFTER SCANNING HAS PROCEEDED TO LINE
(y = 4)
    infoStick [0].ystart = 3
    infoStick [0].xstart[0] = 8
    infoStick [0].xstart[1] = 5
    infoStick [0].xend [0] = 8
    infoStick [0].xend [1] = 7
    infoStick [0].length = 2
    infoStick [0].status = EXTENDED

FIG. 61D

AFTER CONNECTING LARGE-VALUE PIXELS
AT THE MIDDLE PART OF LINE (y = 5) TO
A CANDIDATE FOR A RODSHAPED OBJECT
    infoStick[0].ystart = 3
    infoStick[0].xstart[0] = 8
    infoStick[0].xstart[1] = 5
    infoStick[0].xstart[2] = 5
    infoStick[0].xend [0] = 8
    infoStick[0].xend [1] = 7
    infoStick[0].xend [2] = 7
    infoStick[0].length = 3
    infoStick[0].status = EXTENDED

FIG. 61E

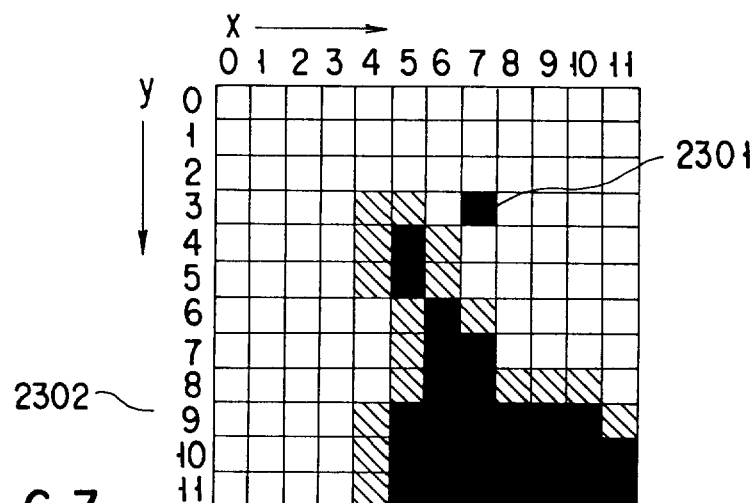

FIG. 63

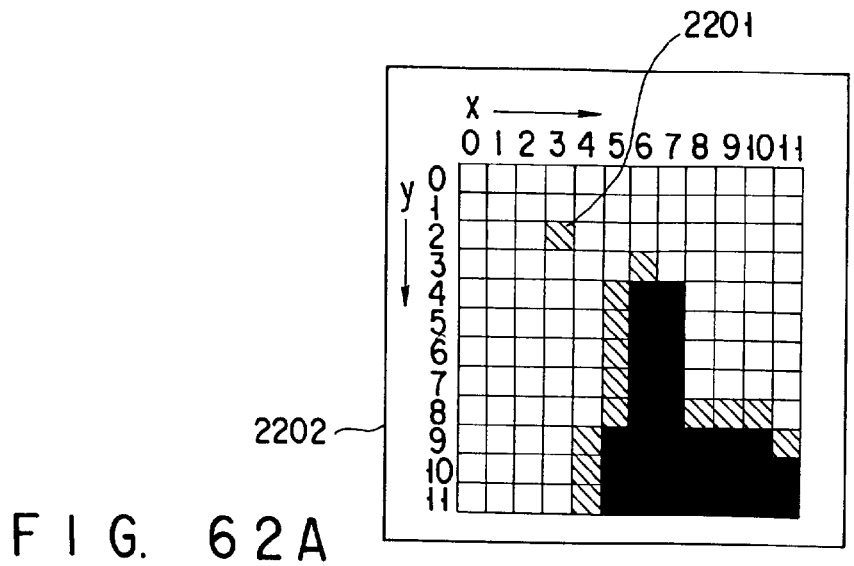

FIG. 62A

AFTER LINE (y=2) HAS BEEN SCANNED

2203 —
infoStick[0].ystart = 2
infoStick[0].xstart[0] = 3
infoStick[0].xend [0] = 3
infoStick[0].length = 1
infoStick[0].status = EXTENDED

FIG. 62B

AFTER LINE (y=3) HAS BEEN SCANNED

2204 —
infoStick[0].ystart = 2
infoStick[0].xstart[0] = 3
infoStick[0].xend [0] = 3
infoStick[0].length = 1
infoStick[0].status = NOSTICK

FIG. 62C

2205 —
infoStick[1].ystart = 3
infoStick[1].xstart[0] = 6
infoStick[1].xend[0] = 6
infoStick[1].length = 1
infoStick[1].status = EXTENDED

FIG. 62D

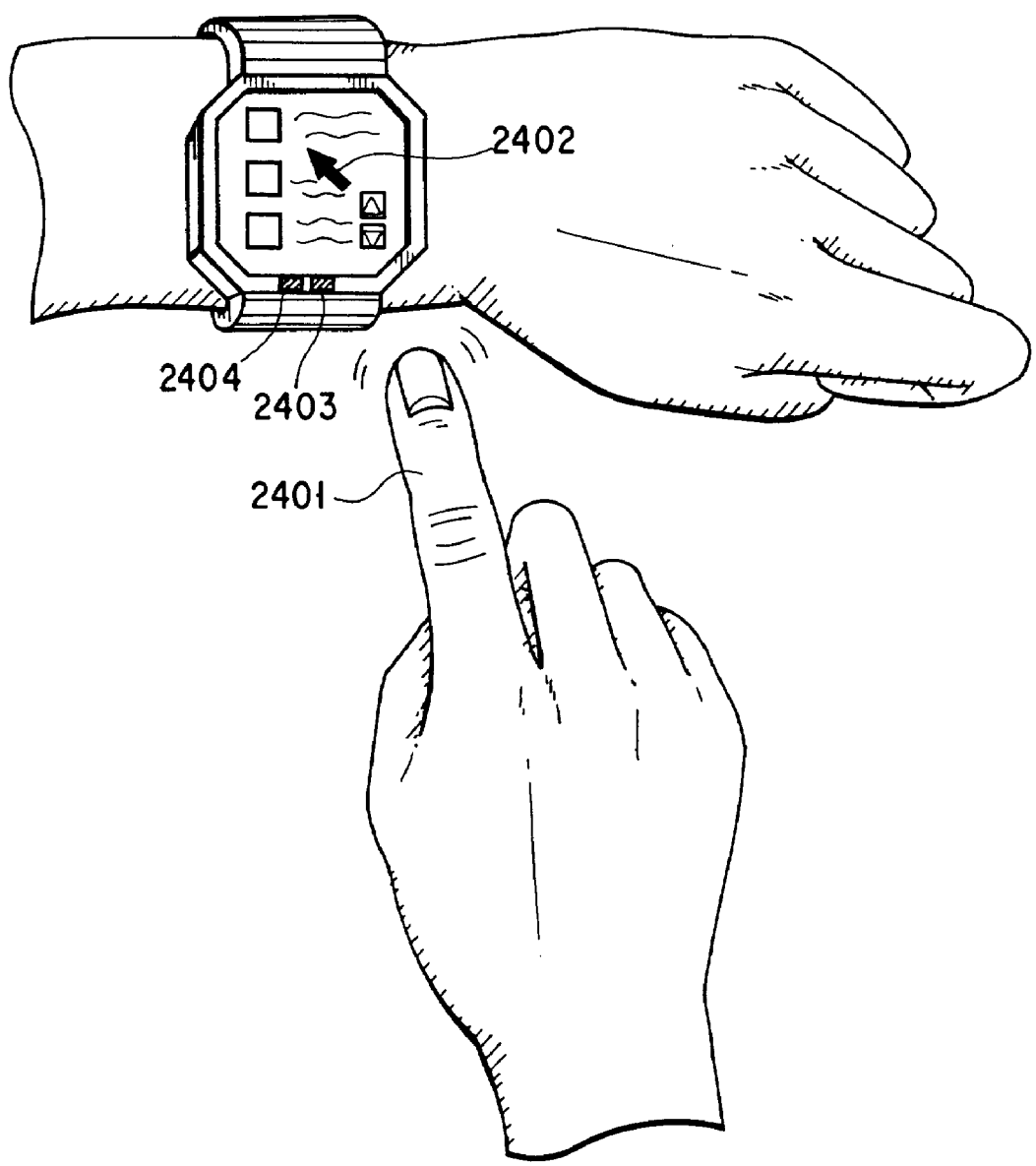
F I G. 64

METHOD AND APPARATUS FOR CONTROLLING COMPUTER WITHOUT TOUCHING INPUT DEVICE

BACKGROUND OF THE INVENTION

1. Field of the Invention

The present invention relates to a device designed to input data for controlling or remote-controlling, for example, an electronic apparatus.

2. Description of the Related Art

Most of the data input devices (hereinafter called "control devices") hitherto developed to input control data are hand-held ones. A user operates a control device of this type, while holding it in hand. Control devices most commonly used in households are remote controllers. A remote controller has several buttons on it. The user holds it in a hand, aims it at an electronic apparatus and pushes one of the buttons. When the button is pushed, the remote controller emits an infrared beam to the apparatus, thus giving instructions to the apparatus.

Among the control devices hitherto developed, other than the hand-held ones, is a so-called touch panel. The touch panel comprises a transparent or opaque panel. When a user pushes any part of the panel with a finger or an elongated object, the touch panel inputs a data item representing the pushing of that part or the position of that part. A transparent panel may be mounted on a display screen displaying images of buttons. In this case, the user may push that part of the transparent panel located above one of the buttons displayed, thereby to input the data item indicating that the button has been selected.

In the field of image recognition, research has been done for a method of recognizing hand signaling and gestures. No practically usable methods have been developed, however. This is because various requirements are imposed, which are hard to fulfill in practice. More specifically, it is required that the background on which to display hands or a person be monotonous so that image data may be processed more easily. It is also required that the hands or the person be displayed in a relatively large size at the central part of a display screen.

Also, research has been conducted to facilitate image recognition. More precisely, an attempt has been made to develop a method in which stereoscopic analysis is performed on an object, based on trigonometrical survey, in order to recognize the three-dimensional shape of the object. Nonetheless, only a few cases are known in which image recognition techniques are applied to remote controllers.

A user cannot operate a remote controller unless he or she holds it in a hand. It is undesirable that the remote controller is held in a hand which has gotten dirty.

To operate a touch panel, the user need not hold anything at all. However, the panel may get dirty as the user repeatedly touches the panel with fingers. It may become so dirty that the images display on the display screen can no longer be seen through the panel. If the panel is dirty after a long use by a user, other users are discouraged to touch the panel in order to input data.

In the technique of recognizing hand signaling, achieved by processing the image data, the results are hardly reliable, greatly influenced by noise. The technique should therefore be improved to eliminate the influence of noise.

There is a great demand for control devices which can be operated by bare hands, without being held in hand or attached to a display screen. However, no control devices of this type have been provided.

Pointing devices, such as mouses, have hitherto been commonly used to control personal computers and the like. A pointing device is a data input device which is operated to input position data to a computer. Various types of pointing devices are available. The most popular of the pointing device is the mouse. The mouse comprises a housing and a ball contained in the housing. The ball can rotate in any direction with respect to the housing.

In use, the mouse is electrically connected to the computer and placed on a desk. Once the mouse is put on the desk, the ball contacts the desk top at one point. As the mouse is moved back, forth, leftward or rightward on the desk, the ball rotates with respect to the mouse housing. The angles through which the ball rotate in two directions are detected, either mechanically or optically. The data representing the angles detected is supplied to the computer In the computer, this data is processed into a direction and a distance, for which the cursor is moved on the display screen.

Pointing devices other than the mouse have been put to use for inputting data to computers. Among them are a touch pad, a track ball, a small joystick, a touch panel and a pen device.

The mouse is easy to operate to input data to the computer. However, the mouse can hardly be used unless there is a flat wide surface such as the top of a desk. To operate his computer outdoors, by using the mouse, the user needs to find something having a flat wide surface. In a train or a car, it would be impossible for him to use the mouse to input data to the computer placed on his laps. Even if a desk is provided, the mouse cannot be used if the desktop is covered with books, folders or documents. To use the mouse, the desktop has to be cleared.

Portable computers, each having a pointing device other than the mouse, are now used in increasing numbers. The pointing device on the portable computer is a track ball, a touch pad, a small joystick or the like. The track ball is rotated with a finger. The direction and distance the track ball is rotated are detected, and the data representing them is input to the computer. The touch pad, available in various types, can detect the position of any part touched. When stroked with the user's finger, the touch pad generates data representing the direction and distance it is thus stroked.

A small joystick is shaped like a lever. It is provided on a keyboard. In most cases, it protrudes upwards, from among "G", "H" and "B" keys. When the joystick is rotated, the direction and angle by which it is rotated are detected. The direction and the angles are converted into two data items which represent the direction and distance for which the cursor is to move on the display screen. The data items are input to the computer.

Pointing accomplished by using a mouse, a track ball, a touch pad, or a small joystick proceeds in the following sequence of steps:

1. Detect the position the cursor assumes now.
2. Determine a target position to which the cursor is to be moved.
3. Determine the direction and distance for which the cursor is to be moved.
4. Input data items representing the direction and the distance, thus determined.

Steps 1 and 2 are interchangeable. Steps 3 and 4 may be repeated so that the cursor may keep moving in various directions in different directions.

The movement of the operator's hand for using the mouse differs from the movement of his hand for using other pointing devices. When the pointing is made by using the mouse, the position of the mouse approximately corresponds to the position of the cursor. Of course, when the mouse is lifted up and then moved, the relation between the mouse position and the cursor position is changed. Further, if the mouse driver having a function of accelerating the cursor is used, the mouse position does not completely correspond to the cursor position. However, from a view point of short distance operation, it can be said that the mouse position approximately corresponds to the cursor position. In other words, when moving the cursor, the operator may move his hand holding the mouse similar to the movement of the cursor.

By contrast, when a track ball, a touch pad or a small joystick is used to move the cursor on the display screen, the motion of the cursor is different from the motion of the user's hand.

In the case of a track ball, the direction and angle by which the ball is rotated correspond to the direction and distance for which the cursor moves, as long as the ball is rotated at a single touch to move the cursor for a relatively short distance. To move the cursor for a longer distance, the user rotates the ball more than two times, repeatedly moving the hand back and forth. Obviously, the motion of the cursor is no longer the same as the motion of the hand.

In the case of a touch pad, the motion of the user's finger stroking the pad is similar to the motion of the cursor on the display screen, provided that the cursor is moved by a single stroke on the pad to move the cursor for a relatively short distance. To move the cursor for a longer distance, the user strokes the pad two or more times, moving his hand back and forth. Hence, the motion of the cursor does not correspond to the motion of the hand.

In the case of a small joystick, the direction in which the stick is rotated and the time for which the stick is held in the rotated position correspond to the direction and distance for which the cursor moves. While the user's hand is holding the stick at a rotated position, the cursor keeps moving. The user must rotate the stick minutely to adjust the position of the cursor as long as the stick is rotated at a single touch to move the cursor for a relatively short distance. To move the cursor for a longer distance, the user must rotate the stick two times or more, by repeatedly moving the hand back and force. Thus, the motion of the cursor does not correspond to the motion of the hand. Therefore, the motion of the cursor does not correspond to the motion of the user's hand.

The difference between the mouse and any other pointing device with respect to the relationship between the motion of the cursor and that of the user's hand is conspicuous, particularly for Steps 3 and 4 of the pointing described above. In Steps 3 and 4, the cursor is first moved a long distance and then moved repeatedly, each time for a much shorter distance. The user can move the cursor a long distance at a fairly high speed by using a mouse if he has grasped the preset speed ratio between the cursor and the mouse.

To move the cursor a long distance by using a track ball or a touch pad, however, the user must rotate the ball or stroke the pad, several times. To move the cursor a long distance by using a small joystick or a touch pad, he must rotate the stick, keep watching the cursor moving on the screen and rotate the stick back as the cursor gets near the target.

To move the cursor a very short distance in a desired direction by using a mouse, the user only need to move the mouse in the same direction. When the user uses a touch pad to move the cursor in the same way, the user may stroke the pad in the same direction, but it is difficult for him to move his finger smoothly on the pad due to the friction between the pad and the finger tip. If the user touches the pad rather lightly in order to move the cursor minutely, his finger will likely leave the pad, inevitably making a clicking error. To move the cursor a very short distance in a desired direction, the user may operate a small joystick. In this cases the user must repeat slightly rotating the stick and rotating it back, each time to move the cursor a little. It takes a long time to move the cursor, bit by bit.

Generally, the mouse excels in operability but is disadvantageous in terms of portability, whereas the touch pad, track ball and small joystick are quite portable but inferior in operability.

The user a touch panel in place of a mouse, to perform pointing. If a transparent touch panel is mounted on the display screen, the user can designate any desired point on the screen, merely by touching that part of the panel which is aligned with the desired point of the screen.

Pointing accomplished by using a touch panel proceeds in only the following two steps, far less than in the pointing achieved by means of a mouse, a track ball, a touch pad, or a small joystick 1. Determine a target position on the screen, to which the cursor is to be moved.
2. Touch that part of the panel which is aligned with the target position on the screen.

However, some problems arise when a touch panel is used to accomplish pointing. First, the user's finger touching the panel conceals that part of the displayed data which is located at the target position. Second, it is impossible to point anything displayed that is smaller than the finger tip. Third, the display screen gets dirty as it is repeatedly touched with fingers. Further, to drag a menu item on the display screen, the user needs to stroke the touch panel with his finger. The user is discouraged from stroking the touch panel, however, in fear of soiling the panel or feeling frictional touch on the panel.

The user may touch the panel, selecting any desired menu item and then touch the panel again at a different part thereof, in order to display the selected icon at that position on the screen which is aligned with the part of the panel he has touched again. If this is the case, the menu item does not appear as if being dragged to that position on the screen. This may be why touch panels are attached to the display screens of portable computers, though they are used as the operation panels of ATMs (installed at banks) which display large buttons and keys or are provided on word processors of a particular type.

Some touch panels are designed to be touched with a pen. They are more popular than any other pointing device, as a device for inputting data into personal electronic apparatuses. They have been commercialized as an input interface of pen computers and PDAs (Personal Digital Assistants). When touched with a pen, the touch panel can select smaller menu items and gets less dirty than when touched with fingers, and can easily drag the selected menu item to any desired position on the display screen. In addition, the user can input data representing hand-written characters by writing the characters with the pen on the touch panel.

To use the pen in combination with the touch panel, the user has to hold the pen in a hand. This does not matter if the panel is attached to a PDA. When the touch panel is used along with a keyboards as in the case of inputting data into a portable computers it would be cumbersome for the user to lift one hand off the keyboard and then hold the pen instead in this hand, in order to point any desired item displayed on the screen. Even in the case of a touch panel on a PDA, the user may feel it troublesome to take the pen to point a desired item displayed on the screens though he may not feel it so troublesome when he moves the pen to input characters into the portable computer. Being a small item, the pen is likely to be lost. The pen may be tied to the touch panel by a string. If the pen is tied to the panel, however, it becomes difficult for the user to use the pen.

The user may designate any desired item displayed on the screen, without using a pointing device of any type. For example, a data input device may be used which processes the image data representing the user's hand, thereby detecting the shape and position of the user's hand. Such a data input device, if any, enables the user to designate a desired one of items displayed on the screen, only by pointing the desired item with a finger. As a result, the motion of the cursor is as faithful to the motion of the finger, as to the motion of a mouse. Needless to say, it is far easier to move a finger than to operate a touch pad, a track ball or a small joystick, in order to point any desired item on the display screen. In addition, no flat wide surface is required as in the case wherein a mouse is used to point any item displayed on the screen. The user need not touch the display screen, and the display screen can remain clean. Nor does the user have to hold a pen device in the hand.

Any desired item displayed on the screen may be designated by another method, without using a pointing device of any type. In this method, a color marker is used to mark a part of the user's hand, and the color-marked part of the hand is detected from an image of the hand. The method is widely employed by various apparatuses for determining and analyzing the motions of objects. It can be applied to pointing devices for use in combination with portable computers. However, it cannot be practiced without using expensive image-processing hardware. Nor can it work well if any garment the user wears happens to be of the same color as the marker Further, the user may not be willing to have his hand marked by the color marker. In view of these disadvantages, the method hardly seems practical.

Pointing systems have been made on a research basis, each recognizing the user's bare hand and the position of the tip of any finger, from an image of the user's hand. These pointing systems do not work well in most cases, because it is usually very difficult to distinguish the image of the hand from the images of other moving objects.

As has been mentioned, every pointing technique developed hitherto is advantageous in one respect and disadvantageous in another. It can hardly be said that a pointing device is available which functions well in combination with portable computers, even when the computers are used outdoors.

SUMMARY OF THE INVENTION

An object of the present invention is to provide a data input apparatus which does not need to be held in a hand and which can remote-control an electronic apparatus.

Another object of the present invention is to provide a data input apparatus and an image-processing method which enable people to use portable computers at any place with high efficiency.

According to a first embodiment of the invention, there is provided a data input apparatus comprising distance image input means for inputting distance image representing a distribution of distances, each measured between the apparatus and each conceivable point existing on an object; point determining means for determining a designating point in the distance image input by said distance image input means, said designating point being one of the conceivable points on the object which has least distance value; and system control means for controlling a system in accordance with motion of the designating point determined by said point determining means.

According to a second embodiment of this invention, there is provided a data input apparatus comprising distance image input means for inputting distance image representing a distribution of distances, each measured between the apparatus and each conceivable point existing on an object; minimum point detecting means for detecting minimum points in the distance image input by said distance image input means, said minimum points being some of the conceivable points on the object which have smaller distance values than the other conceivable points; time difference detecting means for detecting time differences, each representing a change which each point in the distance image assumes as time passes; point determining means for determining a designating point for designating a command to the system said designating point being one of the minimum points which has changed in the time difference detected by said time difference detecting means; and system control means for controlling a system in accordance with motion of the designating point determined by said point determining means.

According to a third embodiment of the present invention, there is provided a data input apparatus comprising distance image input means for inputting distance image representing a distribution of distances, each measured between the apparatus and each conceivable point existing on an object; minimum point detecting means for detecting minimum points in the distance image input by said distance image input means, said minimum points being some of the conceivable points on the object which have smaller distance values than the other conceivable points; time difference detecting means for detecting time differences, each representing a change which each point in the distance image assumes as time passes; point determining means for determining a designating point for designating a command to the system, said designating point being one of the minimum points which has least time difference falling within a predetermined range; and system control means for controlling a system in accordance with motion of the designating point determined by said point determining means.

In the data input apparatus according to the third embodiments the distance image input means comprises light-emitting means comprising an array of light-emitting elements; light emission control means for controlling said light-emitting elements so that light beams are emitted, one after another, from the light-emitting elements to an object; light-detecting means of detecting a position which each light beam reflected from the object assumes; distance calculating means for calculating a distance between the apparatus and the object from the position of the light beam detected by said light-detecting means and a position of the light-emitting element which has emitted the light beam; and minimum point detecting means for detecting minimum points in the distance image input by said distance image input means, said minimum points being some of the conceivable points on the object which have smaller distance values than the other conceivable points.

In the data input apparatus according to the third embodiment, the system control means comprises: cursor controlling means for displaying and controlling a cursor at a position on a display screen, which corresponds to the designating point determined by said point determining means; conversion means for converting a locus of the cursor moving on the display screen into a command for controlling the system; and command executing means for executing the command generated by said conversion means.

According to a fourth embodiment of the invention, there is provided a data input apparatus comprising: light-emitting means for emitting a light beam to an object; light-receiving means for receiving the light beam reflected by the object; distance image generating means for generating a distance image from an output which said light-receiving means generates while said light-emitting means is emitting the light beam and also from an output which said light-receiving means generates while said light-emitting means is emitting no light beam; minimum point detecting means for detecting minimum points in the distance image generated by said distance image generating means, said minimum point being some of the conceivable points on the object which have smaller distance values than the other conceivable points; point determining means for determining at least one designating point for designating a command to the system in accordance with a specific rule, said at least one designating point being at least one of the minimum points detected by said minimum point detecting means; and system control means for controlling a system in accordance with motion of said at least one designating point determined by said point determining means.

In the data input apparatus according to the fourth embodiment, the distance image generating means includes means for preventing the outputs of said light-receiving and -emitting means from being used, when a difference between the outputs of said light-receiving and -emitting means falls outside a predetermined range.

In the data input apparatus according to the fourth embodiment, the minimum point detecting means comprises at least one of two means, and means for selecting at least one of the minimum points in accordance with an output of said at least one of said two means, said two means being means for detecting motion of each of said minimum points and means analyzing entities existing near each of said minimum points.

The data input apparatus according to the fourth embodiment may further comprise filter means for filtering coordinate values or distance values, or both, of the designating point designated by said point designating means.

The data input apparatus according to the fourth embodiment may further comprise: point-halting time detecting means for detecting a time for which the designating point determined by said point determining means remains within a predetermined region; point-menu correspondence detecting means for associating a position of the designating point with any one of menu items displayed on the display screen; and command executing means for executing the menu item detected by said point-menu correspondence detecting means, when an output of said point-halting time detecting means satisfies specific conditions.

The data input apparatus according to the fourth embodiment may further comprise: first point-motion detecting means for detecting one of the minimum points which corresponds to a finger tip; and second point-motion detecting means for detecting that the finger tip is moved to select a menu item.

In summary, the present invention provides a data input apparatus which comprise: distance image input means for inputting distance image representing a distribution of distances, each measured between the device and each conceivable point existing on an object; point determining means for determining a designating point for designating a command to the system; and system control means for controlling a system in accordance with motion of the designating point determined by said point determining means.

Having the structure specified above, the data input device does not recognize the shape of an object located before it (e.g, the shape of the user's hand), but recognizes the object as the user's hand, based on the minimum points detected in the distance image. When the user raises his or her arm out towards the data input device, minimum points are generated in the distance image. Detecting these minimum points, the device determines that the user has just raised the arm. The device then disregards all minimum points but one that pertains to the motion of the hand, by utilizing the time difference data of the distance image. The minimum point pertaining to the motion of the hand is a designating point. The device tracks the designating point, whereby the data representing the motion of the hand is input. The data input device can therefore be used as a pointing device.

The present invention can provide a data input apparatus which enables a user to remote-control an electronic apparatus or the like, without holding a remote controller. Thus, the user need not be bothered to look for a remote controller, which he or she does not need to control the apparatus. In addition, the user can remote-control the apparatus even if his or her hand has gotten dirty, not fearing that he or she may hand a dirty remote controller another user, or may soil or damage the apparatus.

Further, the present invention provides a data input apparatus which has a range finder comprising light-emitting elements and light-receiving elements. In the device, the distance to an object is calculated not only from the outputs the light-receiving elements generate upon receiving the light beams reflected from the object, but also from the outputs the light-receiving elements generate when not receiving these light beams. Therefore, it is possible to minimize the influence which the noise (e.g., background light or intensity-alternating light emitted by a fluorescent lamp) imposes on the calculation of the distance.

If the output of each light-receiving element increases above, or decreases below, an expected value, the distance value obtained from this output will not be used to calculate the distance to the object. In other words, the output is not used when the object is so remote that the distance between the object and the apparatus need no longer be measured.

Further, the present invention provides a data input apparatus which detects some candidate points in a distance image, wherein one of the candidate points is determined to be the user's finger tip. Since the finger tip is the minimum or smallest point in the distance image, it can be detected more reliably and at lower cost than when detected by processing the distance image.

The invention can also provide a data input device which monitors the motion of several minimum points in a distance image and analyzes some points near each minimum point, thereby to determine which minimum point is the user's finger tip. Therefore, any minimum point pertaining to a still object (e.g., a desk or a chair) or an object (e.g., the user's head) different from the finger tip in, shape and size can be reliably excluded from those which may correspond to the finger tip.

This invention can provide a data input apparatus which comprises a filter for processing the data items representing minimum points. Thus, even if the user's finger is located exactly halfway between two adjacent LED beams, it is possible to generate the x- and y-coordinates of a point positioned precisely halfway between the LED beams.

The present invention can provide a data input apparatus which displays menu items and a cursor on a display screen and which selects and executes any desired menu item, when the user moves his or her finger, moving the cursor to the desired menu item.

Moreover, this invention can provide a data input apparatus which selects and executes any desired one of menu items provided in the form of buttons, when the user moves his or her finger as if to push the desired button.

Further, the present invention can provide a data input apparatus which enables a user to select one of various menu items provided in the form of hierarchical rows or in the form of a ring consisting of arcuate menu bars, merely by moving his or her finger in specific directions. The user can therefore select any desired menu item by a simple action, without making errors.

When the user raises his or her arm out towards the data input apparatus, pointing any menu item on the system, the finger is identified by the minimum points existing in the distance image and having smaller distance values than any other conceivable points on the arm. The minimum points are analyzed, thereby locating the tip of the finger. This method can determine the position of the finger tip with high reliability, despite the background light which would result in recognition errors if the image data were processed to locate the finger tip. Since the analysis of the minimum points is relatively simple, no large-scale hardware is required to determine the position of the finger tip.

According to the present invention, there is provided a data input apparatus comprising: light-emitting means for emitting a modulated light beam; light-receiving means for receiving the modulated light beam reflected by an object; extracting means for extracting a modulated component of the light beam received by the light-receiving means; and measuring means for measuring a magnitude of the modulated component extracted by the extracting means.

According to the invention, there is provided a data input apparatus for use in an apparatus, comprising light-emitting means for emitting a modulated light beam; light-receiving means for receiving the modulated light beam reflected by an object; extracting means for extracting a modulated component of the light beam received by the light-receiving means; measuring means for measuring a magnitude of the modulated component, which has been extracted by the extracting means; feature detecting means for detecting a feature of the object from the magnitude of the modulated component, which has been measured by the measuring means; and control means for controlling the apparatus, in accordance with the feature of the object, which has been detected by the feature detecting means.

According to this invention, there is provided an image-processing method comprising the steps of: correcting values of some pixels to cause a sum of these values to meet a predetermined condition, the pixels defining a part of an image of a rod-shaped object; detecting a center of gravity of the tip of the rod-shaped object, from the corrected values of the pixels; and calculating a position of the tip of the rod-shaped object, from the center of gravity detected.

According to the invention, there is provided a data input apparatus comprising light-emitting means for emitting a modulated light beam; light-receiving means for receiving the modulated light beam reflected by an object; extracting means for extracting a modulated component of the light beam received by the light-receiving means; measuring means for measuring a magnitude of the modulated component, which has been extracted by the extracting means; image generating means for generating an image of the object from the magnitude of the modulated component, which has been measured by the measuring means; correcting means for correcting values of some pixels to cause a sum of these values to meet a predetermined condition, the pixels defining a part of the image generated by the image generating means, which is a tip of a rod-shaped object; and gravity center detecting means for detecting a center of gravity of the tip of the rod-shaped object, from the values of some pixels, which have been corrected by the correcting means.

Any data input device according to the present invention enables a user to operate an electronic apparatus by pointing the display screen of the device with his bare finger and moving the tip of his finger. If the device is incorporated in, for example, a portable computer, the user can control the cursor on the display screen merely by pointing the screen with his finger and moving his finger. Further, the device can generate commands when the user moves his finger in specific ways, as if to write characters.

In the present invention, a light-emitting section and a light-receiving section are used in combination to obtain an image of the hand. More specifically, the light-emitting section applies light to the hand, and the light-receiving section receives the light reflected from the hand and coming through a light-receiving lens. The light-receiving section has an array of light-receiving elements. Each light-receiving element receives only light beams applied in a specific direction. Some of the light-receiving elements receive light beams reflected from the hand, while the remaining light-receiving elements receive no light beams reflected from the hand.

The intensity of the light beam which has been reflected from the hand and which any light-receiving element has received depends upon the distance between the light-receiving element and that part of the hand from which the beam has reflected, a finger tip, the palm or any other part of the hand. The light intensity is inversely proportional to the fourth power of this distance. The origin of each light beam can therefore be accurately determined from the user's hand or any other part of the user (e.g., the head) which is usually located farther from the display screen. Hence, the outputs of the light-receiving elements represent the positions and shapes of the user's fingers. They are processed to generate data representing the position of the tip of the finger pointing the display screen. This data can be used as pointing data.

The light-receiving section receives not only the light beams reflected from the user's fingers, but also the sunlight beams and lamp beams. No correct data representing the position of the finger tip can be obtained unless the components resulting from the sunlight beams and lamp beams are filtered out from the output of the light-receiving section. Thus, the light-emitting section emits modulated light, and the light-receiving section or the analog signal processing section connected to the output of the light-receiving section directly or indirectly outputs only the modulated component of the light applied to the light-receiving section. As a result, correct data representing the position of the finger tip is generated.

The data, thus generated, is processed in the same way as image data, by using the outputs of the light-receiving elements as pixel values. Image data representing the finger tip is thereby obtained. Unlike image data generated by a TV camera or the like, this image data represents an image of the user's hand only, not representing any objects existing behind the hand. Assuming that the user extends a finger toward the display screen, the pixels defining a rod-shaped object extending upwards are extracted from the image data. The pixels extracted constitute an image of the user's finger tip. Although this image has a low resolution, it can serve to achieve minute pointing because the value of each pixel is great when the user moves the finger only a little.

The data input apparatus of the invention can be modified in various ways so as to input data when the user moves his finger as if to push the button on a mouse. In a modified apparatus once the position of the cursor is detected as mentioned above, it is determined whether the cursor remains at that position for a predetermined time, and a click signal is generated upon lapse of this time. In another modified apparatus, the distance between the light-receiving section and the user's finger tip is monitored, thereby determining whether the user moves his finger first toward the display screen and then away therefrom, as if to push a virtual button displayed on the screen, and a click signal is generated if the user is found to have so moved the finger. Yet another modified apparatus has a push button, which the user may operate with one hand exactly in the same way he would push the button on a mouse, while moving a finger on his other hand to move the cursor on the display screen.

As has been explained, the data input apparatus according to the present invention enables a user to point any item on the display screen of an apparatus, only by extending his bare finger toward that item. The apparatus keeps tracking the finger tip moving, so as to input various commands as the user makes various finger signals. Further, the image input apparatus can process image data to determine not only the position of the user's finger tip, but also the shape and orientation of his hand and the distance between the finger tip and the display screen. Hence, the apparatus can generate complex data items and input them to the apparatus.

According to the present invention, the data input apparatus of the invention enables the user to point any item displayed on the screen of the apparatus incorporating the apparatus, without such a flat wide surface as is required when he operates a mouse to point an item.

Since the data input apparatus moves the cursor in the same way as the user moves his finger tip, the user can point any item on the screen, more quickly and more correctly than by operating a track ball, a touch pad or a small joystick. In addition, the apparatus can input data to the apparatus when the user makes finger signals.

The data input apparatus enables the user to point any desired item on the display screen, without touching the screen with fingers. Therefore, the display screen can remain clean, unlike the display screen of a touch panel, and the user needs not hold a pen device to input data to the apparatus.

In view of these advantages, the data input apparatus according to the present invention helps the user to operate a portable computer more easily than any existing pointing device.

Furthermore, the data input apparatus according to this invention can be incorporated in a small electronic apparatus such as a small PDA. If built into a PDA which is too small to hold a pen and which has but a small display screen, the apparatus of this invention will enable the user to point a desired item on the screen, far more easily and accurately, than does any existing pointing apparatus.

Moreover, the light sensor used in the data input device of this invention has far fewer light-receiving elements than a CCD area image sensor. Thus, the data input device can be manufactured at low cost.

BRIEF DESCRIPTION OF THE DRAWINGS

FIG. 7 is a block diagram representing the LED array and the LED array controller shown in FIG. 6;

FIG. 8 is a block diagram showing the distance calculating section shown in FIG. 6;

FIGS. 9A through 9F illustrate a timing chart showing an output from PSD, an input trigger of an A/D converter, an input trigger from a latch circuit, an A/D output, a latch output and an output after removing a background value;

FIGS. 10A through 10F illustrate a timing chart when a background light is to be removed by using a single output of non-activated LED with respect to a plurality of outputs of activated LEDs;

FIG. 12 is a diagram showing an embodiment of the time difference detecting section shown in FIGS. 2 and 6;

FIG. 13 is a diagram showing the section to determine the coordinates of the minimum point which is closer to the apparatus than any other minimum point whose time difference is greater than the predetermined value;

FIG. 16 is a diagram showing a circuit to be inserted at the input section of the circuit diagram shown in FIG. 15;

FIGS. 17A through 17D illustrate a timing chart explaining the operation of the candidate point storing section shown in FIG. 14;

FIG. 18A through 18F illustrate another timing chart which explains also the operation of the candidate point storing section shown in FIG. 14;

FIGS. 25A through 25C illustrate a timing chart explaining how to drive the A/D converter in the distance image input section, so as to cancel the influence of background light in the third embodiment;

FIG. 26 is a diagram illustrating the circuit used in the third embodiment, for canceling the influence of the background light before the input data is supplied to the A/D converter;

FIGS. 27A through 27E illustrate a timing chart explaining the operation of the circuit for canceling the background light before the A/D conversion in the third embodiment;

FIG. 28 is a block diagram showing a distance image input section in which distance values are controlled in accordance with the output of the light-receiving section in the third embodiment;

FIG. 29 is a block diagram illustrating a data input apparatus in which a distance image analyzing section comprises a minimum point detecting section and a minimum point selecting section in the third embodiment;

FIG. 30 is a block diagram showing a data input apparatus in which the minimum point selecting section in the third embodiment uses the original distance image and the minimum point data output from the minimum point detecting section;

FIG. 31 is a block diagram illustrating a first modification of the third embodiment;

FIG. 33 is a schematic representation of the data acquired by the minimum point circumference analyzing section in the third embodiment;

FIG. 34 is a view showing an arrangement of a data input apparatus provided with a filter in the third embodiment;

FIG. 35 is a view showing an arrangement of the data input apparatus for selecting a menu selection according to the third embodiment;

FIG. 36 is another view showing an arrangement of the data input apparatus for selecting a menu selection according to the third embodiment;

FIG. 43 is a diagram showing a portable computer incorporating the data input apparatus and a person who is operating the portable computer;

FIG. 45 is a diagram illustrating the positional relation between the user's hand and the region monitored by the light-receiving section used in the data input apparatus;

FIG. 46 is a graph representing the reflected received image, the ordinate of the graph representing values of the pixels forming the image;

FIG. 48 is a diagram explaining the characteristic amount detected in the data input apparatus;

FIG. 49 is a diagram illustrating the image of the received reflective light, the part of the image including the finger tip, and the extracted image of the finger tip;

FIG. 59 is a hand-held PDA incorporating the data input apparatus according to the third embodiment of the invention;

FIGS. 61A through 61E are diagrams illustrating the storage unit for storing candidates for a rod-shaped object;

FIGS. 62A through 62D are diagrams illustrating how a candidate for a rod-shaped object is replaced with another candidate when the image data has noise;

FIG. 63 is a diagram for explaining the method of eliminating the influence of the noise contained in that part of image data which represents the end portion of the rod-shaped object; and FIG. 64 is a diagram showing a watch-type PDA incorporating the data input apparatus according to the third embodiment.

DETAILED DESCRIPTION OF THE PREFERRED EMBODIMENTS

Several embodiments of the present invention will now be described, with reference to the accompanying drawings.

Figure 1:
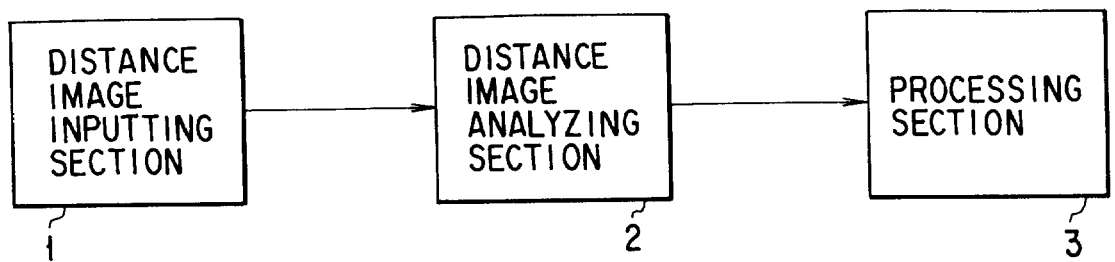
FIG. 1 is a block diagram showing an arrangement of a first embodiment of a data input apparatus according to the invention.

The first embodiment of this invention, which is also a data input apparatus (hereinafter referred to as a data input device), will be described with reference to FIG. 1.

This data input device comprises a distance image input section 1, a distance image analyzing section 2 and a processing section 3. The distance image input section 1 acquires image data representing a distance image. The data is supplied to the distance image analyzing section 2. The section 2 analyzes the distance image, determining a minimum point, and generates data representing the minimum point. The processing section 3 processes the data supplied from the section 2, to provide a function menu, to determine any function selected by the user, and to execute the function selected.

This data input device is designed to analyze a distance image of a user's hand or the like, thereby extracting data representing the minimum point of the distance image, and remote-control an apparatus in accordance with the data extracted.

Figure 2:
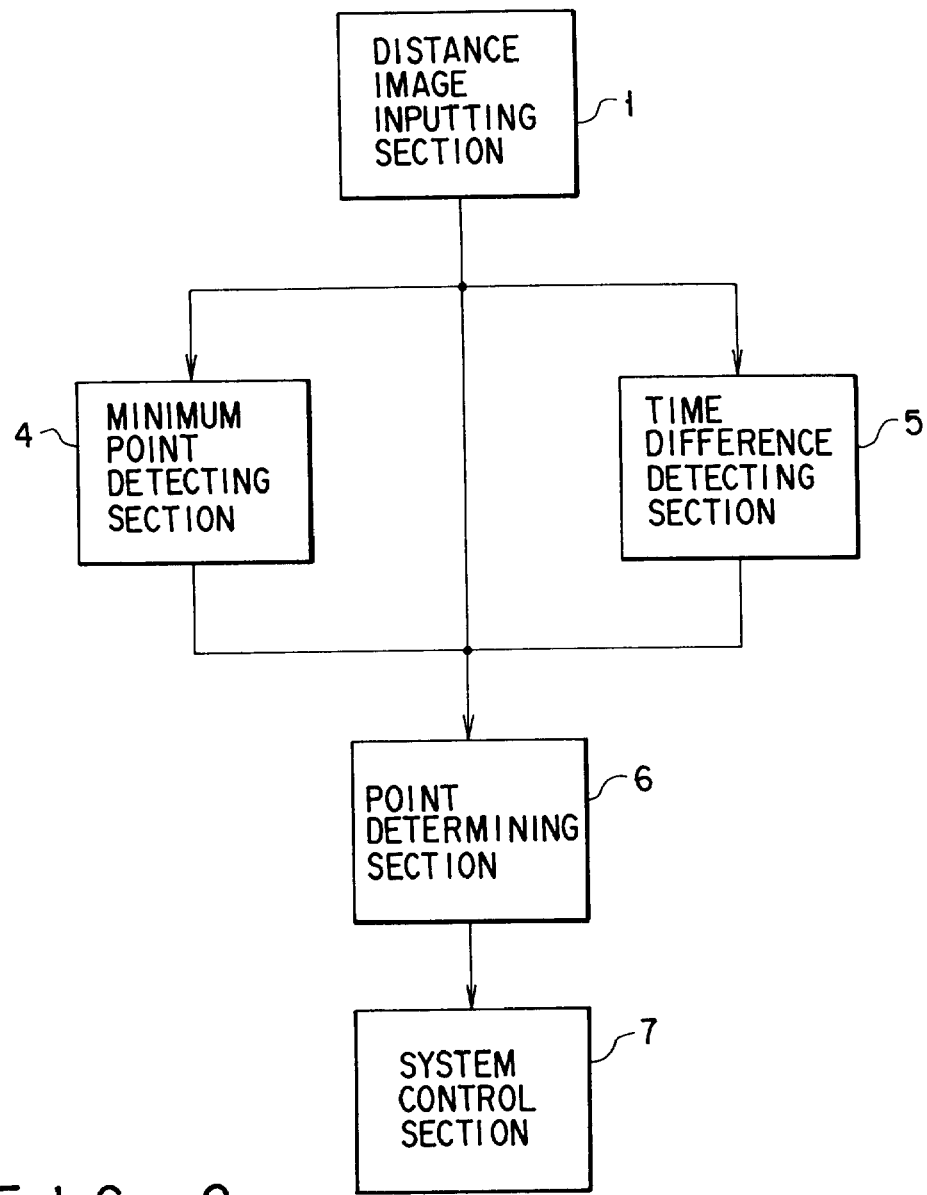
FIG. 2 is a detailed block diagram of the embodiment shown in FIG. 1.

As shown in FIG. 2, the data input device comprises a distance image inputting section 1, a minimum point detecting section 4, a time difference detecting section 5, a point determining section 6, and a system control section 7.

In operation, the distance image inputting section 1 acquires image data representing a distance image. The data is supplied to the minimum point detecting section 4, the time difference detecting section 5 and the point determining section 6. The minimum point detecting section 4 processes the image data, thereby detecting the minimum point in the distance image, which assumes the shortest distance. The section 4 generates a data item representing the minimum point and supplies it to the point determining section 6.

In the meantime, the time difference detecting section 5 processes the image data, detecting the time difference for every point in the distance image. The section 5 generates data items, each representing the time differences for one point, and supplies the data items to the point determining section 6.

The point determining section 6 determines the designating point set by the user, from the image data supplied from the distance input section 1 and the data items supplied from the detecting sections 4 and 5. The section 6 generates a data item representative of the designating point set by the user. This data item is supplied to the system control section 7. In accordance with the data item, the section 7 controls an electronic apparatus.

In the data input device, the distance image which indicates the motion of the user or the user's hand is acquired and processed. The data input device therefore enables the user to remote-control the electronic apparatus, merely by moving himself or herself or his or her hand. Thus, the user need not hold or operate any remote controller whatever to control the electronic apparatus.

Figure 3:
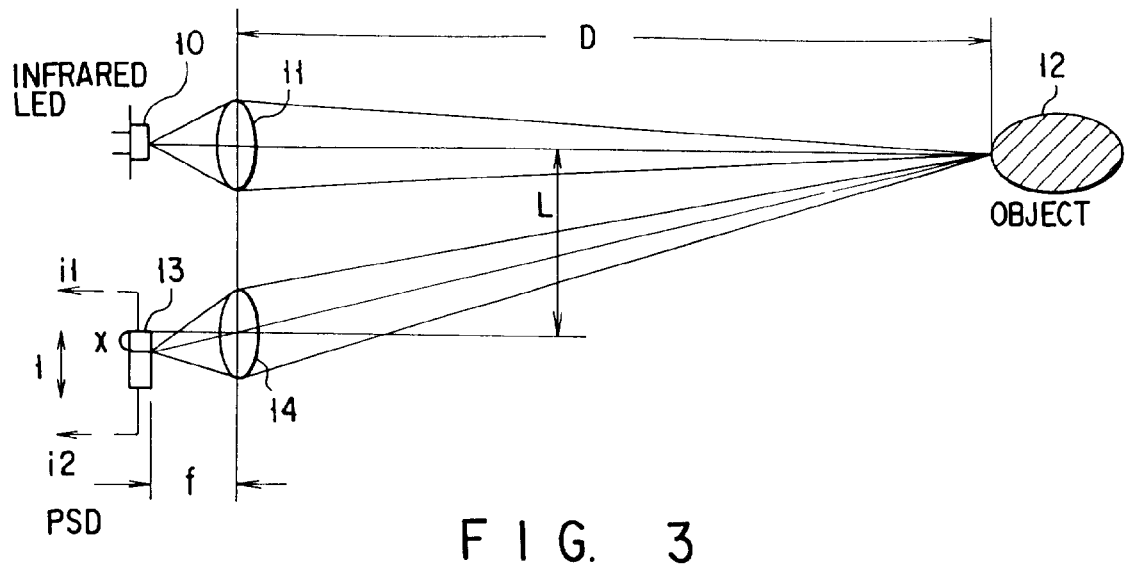
FIG. 3 is a diagram explaining the operating principle of the range finder incorporated in the first embodiment.

The present invention will be later described in more detail, with reference to the second and third embodiments. Here, the principle of inputting a distance image will be explained. First it will be explained how the data showing the distance to an object is acquired in a conventional method. FIG. 3 illustrates a range finder for use in the AF (Automatic Focusing) mechanism of a camera. As shown in FIG. 3, the range finder comprises an LED 10, a beam-applying lens 11, a position sensitive detector (PSD) 13 and a beam-receiving lens 14. The device 13 has a beam-receiving surface and two electrodes.

In operation, the LED 10 emits a beam (e.g., an infrared beam), which is applied through the beam-applying lens 11 to an object 12. The object 12 reflects the beam. The beam reflected is applied via the beam-receiving lens 14 to the PSD 13. The PSD 13 generates two currents i1 and i2 in accordance with the position the beam assumes on the beam-receiving surface. The currents i1 and i2 are output through the two electrodes, respectively.

Assume the lenses 11 and 14 are positioned in the same plane. Then, the optical axis of the LED 10 is identical with that of the beam-applying lens 11. The PSD 13 is positioned, satisfying two conditions. The first condition is that the beam spot moves on its light-receiving surface along a straight line connecting the centers of the lenses 11 and 14. The second condition is that one of the two extreme positions the beam spot may assume is located on the optical axis of the beam-receiving lens 14. Thus, the following relation holds in the range finder:

$$D:L=f:X$$

where f is the distance between the LED 10 and the lens 11 and also the distance between the PSD 13 and the lens 14, L is the distance between the centers of the lenses 11 and 14, D is the distance between the lens 11 and the object 12, and X is the distance between the beam spot and said one of the two extreme positions.

Further, the following relation holds in the range finder:

$$i1:i2=(C-X),$$

where C is the length of a resistive layer interposed between the two electrodes from which currents i1 and i2 are output.

Therefore:

$$X=C\times i2/(i1+i2)$$

Hence:

$$D=(i1+i2)/i2\times(fL/C)$$

Obviously, the distance D to the object 12 can be determined from the ratio between the currents i1 and i2 which flow through the two electrodes and which can be measured.

Figure 4:
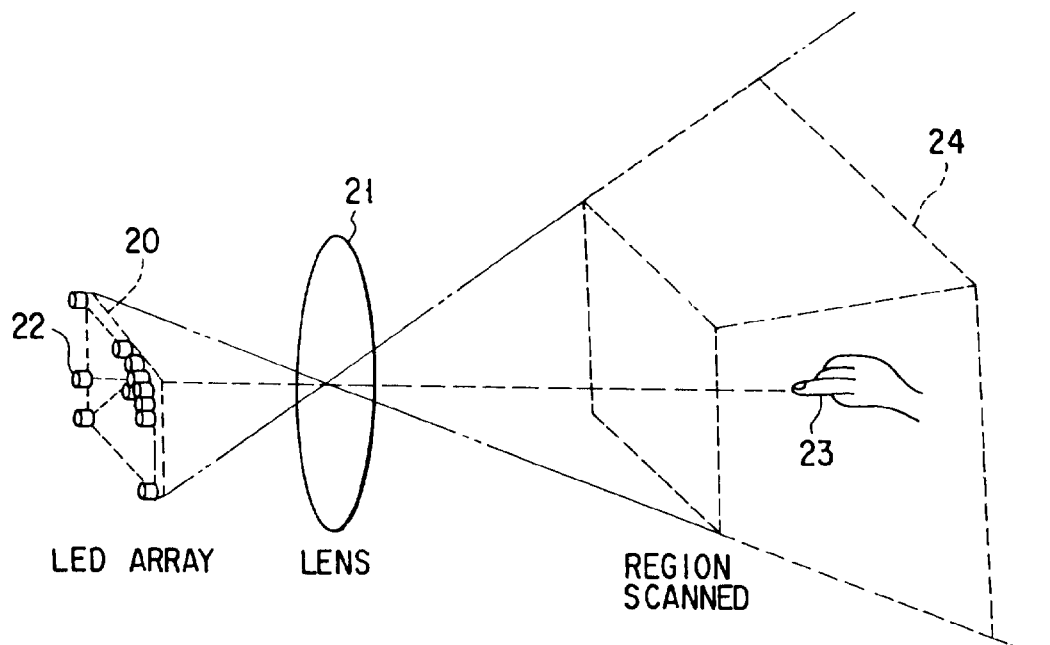
FIG. 4 is a diagram explaining how to acquire a two-dimensional distance image by arranging the range finder in a two-dimensional fashion shown in FIG. 3.

The range finder shown in FIG. 4 have additional LEDs identical to the LED 10. It can therefore serve to provide distance data, i.e., a distance image, which represents distances to all conceivable points in the surface of the object 12. To be more specific, a plurality of LEDs 22 are arranged in rows and columns as shown in FIG. 4, thus forming a two-dimensional LED array 20. The beams the LEDs 22 emit are applied via a beam-applying lens 21 to an object 23, e.g., an operator's hand. The beams form an image in a plane located at a specific distance from the lens 21. The beam emitted from one of the LEDs 22 travels toward one point in the image thus formed. If the object 23 is in the path of this beam, the PSD (Position Sensitive Detector) can catch the beam reflected from the object 23. The distance to the object 23 can therefore be detected. It follows that the range finder can generate two-dimensional distance data of the object 23 only if the LEDs 22 are sequentially driven and the PSD receives the beams reflected from the object 23. That is, the range finder can detect the distance to the object 23 with fairly high accuracy, unless the spot each beam forms on the beam-receiving surface of the PSD is excessively large due to a focusing error.

Figure 5:
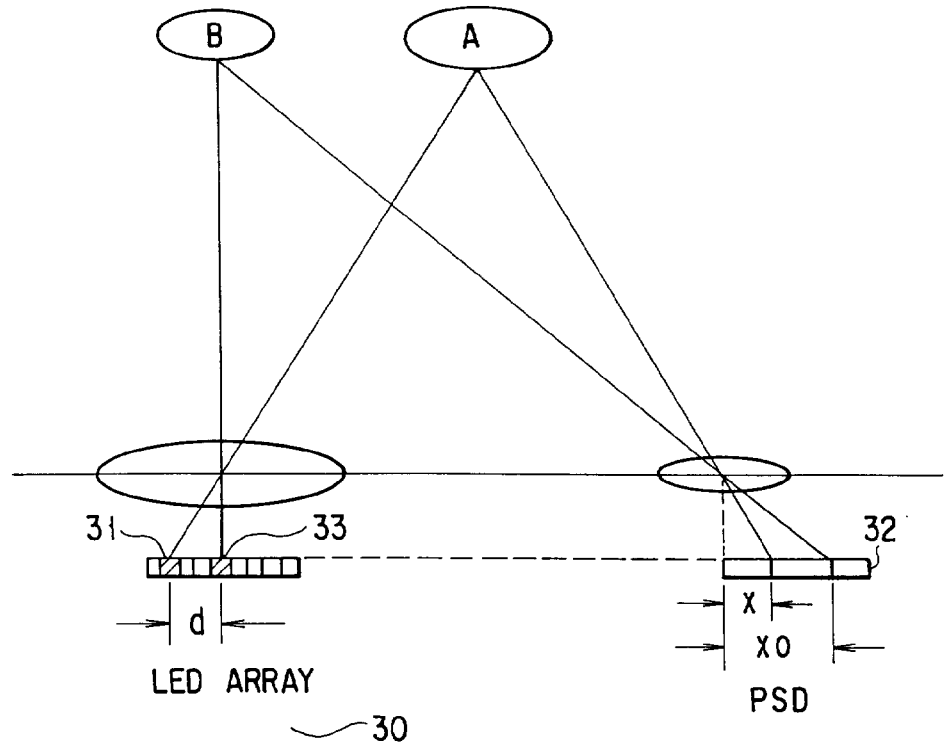
FIG. 5 is a diagram explaining how to acquire a distance image in the embodiment.

The less the diameter of the lens 21 and the longer the distance to the image formed, the larger the spatial region the LED array 20 can scan. Referring to FIG. 5, a method of determining the distance to an object A by using an LED 31 which is displaced from the axis of a beam-applying lens will be explained.

The LED 31 at a distance d from the center of the LED array 30 emits a beam, which is applied through the beam-applying lens to the object A, reflected by the object A and applied to a linear PSD 32 through the beam-receiving lens.

Meanwhile, the LED 33 located at the center of the LED array 30 emits a beam, which is applied through the beam-applying lens to another object B, reflected by the object B and applied to the linear PSD 32 through the beam-receiving lens. (The object B is at the same distance as the object A, from the line connecting the centers of the beam-applying and -receiving lenses.) The beam spot that the beam reflected by the object A forms on the beam-receiving surface of the PSD 32 is spaced by a distance d from the beam spot that the beam reflected by the object B, along a line connecting the LED array 30 and the PSD 32. As can be understood from FIG. 4, the distance d, as measured to the left from the center of the LED array 30, is expressed by the following equation:

$$d = xO - x$$

In the case shown in FIG. 5, the LED 31 is displaced from the center of the LED array 30 along the line connecting the LED array 30 and the linear PSD 32. In the case where the LED 31 is displaced from the center of the LED array 30 along a line extending at right angles to that line, the beam spot that the beam reflected by the object A forms on the PSD 32 is spaced from the beam spot that the beam reflected from the object B forms on the PSD 32, also along the line connecting the LED array 30 and the PSD 32. In either case, the ratio between the two currents the linear PSD 32 generates is the same, provided that the PSD 32 has a sufficient length. The range finder shown in FIG. 5 can therefore provide a distance image which has a particular size and which exists in a space.

The second embodiment of the present invention, which is also a data input device, will be described with reference to FIG. 6. This data input device can be said to be more sophisticated than the first embodiment illustrated in FIG. 2.

Figure 6:
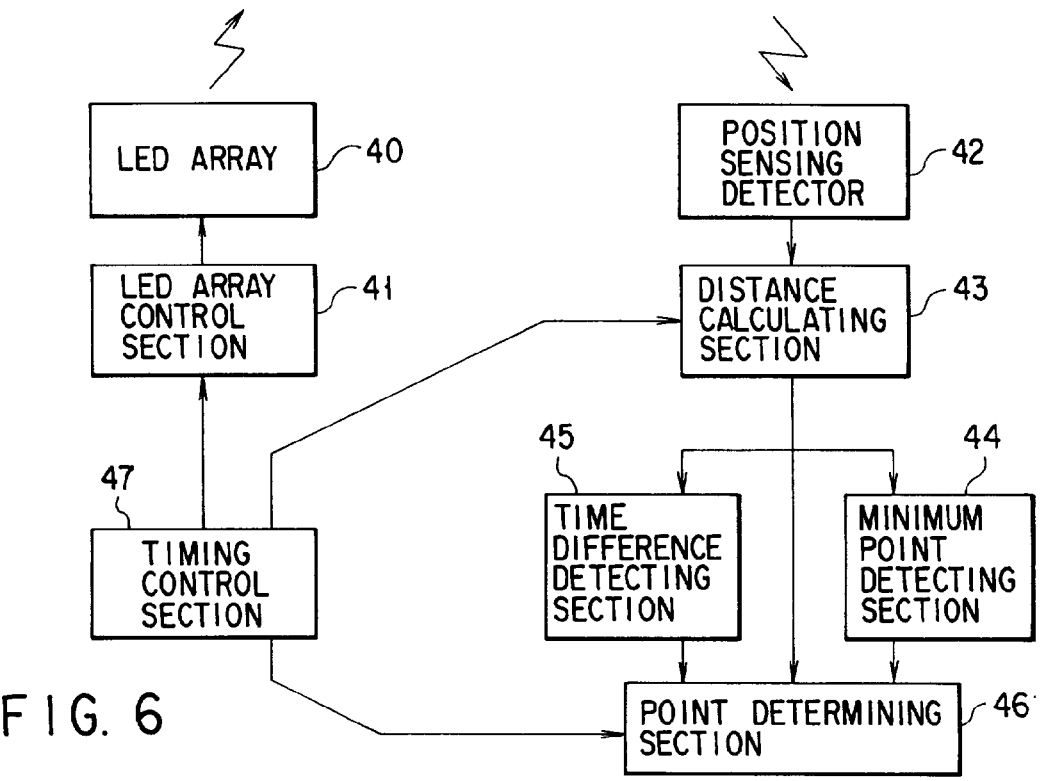
FIG. 6 is a detailed block diagram of the first embodiment shown in FIG. 2.

As shown in FIG. 6, the data input device comprises an LED array 40, an LED array control section 41, a position sensing device (PSD) 42, a distance calculating section 43, a minimum point detecting section 44, a time difference detecting section 45, a point determining section 46, and a timing control section 47. The LED array 40, the LED array control section 41, the PSD 42 and the distance calculating section 43 constitute a unit which is equivalent to the distance input section 1 of the first embodiment.

In operation, the LED array control section 41 drives the LEDs of the array 40 sequentially. Light beams are thereby emitted from the LEDs one after another. These beams are reflected by an object (not shown) and sequentially applied to the PSD 42. The PSD 42 generates signals from the light beams it has received. The signals are supplied to the distance calculating section 43. From the signals the section 43 generates image data representing a distance image of the object, which may be data items representing the distances to points in the surface of the object. The image data is supplied to the minimum point detecting section 44, the time difference detecting section 45 and the point determining section 46. The minimum point detecting section 44 processes the image data, thereby detecting the minimum point in the distance image, which assumes the shortest distance from the data input device. The section 44 produces a data item representing the minimum point and supplies it to the point determining section 46.

In the meantime, the time difference detecting section 45 processes the image data, detecting the time difference between the present frame of the distance image and each of several preceding frames—for each point in the surface of the object. The time difference is supplied to the point determining section 46.

The point determining section 46 receives the image data representing the distance image, the data item representing the minimum point and the time difference detected by the section 45. The section 46 stores the coordinate value of the minimum point and the distance to the minimum point if the time difference for the minimum point is greater than a prescribed value. The coordinate value and the distance are renewed until the coordinate values for all points in the surface of the object are acquired. When the section 46 receives the coordinate value of the last point in the surface of the object (i.e., the data the PSD 42 has generated from the light beam emitted from the last LED of the array 40 and reflected from the object), it generates a data item representing the designating point. This data item is supplied to a display section (not shown). The display section displays a cursor which indicates the position of the point designated. The timing control section 47 generates a timing signal, which is supplied to the LED array control section 41, the distance calculating section 43 and the point determining section 46. The sections 47, 43 and 46 are thereby operated in synchronism with one another.

The minimum point detected by the minimum point detecting section 44 is regarded as the designating point set by the user. Why the minimum point is so used will be explained.

In order to remote-control an electronic apparatus, a user directs his or her hand toward the apparatus. Then, the data input device recognizes the tip of one finger (i.e., the middle finger in most cases) as the minimum point, because the tip of that finger is located nearer to the apparatus than any part of the user. An object may exist between the apparatus and the user's hand. In this case, any point in the surface of this object may be taken for the minimum point The data input device recognizes the tip of the finger as the minimum point, nonetheless, unless the object moves. This is because the time difference for the minimum point (i.e., the tip of the finger) is greater than a prescribed value as described above.

The LED array 40 and the LED array control section 41 will be described, with reference to FIG. 7. As shown in FIG. 7, the LED array 40 comprises light-emitting circuits 50, and the control section 41 comprises shift registers 54. Each light emitting circuit 50 has one LED. Upon receipt of a timing signal from the timing control section 47, each light-emitting circuit 50 emits a light beam. The section 47 comprises a clock generator 51, a frequency divider 52 and a pulse extractor 53. The clock generator 51 generates a pulse signal, and the frequency divider 52 divides the frequency of the pulse signal, thereby generating signal pulses. The pulse extractor 53 extracts one pulse from the signal pulses. The extracted signal pulse is supplied to the first light-emitting circuit 50, is delayed by the first shift register 54 and supplied to the second light-emitting circuit 50, is further delayed by the second shift register 54 and supplied to the third light-emitting circuit 50, and so forth. As a result, the LEDs are driven, one after another, emitting light beams non simultaneously.

The distance calculating section 43 will be described in more detail, with reference to FIG. 8. The output currents i1 and i2 of the PSD 60 are supplied to the section 43. In the section 43, two amplifiers 61 convert the current i1 and i2 into voltages and amplify the voltages, and two A/D converters 62 perform analog-to-digital (A/D) conversion on the amplified voltages. Even while no LEDs of the array 40 are emitting light beams, a current flows through the PSD 60 because the background light is applied to the PSD 60. The outputs of the A/D converters 62, each corresponding to the background-light current (hereinafter referred to as "background value"), are latched by two latch circuits 63. The background value is subtracted from the output which either A/D converter 62 generates when the LEDs emit beams, thereby eliminating the influence of background light. The frequency of latching the background value depends on the kind of the background light. The outputs of the A/D converters 62, each excluding the background value, are added. The resultant sum is supplied to a reciprocal generator 64. Using the sum as an address, the reciprocal generator 64 outputs a reciprocals which is supplied to a multiplier 65. The multiplier 65 multiplies the reciprocal by the difference between the background value and the output of the second A/D converter 62, which corresponds to the current i2. A constant multiplier multiplies the output of the multiplier 65 by the length of the resistive layer incorporated in the PSD 60 and interposed between the two electrodes from which the currents i1 and i2 are output. The resultant product is $C \times i2/(i1+i2)$ and represents the position which the beam reflected from the object assumes on the beam-receiving surface of the PSD 60.

The distance calculating section 43 is designed to calculate the distance D between the PSD 60 and the object. The distance D can be determined from the distance X by which the beam spot is spaced apart from one of the two extreme positions the beam spot may assume on the beam-receiving surface of the PSD 60. The distance D is given as: $D=k/(k+a)$. The parameters $\underline{k}$ and $\underline{a}$ for one LED are different from those for another LED, due to the positioning error of each LED and the positioning and orienting error of the system including the beam-applying and -receiving lenses. To calculate the distance D accurately in spite of this, calibration is performed on all LEDs, approximating parameters $\underline{k}$ for the LEDs and parameters $\underline{a}$ for the LEDs. The approximated parameters $\underline{k}$ are stored into a ROM 66, and the approximated parameters $\underline{a}$ into a ROM 67. The approximated parameters $\underline{k}$ and $\underline{a}$ for any LED are read from the ROMs 66 and 67, by using the coordinates of the LED as address The parameters $\underline{k}$ and $\underline{a}$, thus read, are applied, calculating the distance D.

FIGS. 9A through 9F illustrate a timing chart showing the output 70 from the PSD 60, the trigger signal 71 supplied to either A/D converter 62, the output 72 of either A/D converter 62, the trigger signal 73 supplied to either latch circuit 63, the output 74 of either latch circuit 63, and the output 75 excluding the background value. As can be understood from FIGS. 9A through 9F, the background value is latched in the latch circuit 63 before each LED emits a beam to the object, and the background value latched in the circuit 63 is subtracted from the output 70 of the PSD 60.

The output 70 of the PSD 60 is at a low level, i.e., background value, while no LEDs are emitting light and at a high level while any LED is emitting light. In other words, the output 60 alternates in its level because the LEDs of the array 40 are driven sequentially at regular intervals. The background value the PSD 60 outputs while no LEDs are emitting light after any LED has emitted light may be latched until the output 70 rises to a high level when the next LED emits light. This makes it possible to subtract the background value from the high-level output 70 the PSD 60 generates while the next LED is emitting light.

With reference to the timing chart of FIGS. 10A through 10F, it will be explained in greater detail how to subtract a background value from the output 80 of the PSD 60. As shown in FIGS. 10A through 10F, any background value the PSD 60 outputs is latched by the latch circuit 63 until the PSD 60 generates the next background value, by supplying a latch trigger signal 83 to the latch circuit 63. As a result, the latch circuit 63 generates an output 84 which has a specific waveform shown in FIGS. 10A through 10F. The background value latched is assumed to be constant and used to correct the high-level output 80 the PSD 60 generates while the LED is emitting light.

In the instance shown in FIGS. 10A through 10F, one background value is subtracted from four consecutive high-level outputs which the PSD 60 generates while four LEDs are emitting light one after another. Nonetheless, a background value may be subtracted from more consecutive high-level outputs of the PSD 60. (If the background value is subtracted from too many consecutive high-level outputs, however, the output 80 of the PSD 60 can no longer be corrected accurately when the object is illuminated with light which frequently alters in intensity like the fluorescent-lamp light.) This method can correct the output of the PSD 60 faster than the method explained with reference to FIGS. 9A through 9F.

Figure 11:
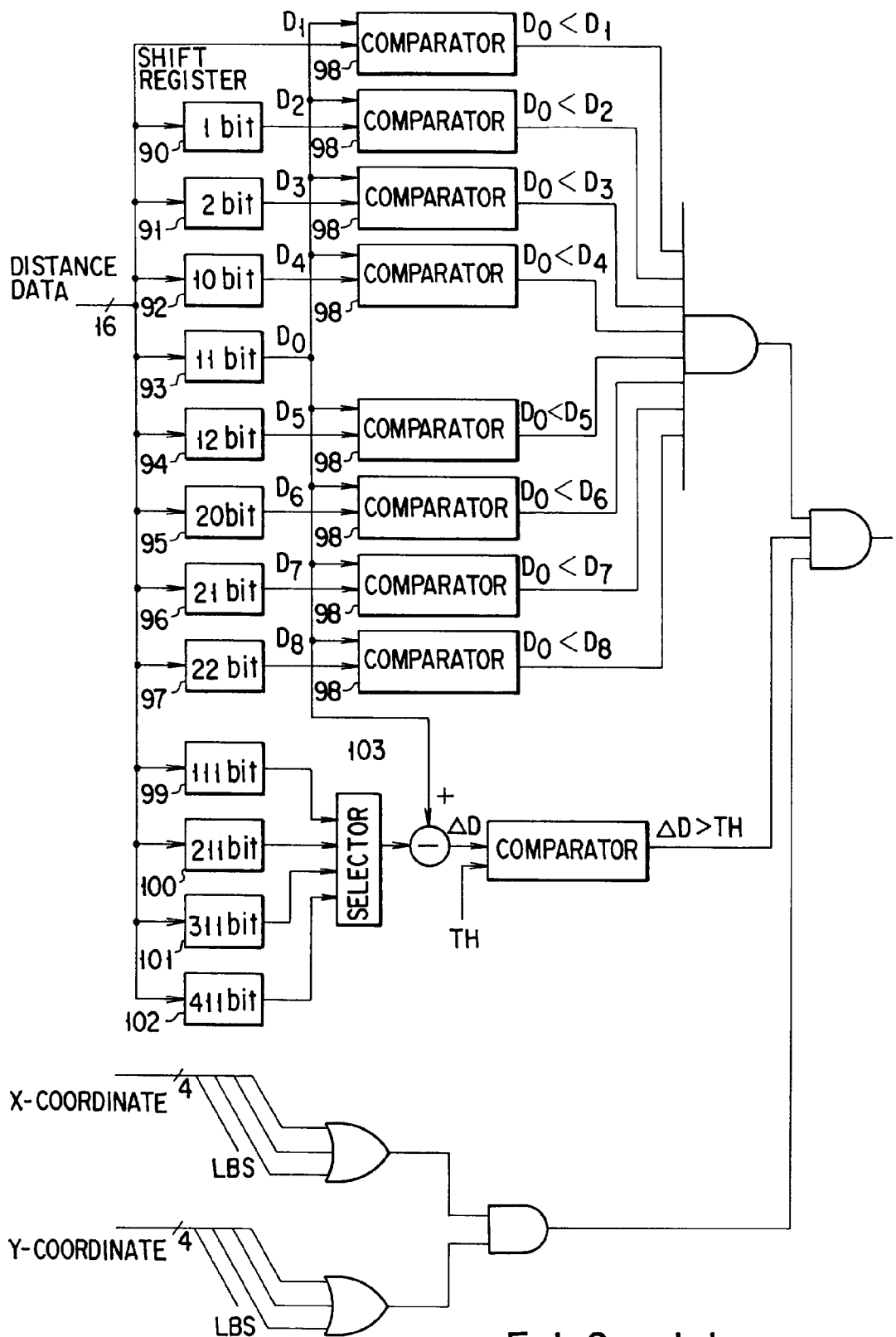
FIG. 11 is a detailed block diagram illustrating a point determining section shown in FIG. 6.

FIG. 11 is a diagram illustrating the unit incorporated in the first embodiment (FIG. 6). This unit is designed to find a point which is possibly identical to the designating point set by the user. Basically it finds a candidate point by delaying the distance data obtained by the distance calculating section 43, by means of shift registers and comparators. Assume that the LED array 40 has 100 LEDs arranged in 10 rows and 10 columns, forming a 10×10 LED matrix, and that distance values (0,0), (0,1), (0,2), . . . (0,9), (1,0), (1,1), . . . (9,9) are assigned to the 100 LEDs. To determine whether or not a point is the minimum one, it is necessary to acquire the distance values of the eleven following points. If the distance of a certain point is known, the eleven preceding points are examined and the results of examination are output.

As shown in FIG. 11, the unit has shift registers 90 to 102 which have different delay periods and which are arranged side by side. Of these shift registers, the shift register 93 having a delay period of 11 bits plays a main role in detecting the minimum point, because its output is the eleventh preceding the latest distance value acquired. Detection of the minimum point will be explained.

First, the distance data is input to the shift registers 90 to 97 which have delay periods of 1 bit, 2 bits, 10 bits, 11 bits, 12 bits, 20 bits, 21 bits, and 22 bits, respectively The shift register 93 generates a distance value D0, whereas the shift registers 90, 91, 92, 94, 95, 96 and 97 generate distance values D2 to D8. The distance value D0 is supplied to eight comparators 98. The distance data is supplied to the first comparator 98 as a distance value D1, and the distance values D2 to D8 are supplied to the other comparators 98. Hence, the eight comparators 98 compare the distance value D0 with the distance values D1 to D8, in order to determine the minimum point. Each comparator 98 outputs "1" when the distance value D0 is less than the other input distance value. When the outputs of all eight comparators 98, each being a logic sum of the two inputs, are "1", it is determined that the center point of the spatial region is the minimum point.

More precisely, the outputs of the comparators 98 are supplied to an eight-input AND circuit. The eight-input AND circuit generates "1" if the distance values D1 to D8 are all less than the distance value D0. The logic "1", thus generated, indicates that the center point of the spatial region is the minimum point. The logic sum of the outputs of the comparator 98 is supplied to a three-input AND circuit.

To find the time difference for the center point of the 3×3 matrix region, i.e., the minimum point, the distance data is input to the remaining four shift registers 99 to 102. These shift registers 99, 100, 101 and 102 have delay periods of 111 bits, 211 bits, 311 bits and 411 bits, respectively. Hence, their outputs represent the distance values of the center points of the four preceding frames of the image of the 3×3 matrix region. The outputs of the shift registers 99 to 102 are supplied to a selector 103. The selector 103 selects one of the outputs of the shift register 99 to 102. The output of the selector 103 is compared with the distance value D0 produced by the shift register 93, thereby providing the time difference ΔD for the center point of the 3×3 matrix region. The time difference ΔD is compared with a predetermined value TH by a comparator. The comparator outputs "1" if the difference ΔD is greater than the value TH. The output of this comparator is supplied to the three-input AND circuit.

As described above, the outputs of the shift registers 99, 100, 101 and 102 represent the distance values of the center points of the four preceding frames of the image of the 3×3 matrix region. The time difference between the center point and any one of these four distance values is therefore obtained. Hence, if additional shift registers are used together with the shift registers 99 to 102, it will be possible to compare the distance value of the center point of the 3×3 matrix region with the distance values of the center points of five or more preceding image frames.

Should the center point exist in an outermost row or an outermost column, it would be meaningless to see whether or not this point is the minimum point. Thus, the data representing the center point can be stored only if the center point exists in any other row or column. If the x- and y-coordinates of the point whose distance value is the last acquired have a value of 2 or more, the center point exists in neither an outermost row nor an outermost column. Therefore, unless the 4-bit data item representing either coordinate of the point having the latest distance obtained is either "0000" or "0001," a logic "1" indicating the minimum point is generated.

More specifically, all four bits defining the x-coordinate, but the least significant bit LBS, are input to a three-input OR circuit, while all four bits defining the y-coordinate, but the least significant bit LBS, are input to another three-input OR circuit. The three-input OR circuits generates "1" if at least one of three inputs is "1." The outputs of the OR circuits are supplied to a two-input AND circuit. The output of the two-input AND circuit is "1" if the three more significant bits of both x- and y-coordinates have logic value of "1." The output of the two-input AND circuit is supplied to the three-input AND circuit.

The three-input AND circuit outputs "1" if the coordinates of the center point defines the minimum point, if the time difference ΔD is greater than the predetermined value TH and if the center point exists in neither an outermost row nor an outermost column. In this case, the center point is used as a candidate of the designating point.

That section of the unit shown in FIG. 11 which determines whether or not the time difference ΔD is greater than the predetermined value TH, may be modified as illustrated in FIG. 12. The modified section determines whether or not four time differences are greater than the predetermined value TH. These four time differences are: difference $\Delta D_1$ between the present frame of the distance image and the first frame preceding the present frame; difference $\Delta D_2$ between the first and second preceding frames of the image; difference $\Delta D_3$ between the second and third preceding frames of the image; and difference $\Delta D_4$ between the third and fourth preceding frames of the image. Namely, the modified section of FIG. 12 determines whether or not the object keeps moving toward the electronic apparatus which the user is to remote-control.

The number of frames among which to detect time differences or the time interval at which to detect time differences, or both the number and the time interval may be changed easily. For example, the predetermined value TH may be compared with four time differences, which are: difference between the present frame of the distance image and the second frame preceding the present frame; difference between the second and fourth preceding frames of the image; difference between the fourth and sixth preceding frames; and difference between the sixth and eighth preceding frames of the image. For another example, the predetermined value TH may be compared with five time differences, which are: difference between the present frame of the distance image and the fourth frame preceding the present frame; difference between the fourth and eighth preceding frames of the image; difference between the eighth and twelfth preceding frames; difference between the twelfth and sixteenth preceding frames of the image; and difference between the sixteenth and eighteenth preceding frames of the image.

The point determining section 46 incorporated in the first embodiment (FIG. 6) will be described in detail, with reference to FIG. 13. The section 46 is designed to determine the coordinates of the minimum point which is closer to the apparatus than any other minimum point whose time differences is greater than the predetermined value TH. (Hereinafter, the minimum points, each having a time difference greater than the value TH will be referred to as "candidate points.") As shown in FIG. 13, the point determining section 46 comprises a comparator 111 and three flip-flop circuits 110, 112 and 113.

The flip-flop circuit 110 holds the distance value of the candidate point which has been found the closest to the apparatus. If a candidate point closer to the apparatus is input to the point determining section 46, its distance value will be held in the flip-flop circuit 110, replacing the distance value held thus far. The comparator 111 compares the distance value held in the flip-flop circuit 110 with the latest distance value input to the point determining section 46. If the latest distance value is less than the distance value held in the flip-flop circuit 110, the comparator 111 outputs "1." The output of the comparator 111 is supplied to a two-input AND circuit. Meanwhile, the output of the minimum point detecting section 44, or a storage-instructing flag, is supplied to the two-input AND circuit. The two-input AND circuit generates a logic sum of the output of the comparator 111 and the storage-instructing flag. If the logic sum is "1," the distance value held in the flip-flop circuit 110 is replaced by the latest distance value. If the logic sum is "0," the distance value held in the flip-flop circuit 110 is not replaced by the latest distance value. The storage-instructing flag indicates whether or not the output of the shift register 99 (FIG. 11) having the delay period of 11 bits represent a candidate point. This means that the distance value input to the point determining section 46 is the output of the shift register 99.

At the same time the distance value is input to the flip-flop circuit 110, the coordinate value of the candidate point is input to the flip-flop circuit 112. In the flip-flop circuit 112, the coordinate value is replaced by the latest coordinate value supplied to the section 46, at the same time the distance value held in the flip-flop circuit 110 is replaced by the latest distance value. The coordinate value now held in the flip-flop circuit 112 corresponds to the output of the shift register 92 (FIG. 11) which has a delay period of 10 bits.

Immediately after all LEDs of the array 40 emit light, the point determining section 46 determines the candidate point which exists in the frame of the distance image and which is the closest to the electric apparatus. More precisely, the section 46 determines the closest candidate point in a frame after the eleventh LED emits light for the next frame. After all LEDs of the array 40 emit light, the closest candidate point is held in the flip-flop circuit 113, so as to be used as the designating point set by the user.

The second embodiment of this inventions which is also a data input devices will be described with reference to FIG. 14.

Figure 14:
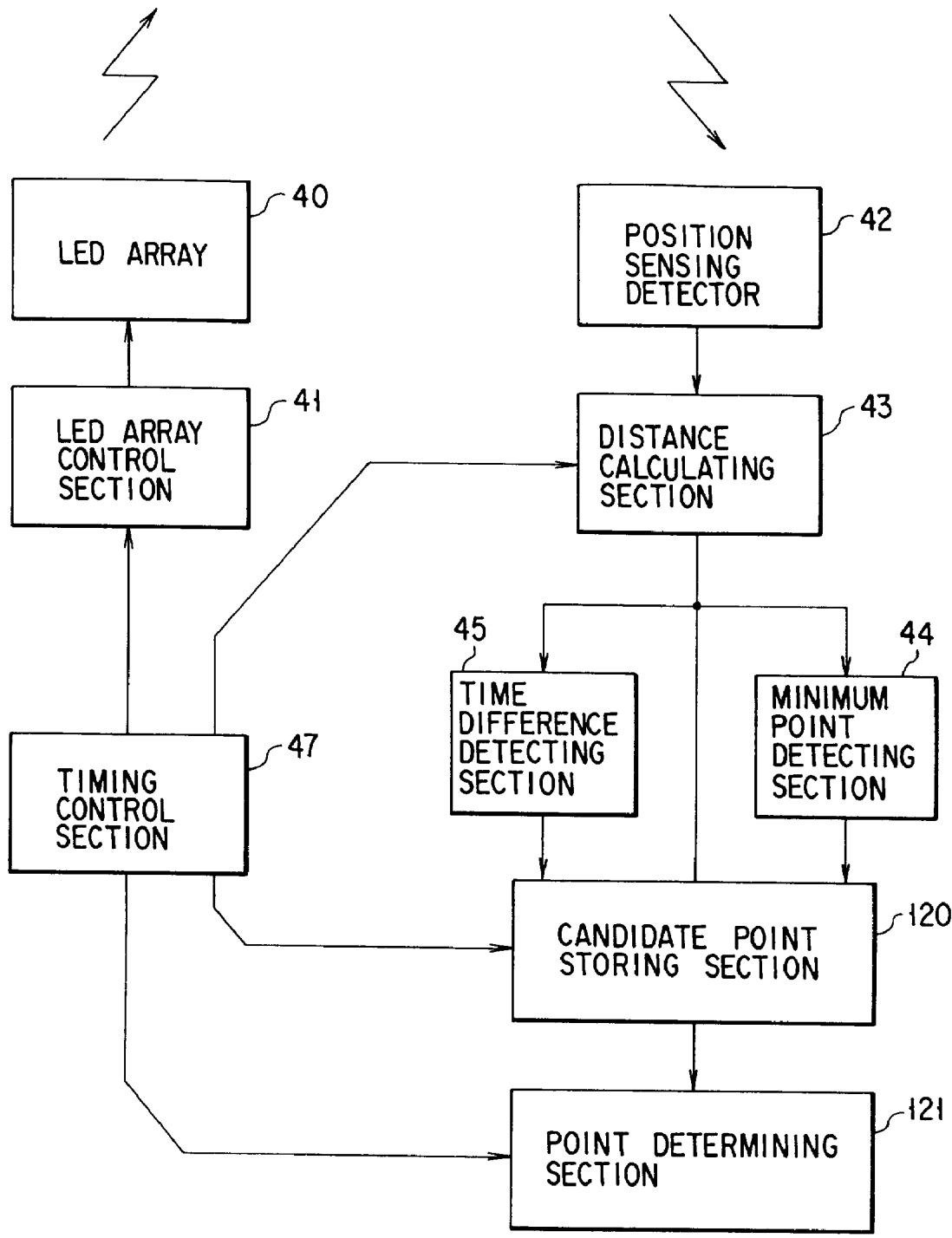
FIG. 14 is a block diagram showing a data input apparatus according to a second embodiment of the present invention.

The second embodiment differs from the first embodiment in that a candidate point storing section 120 is connected to the input of a point determining section 121 as illustrated in FIG. 14. The candidate point storing section 120 is designed to store data items representing n candidate points whose time differences are greater than a predetermined value and whose distance values are smaller than those of any other candidate points. The point determining section 121 determines which one of the n candidate points is closest to an electronic apparatus which the user wishes to remote-control.

The candidate point storing section 120 will be described in details with reference to FIG. 15. The section 120 is provided to hold the distance values and coordinate values of the three candidate points which are closer to the electronic apparatus than any other candidate point. The section 120 comprises three data-storing units each consisting of a flip-flop circuit, a switch, a switch control circuit and a latch circuit. It may comprise fewer or more data-storing units.

The distance values of candidate points are sequentially input to the candidate point storing section 120. So are the coordinate values of the candidate points. The three smallest data items Q1, Q2 and Q3 representing three candidate points are sequentially input to and held in the flip-flop circuits 130 to 132.

In the first data storing unit, the switch control circuit 133 compares the data item Q1 held in the flop-flop circuit 130 with the new input data item, and the data item representing the smaller distance value is held in the flip-flop 130, whereas the data item representing the greater distance value is supplied to the second data-storing unit. In the second data storing unit, the switch control circuit 134 compares the data item Q2 held in the flop-flop circuit 131 with the new input data item, and the data item representing the smaller distance value is held in the flip-flop 131, whereas the data item representing the greater distance value is supplied to the third data-storing unit. In the third data storing unit, the switch control circuit 135 compares the data item Q3 held in the flop-flop circuit 132 with the new input data item, and the data item representing the smaller distance value is held in the flip-flop 132.

That is, the switch control circuit 133 connects the switches 136 and 137 to "1" contacts when the distance value of the input data X1 is less than the data item Q1 containing the distance value; otherwise, it connects the switches 136 and 137 to "0" contacts. As the switch 137 is connected to the "1" contact, data X2 which is either the input data X1 or the data item Q1 is supplied from the first data storing unit to the second data storing unit. The switch control circuit 134 compares the data X2 with the data item Q2. If the data X2 is less than the data item Q2, the circuit 134 connects the switches 138 and 139 to the "1" contacts. Otherwise, the circuit 134 connects the switches 138 and 139 to the "0" contacts. As the switch 138 is connected to the "1" contact, data X3 which is either the data X2 or the data item Q2 is supplied from the second data storing unit to the third data storing unit. The switch control circuit 135 compares the data X2 with the data item Q3 and changes over the switch 140 to cause the flip-flop 132 to hold the data X3 or Q3, which is less than the other. Upon lapse of a delay period, the inputs to the flip-flop circuits 130 to 132 become stable. At this time a clock signal CK1 is supplied to the flip-flop circuits 130 to 132, thereby renewing the data items all at once in the flip-flop circuits 130 to 132.

A storage-instructing flag (not shown), i.e., a flag of the type shown in FIG. 13, is input to an input section shown in FIG. 16. More specifically, the flag is supplied to an inverter, the output of which is supplied to a two-input OR circuit. In the meantime, the distance data is supplied to the two-input OR circuit. Hence, if the flat is "0" (namely, if the input data is not a candidate point), the distance value is maximal (that is, the constituent bits are all "0s"). The maximum distance value cannot be stored in the candidate point storing section 120, even if it is input thereto.

Immediately after all LEDs emit light, the flip-flop circuits 130 to 132 store three data items which represent three candidate points which have distance values less than that of any other candidate point existing in the frame of the distance image. The three data items are latched by the latch circuits 141 to 143 of the three data storing units, respectively. When these data items are latched will be explained, with reference to the timing charts of FIGS. 17A through 17D and 18A through 18F. When the data X1 is input to the candidate point storing section 120, the inputs to the three flip-flop circuits 130 to 132 sequentially change to be delayed. When the input to all flip-flop circuits 130 to 132 become stable, a trigger signal CK 1 is supplied to the flip-flop circuits, thereby renewing the data items all at once in the flip-flop circuits 130 to 132, as is illustrated in FIGS. 17A through 17D. In the third embodiment, the LED array has 100 LEDs. Therefore, one trigger signal CK2 is input for these 100 LEDs. The data items in the latch circuits 141 to 143 are thereby renewed every time all 100 LEDs emit light, as can be understood from FIGS. 18A through 18F.

The point determining section 121 determines the designating point from the data items stored in the candidate point storing section 120, by performing two processings. The first processing is to detect the appearance of a minimum point to track (i.e., the tip of the user's finger) The second processing is to track the minimum point detected. The first processing and the second processing will be called "point detecting" and "point tracking," respectively. The point detecting is carried out until any minimum point is recognized. Once a minimum point appears, the point tracking is started. When the minimum point can no longer be tracked, the point detecting is performed again.

Figure 19:
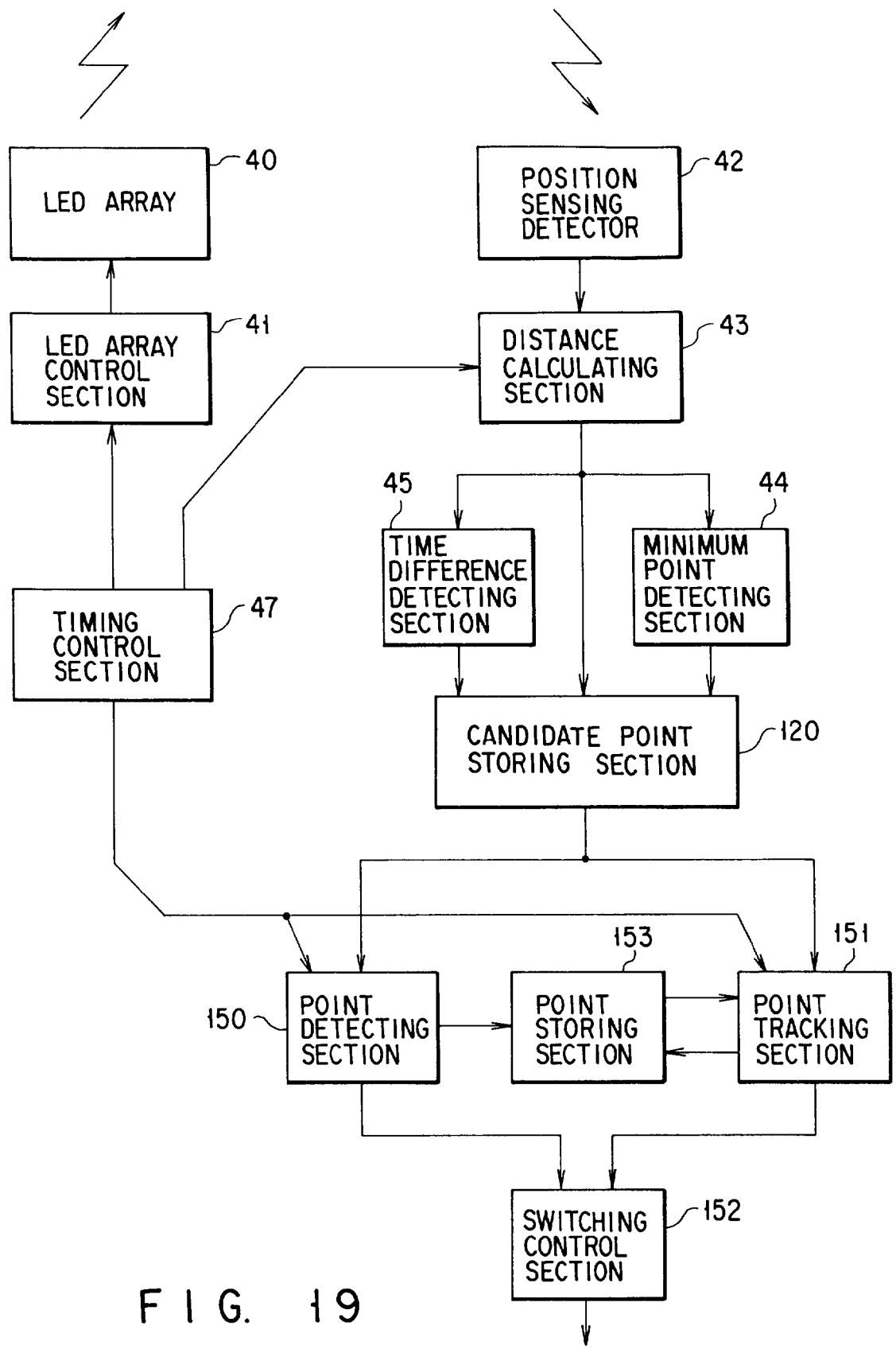
FIG. 19 is a block diagram, in which the point determining section shown in FIG. 14 is illustrated in detail.

The point determining section 121 shown in FIG. 14 will be described in detail, with reference to FIG. 19. As FIG. 19 shows, the section 121 comprises a point detecting section 150, a point tracking section 151, a point switching control section 152 and a point storing section 153.

The point detecting section 150 performs the point detecting. To be more specific, if there are minimum points having time differences greater than a predetermined value, the section 150 detects one of these minimum points which has the least distance value. The minimum point detected is regarded as the designating point. If there are no minimum points which have time differences greater than the predetermined value, the section 150 determines that there is no designating point. The point tracking section 151 tracks the designating point detected by the point detecting section 150. More precisely, the section 151 finds the minimum point closest to the designating point, and this minimum point is regarded as a new designating point. The new designating point is found, based on not only its coordinates but also its distance data. The point switching control section 152 selects either the output of the point detecting section 150 or that of the point tracking section 151, in accordance with the condition present. If no designating point has been detected, the section 152 outputs nothing at all or a signal indicating that no designating point signal has been detected. In this case, the switching control section 152 monitors the output of the point detecting section 150.

Figure 15:
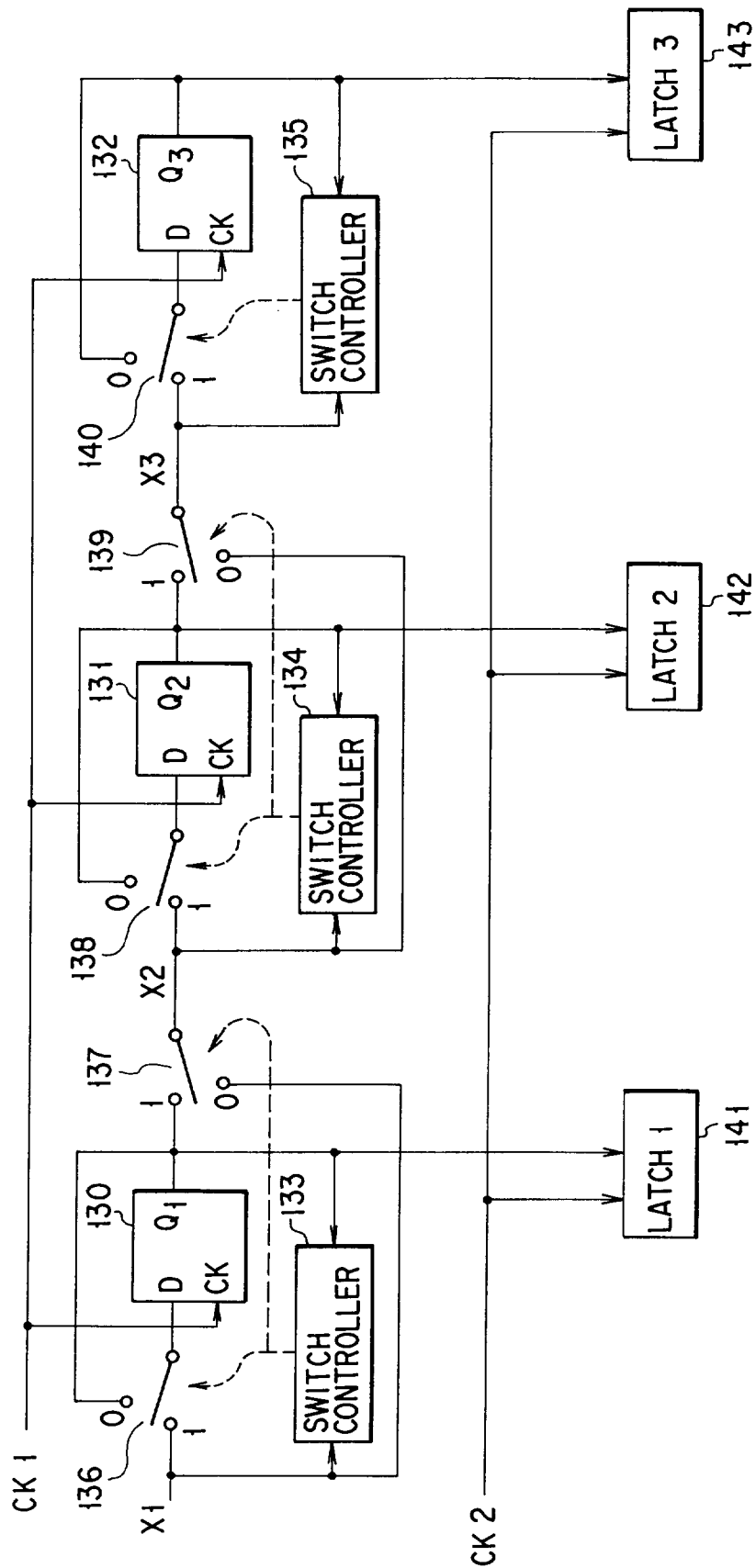
FIG. 15 is a diagram illustrating the candidate point storing section shown in FIG. 14.

If effective data exists in the latch circuit 141 shown in FIG. 15, the point detecting section 150 outputs this data which represents the designating point detected. The data is stored into the point storing section 153. When the section 150 detects the designating point, the switching control section 152 selects and outputs the output of the point tracking section 151. The point tracking section 151 compares the designating point stored in the point storing section 153 with the candidate points input and outputs the candidate point which is the closest to the designating point. If all candidate points are spaced away from the designating point by distances longer than the predetermined value, the section 151 outputs a signal which indicates that it has failed to find the designating point. This signal is supplied to the switching control section 152. Upon receipt of the signal, the section 152 starts monitoring the output of the point detecting section 150.

In the point determining section 121, the point detecting and the point tracking are repeated alternately as has been described above.

Figure 20:
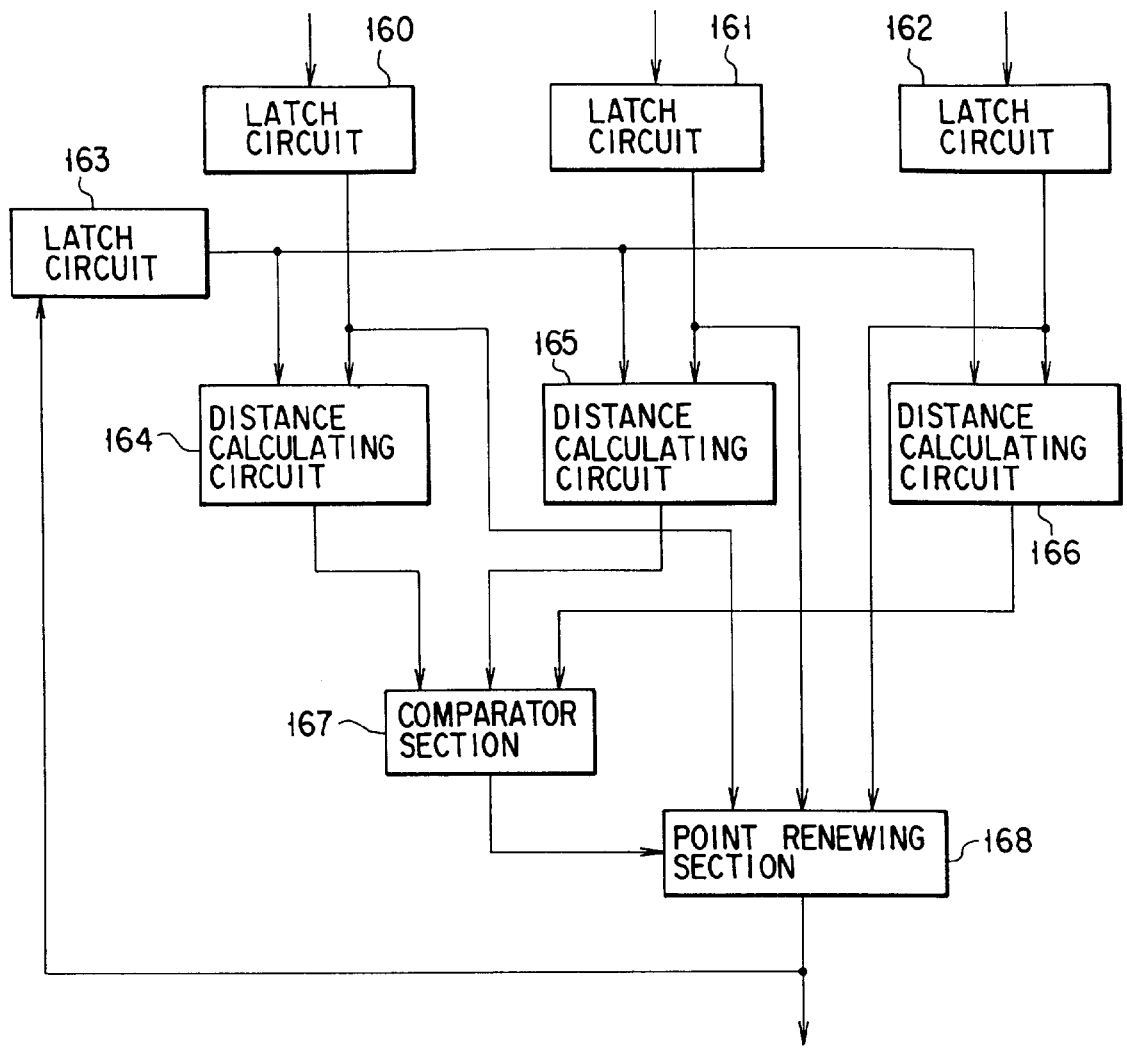
FIG. 20 is a block diagram showing the point tracking section shown in FIG. 14.

The point tracking section 151 and the point storing section 153 will be described in detail, with reference to FIG. 20. The latch circuits 160, 161 and 162 shown in FIG. 20 correspond to the latch circuits 141, 142 and 143 shown in FIG. 15. The latch circuit 163 shown in FIG. 20, which corresponds to the point storing section 153 shown in FIG. 19, holds the designating point detected. When three data items representing three candidate points are input to the latch circuits 160 to 162, distance calculating circuits 164, 165 and 166 calculate the distances between the designating point, on the one hand, and the three candidate points, on the other. The distances calculated by the circuits 164 to 166 are supplied to a comparator section 167. The section 167 compares these distances, determining which distance is the shortest. The distance determined to be the shortest is selected by a point renewing section 168. The data item representing the shortest distance is held in the latch circuit 163 to be used in the next point tracking.

The point detecting and the point tracking are repeated until the designating point is correctly detected. Once detected, the designating point can be tracked with high accuracy. In the case where there is much background noise, it is difficult to detect the tip of the user's finger (i.e., the designating point) with accuracy. To enable the point determining section 121 to detect the tip of his user's finger accurately, the user may move the finger (for example, as if to draw a circle). If the user so moves the finger, the accuracy of detecting the designating point will be increased. Once the point-detecting accuracy is thus increased, the point determining section 121 can operate with an increased efficiency because the background noise scarcely influences the point tracking.

Figure 21:
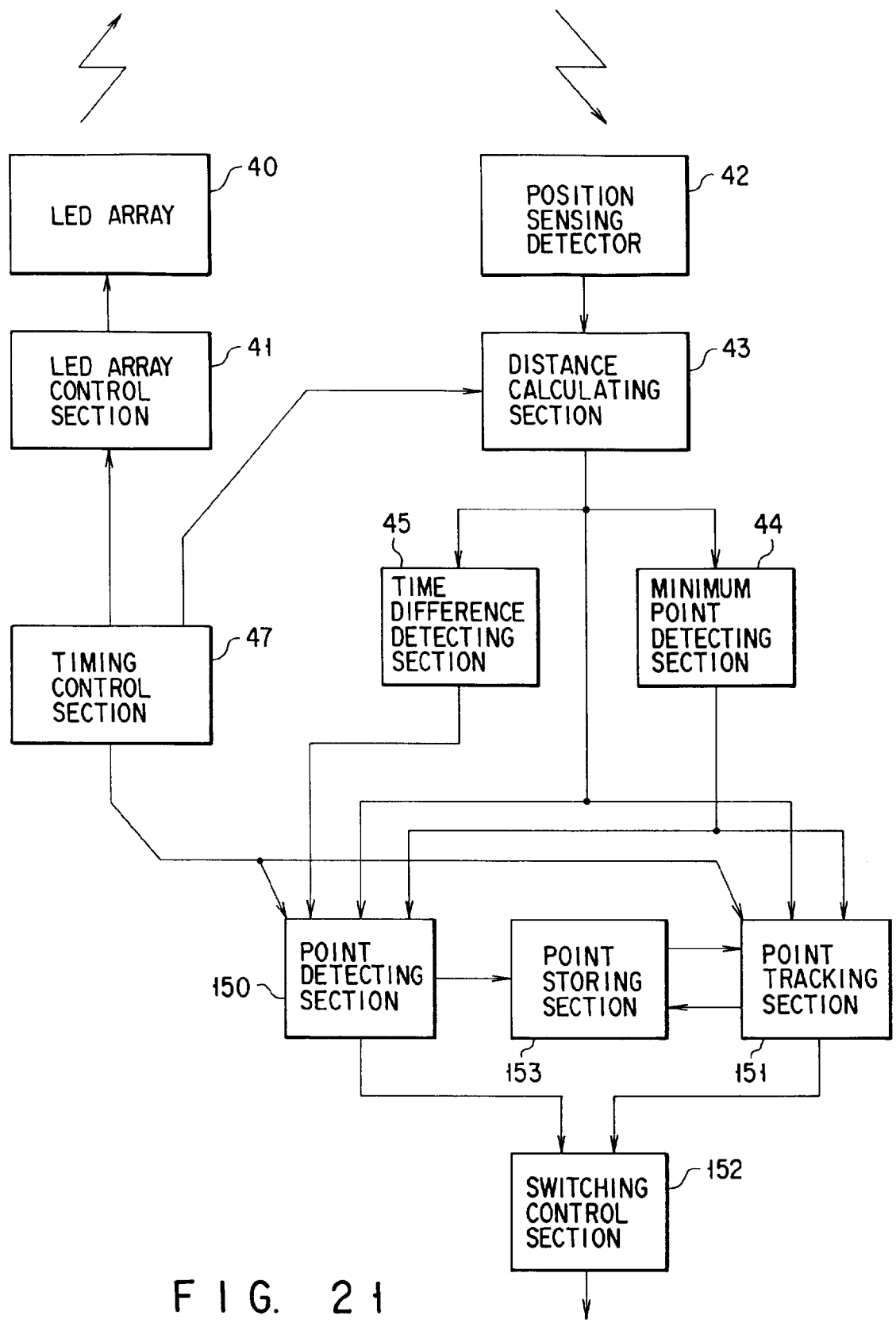
FIG. 21 is a block diagram showing a modification of the second embodiment.

For the second embodiment it is difficult to keep tracking the tip of the user's finger once the user has stopped moving the finger. To track the tip of the finger even if the finger is not moved, the second embodiment may be modified as is illustrated in FIG. 21. The modified data input device differs in that it has no component equivalent to the candidate point storing section (FIG. 18). Therefore, no time differences affect the point tracking, and the modified device can track the designating point without fail.

The present invention is not limited to the two embodiments described above. Rather, it can be applied to many other embodiments which differ in part from the above embodiments.

In each embodiment described above, the light-emitting section has an LED array for emitting light beams, and the light beams emitted are applied through the light-applying lens into the spatial region in which an object exists. The section may be replaced by various alternative light-emitting sections, which will be described below.

A first alternative light-emitting section comprises a plurality of light-emitting units arranged in rows and columns, each consisting of an LED and a lens and capable of applying a thin beam. This light-emitting section can scan a larger spatial region and is advantageous over its equivalents incorporated in the first to third embodiments. A second alternative light-emitting section comprises an LED array and molded micro-lens array covering the LED array. A third alternative light-emitting section comprises light-emitting elements which can emit light beams in specified directions. A fourth alternative light-emitting section comprises a light source, a plate having apertures, and a mechanical or electronic device for directing the light beams emanating from the plate.

Figure 22:
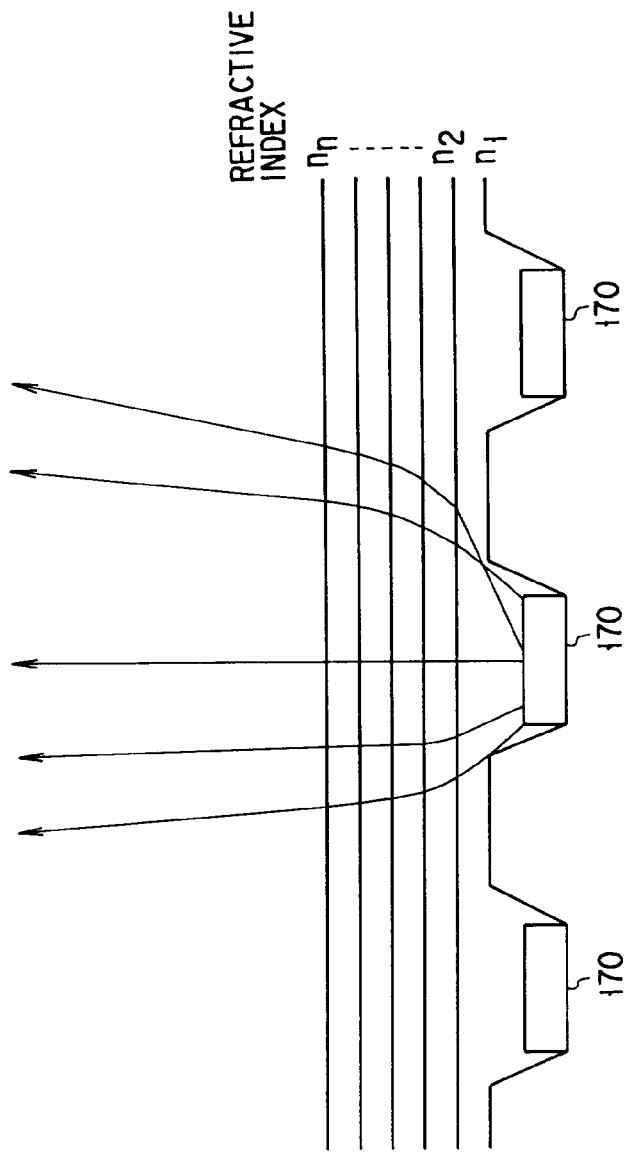
FIG. 22 is an alternative light-emitting section in the second embodiment.

FIG. 22 illustrates a fifth alternative light-emitting section. This section comprises light-emitting units 170 and transparent layers coated on the units 170, one upon another. The units 170, such as LED chips, are arranged in rows and columns. The transparent layers have different refractive indexes $n_1, n_2, \ldots n_n$. $n_1 < n_2 < n_3 < \ldots < n_n$. The light-emitting section need not have a number of tiny lenses. Furthermore, this light-emitting section can be made small since the adjacent units 170 can share a light-passing region.

Further, there are alternative methods of determining the designating point, which can be employed in the data input device according to the present invention. When the data input device according to the invention is used in a household, it may be greatly influenced by the background light and the foreground light. The designating point is determined from the distance and time difference of the minimum point in the first to third embodiments. Nonetheless, the designating point can be determined by some other methods.

A simple alternative method is to use only the minimum point in the distance image. This method can be carried out by simplified circuits and, hence, at a low cost, though it is susceptible to the influence of noise. It proves quite effective when applied in a narrow spatial region. Besides, several methods of reducing the noise are available.

Another alternative method is to determine the designating point by inferring the size and motion of the object. The shorter the distances of all conceivable points in the spatial region, the more likely is it that the spatial region is a single body. Thus, it is possible to determine the size of the body, provided the distances of all points in the spatial region are known. The size of the body can be applied to eliminate noise which is made when a person runs or an insect flies in front of the user.

Figure 23:
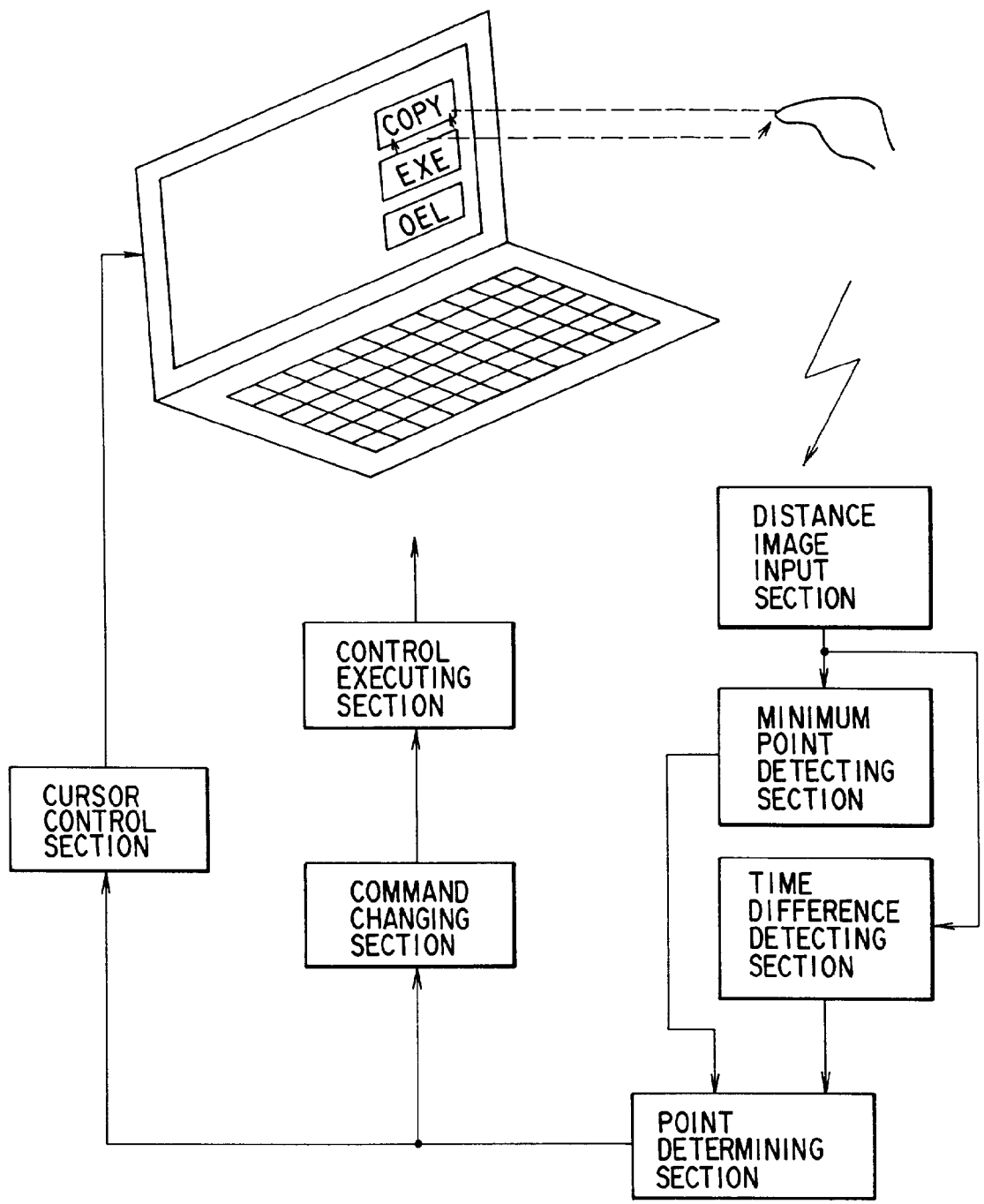
FIG. 23 is a diagram showing a data input apparatus according to a third embodiment of the present invention, which is designed to control the cursor in a menu screen in accordance with the motion of a designating point.

The first and second embodiments detect and track the designating point set by the user. In practice it is desired that a data input device recognize the user's intention. For example, the device should move a cursor in a display screen, thereby to designate a certain region of the screen or select one of the menu items displayed on the screen in accordance with the user's hand signal, as is illustrated in FIG. 23. Further, the device should write characters or draw pictures in the display screen, in accordance with the motion of the tip of the user's finger.

To be more specific, various commands may be generated in different ways by using different algorithms. One algorithm is to generate commands in accordance with the locus of a designating point, for instance, when the designating point is moved, thus moving the cursor to one of the menu items displayed on the display screen, and is then stopped for a time longer than a prescribed value, thereby holding the cursor at that menu item for that period. In this case, the menu item is displayed in a specific color or in blinking fashion, indicating to the user that the menu item is a candidate command to be executed. When the designating point is moved thereafter, toward the apparatus to remote-control, upwards, or in a circle, the candidate command is executed.

Another algorithm is to generate commands in accordance with the shape of the object (e.g., the user's hand) recognized, for example, when the user opens and moves his or her hand to move the cursor on the display screen to a desired one of the menu items displayed thereon and then closes his or her hand thereby to select the desired menu item. Further, the user may hold up one finger to set the cursor-moving speed at a certain value and two fingers to set that speed at a greater value.

Commands can be generated, by using a control panel or a decorative panel on the apparatus to remote-control which is not a display. The control panel has push buttons, and the decorative control panel has fake buttons painted on it. A green lamp and a red lamp are provided at each button, either real or virtual. To select one of the functions the apparatus can performs the user may point one of the buttons with a finger. When he or she points the button, the data input device turns on the green lamp at this button. If the user moves the finger, pointing another button, the data input device turns off the green lamp and turns on the green lamp located at the newly pointed button. This enables the user to know which button he or she has selected. If the user keeps pointing the button longer than a prescribed time, the data input device turns off the green lamp and turns on the red lamp provided at the button being pointed. The moment the red lamp is turned on, the apparatus starts performing the function selected. Requiring no display, this method of generating commands helps to reduce the manufacturing cost of the apparatus since a display is expensive.

Measures should be taken to make the user perceive that the tip of his or her finger is aligned with the cursor on the display screen or the desired button on the control panel (real or decorative). More specifically, the display input device may cause the display to display a cursor at a specified position on the screen (e.g, the center of the screen) or to cause a specified one of the buttons to emit light—upon detecting the designating point, i.e., the tip of the user's finger. Hence, the cursor is displayed at the center of the screen or the specified button emits light when the user points the center of the screen or the specified button. The user can therefore estimate, with fairly high accuracy, the angle between his or her line of vision and a line connecting his or her eyes and the cursor or the green lamp.

The data input device may generate an audio feedback, informing the user that the desired function has been duly selected. For instance, the device causes the apparatus to generate sound if the user holds the cursor at the desired menu item or keeps pointing the button (either real or virtual) longer than a prescribed times telling the user that the desired function has been selected. If the user further holds the cursor at the menu item or points the button, the apparatus will perform the function selected.

A third embodiment will now be described.

Figure 24:
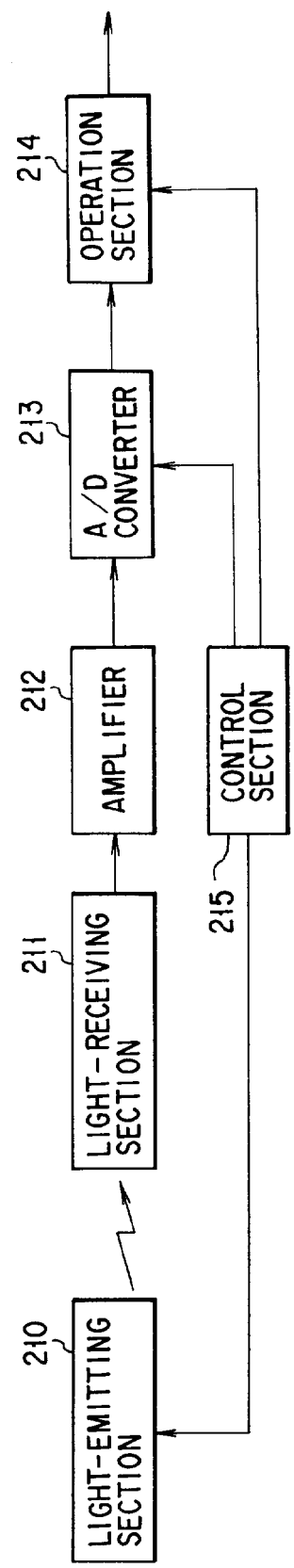
FIG. 24 is a block diagram illustrating an arrangement of a distance image input section according to the third embodiment of this invention.

As shown in FIG. 24, the distance image input section shown in FIG. 23 comprises a light-emitting section 210, a light-receiving section 211, an amplifier 212, an A/D converter 213, an operation section 214, and a control section 215. The light-emitting section 210 includes the LEDs and a circuit for driving the LEDs. The light-receiving section 211 is the PSD. The output current of the section 211 is supplied to the amplifier 212 and amplified thereby. The current amplified is supplied to the A/D converter 213, which converts the input current into a digital signal. The processing section 214 processes the digital signal into a distance value. The control section 215 controls the operating timing of the light-emitting section 210, the A/D converter 213 and the processing section 214.

It would be quite rare that the room gets dark, in which an electronic apparatus is installed to be controlled by using the data input device. The light-receiving section 211 therefore generates a current even if the light-emitting section 210 emits no light at all. The current the section 211 generates in this condition will result in an error in the calculation of the distance D to the object. To prevent this error it suffices to subtract this current from the current the section 211 generates while the section 210 is emitting light. That is, the A/D converter 213 converts the output of the light-receiving section 211 into a digital signal, first right before the section 210 emits light and then when output of the PSD becomes stable while the section 210 is emitting light, and the operating section 214 finds the difference between the two consecutive digital signals generated by the A/D converter 213. Thus, the processing section 24 provides an output excluding the background value.

The object may be illuminated by a fluorescent lamp which emits light regularly altering in intensity. In this case, the current the light-receiving section 211 generates changes, no matter whether the light-emitting section 210 is emitting light or not. Consequently, the output current of the section 211 may change between the time the A/D converter 213 is triggered before the section 210 emits light and the time the converter 213 is triggered when output of the PSD becomes stable. To prevent an error in the calculation of the distance D from the outputs of the A/D converter 213, the A/D converter 213 may be triggered three times as illustrated in FIG. 25C—first right before the section 210 emits light, then when output of the PSD becomes stable while the section 210 is emitting light, and finally right after the section 210 stops emitting light. The processing section 214 obtains the mean value of the two outputs the A/D converter 213 generates before and after the section 210 emits light and subtracts this mean value from the output the converter 213 generates while the section 210 omits light. This method helps to calculate the distance D more correctly.

The influence of the background light may be canceled in another method, by means of a circuit shown in FIG. 26. This circuit comprises two sample-and-hold circuits 221 and 222, two subtracters, and one adder. The amplifier 220 and the A/D converter 223, both shown in FIG. 26, are identical to the amplifier 212 and A/D converter 213 illustrated in FIG. 24. As shown in FIGS. 27A through 27E, the first sample-and-hold circuit 221 samples and holds the signal the amplifier 220 outputs immediately before the light-emitting section 210 emits light and the second sample-and-hold circuit 222 samples and holds the signal the amplifier 220 outputs while the section 210 is emitting light. As shown in FIGS. 27A through 27E, too, the A/D converter 223 is triggered right after the section 210 emits the light.

Since the light-receiving section 211 is a position sensor detector (PSD), the data input device can detect the position of the designating point, regardless of the amount of light the section 211 has received. If the amount of light is inadequate, however, the device cannot detect the position of the designating point with sufficient accuracy. Suppose the object is so far from the light-emitting section 210 that the section 211 receives but a small amount of light reflected by the object. Then, the position of the designating point detected may greatly differ from the actual position.

FIG. 28 shows a distance image input section which determines that the distance to the designating point is very long if the amount of light received is very small. As shown in FIG. 28, this distance image input section comprises a light-emitting section 230, a light-receiving section 231, an amplifier 232, an A/D converter 233, a magnitude determining section 234, an operation section 235, and an output section 236.

Assume that the background value is removed from either output current of the light-receiving section 231 (i.e., PSD) before the current is supplied to the A/D converter 233. The A/D converter 233 converts the currents supplied from the electrodes of the PSD into digital signals. The digital signals are supplied to both the magnitude determining section 234 and the operation section 235. The operation section 235 calculates the distance to the designating point, from the digital signals, and outputs a distance signal representing the distance. Meanwhile, the magnitude determining section 234 adds the digital signals together and compares the resultant sum with a threshold value. If the sum is less than the threshold value, the section 234 outputs a signal. This signal is supplied to the output section 236. If the section 236 receives no signal from the magnitude determining section 234, it outputs the distance signal. If the section 236 receives a signal from the section 234, it outputs a signal representing the maximum distance at which the designating point may exist. Alternatively, the section 236 may output a signal which indicates that the point is located at an excessively long distance.

The background light may abruptly increase in intensity, causing the PSD to generate an abnormally large output. In view of this, it is desired that the magnitude determining section 234 be designed to detect that the output of the PSD is excessively small or large. If the PSD output is excessively small, the output section 236 outputs a signal representing the maximum distance at which the designating point may exist. On the other hand, if the PSD output is excessively large, the output section 236 outputs a signal indicating that the distance to the designating point cannot be determined. If the PSD output is neither excessively small nor large, the output section 236 outputs the output signal of the operation section 235.

A first modification of the first embodiment (FIG. 1) will be described, with reference to FIG. 29. As shown in FIG. 29, the modified data input device comprises a distance image input section 240, a minimum point detecting section 241, a minimum point selecting section 242, and a processing section 243. The modified device is characterized in that the sections 241 and 242 are provided in place of the distance image analyzing section 202.

The tip of the user's finger is equivalent to a minimum point which has the least distance value of all conceivable points in the distance image. The position of the finger tip cannot be determined unless the minimum point is detected. Some minimum points other than the one equivalent to the user's finger tip exist in the distance image. Means is required to determine which minimum point corresponds to the tip of the user's finger. There may be no minimum point which corresponds to the user's finger tip, though minimum points corresponding to other entities exist in the distance image. It should be determined that the distance image has no minimum point which is equivalent to the finger tip. The minimum point selecting section 242 determines whether or not there is no minimum point equivalent to the finger tip, from the data items (i.e, coordinate values and distance values) representing minimum points and generated by the minimum point detecting section 241. If the section 242 determines that there is no minimum point equivalent to the finger tip, it generates data representing this fact. This data is supplied to the processing section 243.

FIG. 30 shows a second modification of the first embodiment which is similar to the first modified device shown in FIG. 29. The second modification differs in that the output of the distance image input section 240 is connected to not only the minimum point detecting section 241 but also to the minimum point selecting section 242. Hence, the minimum point selecting section 242 determines whether or not there is no minimum point equivalent to the finger tip, not only from the data items generated by the minimum point detecting section 241, but also from the distance image output by the distance image input section 24. If the section 242 determines that there is no minimum point equivalent to the finger tip, it generates data representing this fact. This data is supplied to the processing section 243.

FIG. 31 illustrates a third modification of the first embodiment. As shown in FIG. 31, the third modified device comprises a distance image input section 250, a point motion detecting section 251, a minimum point detecting section 252, a minimum point circumference analyzing section (hereinafter referred to as an object analyzing section) 253, a minimum point selecting section 254, and a processing section 255. This modified device is characterized in that the sections 251, 252 and 253 are provided in place of the distance image analyzing section 2 (FIG. 1). The minimum point detecting section 252 finds one or more minimum points in the distance image output from the distance image input section 250 and generates data items representing the minimum points in each frame of the image. The point motion detecting section 251 determines the positional relation between each minimum point in one frame and the corresponding minimum point in the preceding frame, thereby detecting the distance and direction in which the minimum point has moved. The section 251 can detect how each minimum point has moved in a plane, based on the coordinate data of the minimum point. Alternatively, it can detect how each minimum point has moved in a space, based not only on the coordinate values of the minimum point but also on the distance values thereof.

Figure 32:
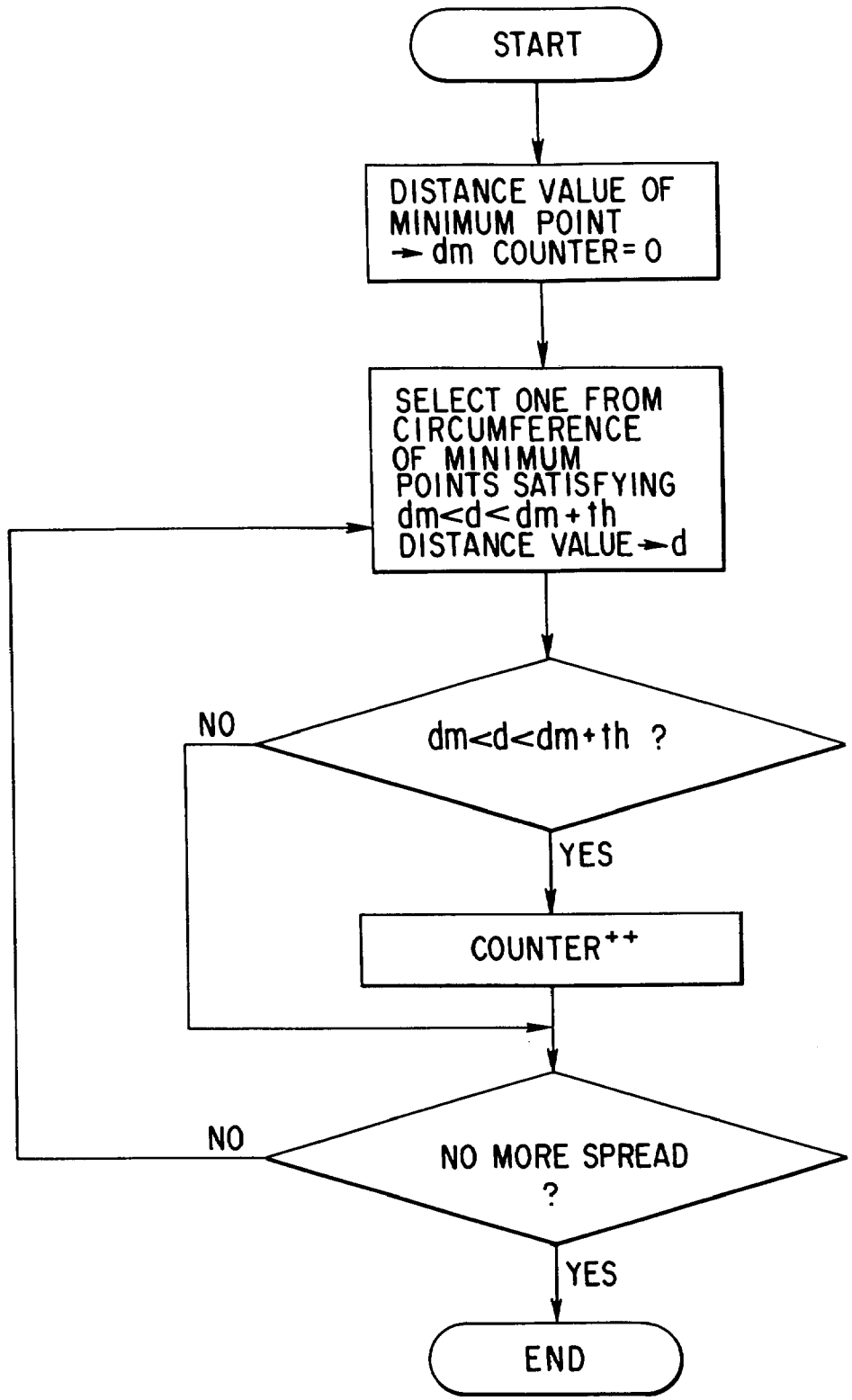
FIG. 32 is a flowchart showing a process when the minimum point circumference analyzing section is implemented by a program.

The object analyzing section 253 detects the shape and orientation of the object on which minimum points exist. For example, as shown in the flow chart in FIG. 32, the section 253 finds points existing near one minimum points which have distance values d given as follows:

$$dm < d < dm + th$$

where dm is the distance value of the minimum point and th is a threshold distance. These points are counted. From the number of these points and the distance value dm of the minimum point, it is determined whether the object is a pointed one or not. In other words, the object analyzing section 253 calculates areas s1 and s2, both illustrated in FIG. 33. As may be understood from FIG. 33, the area s1 is measured in a plane at the threshold distance th from the foremost point of a first object, while the area s2 is measured at a plane at the threshold distance th from the foremost point of a second object. Since the area s1 is less than the area s2, it is determined that the first and second objects are the user's hand and the user's head, respectively.

The object analyzing section 253 detects the shape and orientation of the object, in another method. In this method, changes in the distance values of points forming some rows and columns extending are determined from the coordinates (xm, ym) of a minimum point. For example, the distance values of the following points, forming two rows and two columns, are monitored:

(xm+1, ym), (xm+2, ym), (xm+3, ym)
(xm-1, ym), (xm-2, ym), (xm-3, ym)
(xm, ym+1), (xm, ym+2), (xm, ym+3)
(xm, ym-1), (xm, ym-2), (xm, ym-3)

The distance from a minimum point to a point whose distance value is dm+th, where dm is the distance value of the minimum point, suggest the shape of the object, though not definitely. The distance value of the point is monitored at regular time intervals. If the distance value monitored increases with time at a constant rate, it is then possible to determine the direction in which the user stretches his or her hand.

The minimum point selecting section 254 receives the outputs of the point motion detecting section 251, minimum point detecting section 252 and object analyzing section 253. From these outputs the section 254 determines whether or not the minimum points include one corresponding to the finger tip. If one of the minimum points is found to correspond to the finger tip, the section 254 determines which minimum point corresponds to the finger tip. Any minimum point that stands still for a long time is determined to pertain to an still object (such as a desk or a chair) and is excluded from those which may correspond to the finger tip. Since the object analyzing section 253 has distinguished any minimum point on the user's hand from any minimum point on the user's head, the section 254 can distinguish these minimum points from each other.

The tip of the user's finger directed forward can be identified by a minimum point which "approaches slowly and then stops." Hence, the precision of finding the designating point is increased by using such a minimum point as pertaining to the finger. The algorithm of determining whether a minimum point is the finger tip may be switched to another, once minimum point has been determined to be the finger tip. Once so determined, the minimum point is regarded as such until the conditions change, causing the section 254 to determine that the minimum point is any other thing.

If the minimum point selecting section 254 selects only one of the minimum points which has been determined to be the finger tip, all other minimum points will be eliminated. If the section 254 selects two or more minimum points, these points selected may include a minimum point determined to be the finger tip. This minimum point does not influence the accuracy of determining the other minimum points selected.

The minimum point selecting section 254 determines which minimum point corresponds to the finger tip, from the outputs of the point motion detecting section 251 and object analyzing section 253. Instead, the section 254 can well determine which minimum point corresponds to the finger tip, from only the output of the point motion detecting section 251 or only the output of the object analyzing section 253.

FIG. 34 is a block diagram of a fourth modification of the fourth embodiment. This modified data input device is similar to the modified device shown in FIG. 29, but different in that the output of a minimum point selecting section 262 is supplied to a processing section 264 through a filter 263.

In the case where the user's finger is located exactly halfway between two adjacent LED beams, two coordinate values are output from the minimum point selecting section 262 at almost the same probability. If these coordinate values are used as the coordinates of a cursor, the cursor will move back and forth between two points defined by these coordinate values. This is undesirable. To prevent this, the filter 263 is interposed between the minimum point selecting section 262 processing section 264. The filter 263 serves to make the cursor move smoothly. The filter 263 is of the type which generates the following output (X, Y):

$$X = \Sigma K_n X_n$$
$$Y = \Sigma K_n Y_n$$

where $K_n$ is a constant, $X_n$ is the x-coordinate of a minimum point, and $Y_n$ is the y-coordinate thereof.

Only if X and Y are quantized with an appropriate value, will the cursor cease to tremble. As a result, the cursor will be located at a midpoint between the two points defined by the coordinate values output from the minimum point selecting section 262. The resolution is thereby increased.

FIG. 35 is a block diagram of a fifth modification of the first embodiment (FIG. 1), which will be described.

The fifth modification of the first embodiment is designed to designate one menu item selected among several, when the user points the desired menu item with a finger. As seen from FIG. 35, this modified data input device comprises a distance image input section 270, a minimum point determining section 271, a minimum point selecting section 272, a point-halting time determining section 273, a point-menu correspondence detecting section 274, a command executing section 275, and a display control section 276. The distance image input section 270, the minimum point determining section 271 and the minimum point selecting section 272 are almost identical, in function, to their equivalents of the modified data input devices described above.

In operation, the minimum point selecting section 272 generates the data (i.e., coordinates and distance) representing the minimum point which has been determined to be the user's finger tip. The point-menu correspondence detecting section 274 produces data indicating whether or not the minimum point selected by the section 272 is located at a desired menu item. This data is supplied to the command executing section 275 and also to the display control section 276. The display control section 276 displays a cursor indicating the position of the finger tip, in accordance with the data representing the minimum point selected by the minimum point selecting section 272. If the cursor is located at the desired menu item, the section 276 performs a processing such as the changing of the color in which the desired menu item is displayed. The selected minimum point may remain at a distance equal to or shorter than a prescribed value. If this happens, the point-halting time determining section 273 detects the period for which the selected minimum point so remains. When this period becomes equal to or longer than a predetermined value, the section 273 supplies the data indicating this fact, to the command executing section 275. The command executing section 275 receives the data from the section 273 at the same time the section 275 receives the data produced by the point-menu correspondence detecting section 274, which indicates the menu item at which the minimum point selected is located at present. The section 275 executes the command identified by the menu item and generates data informing that the command is executed. This data is supplied to the display control section 276. Upon receipt of the data the section 276 further changes the color of the menu item and generates a visual message informing the user that the command has been executed.

In the modified device of FIG. 35, the display control section 276 generates a visual message. In addition to the visual message, an audio message may be generated so that the user may be more reliably informed of the execution of the command. FIG. 36 shows a sixth modification of the fourth embodiments which has a speech output section 177 and which can generate both a visual message and an audio message.

A data input device according to the fourth embodiment of the invention will be described, with reference to FIG. 37. The fourth embodiment is designed to select and perform a function when the user moves his or her finger as if to push a desired menu item, either real or virtual.

Figure 37:
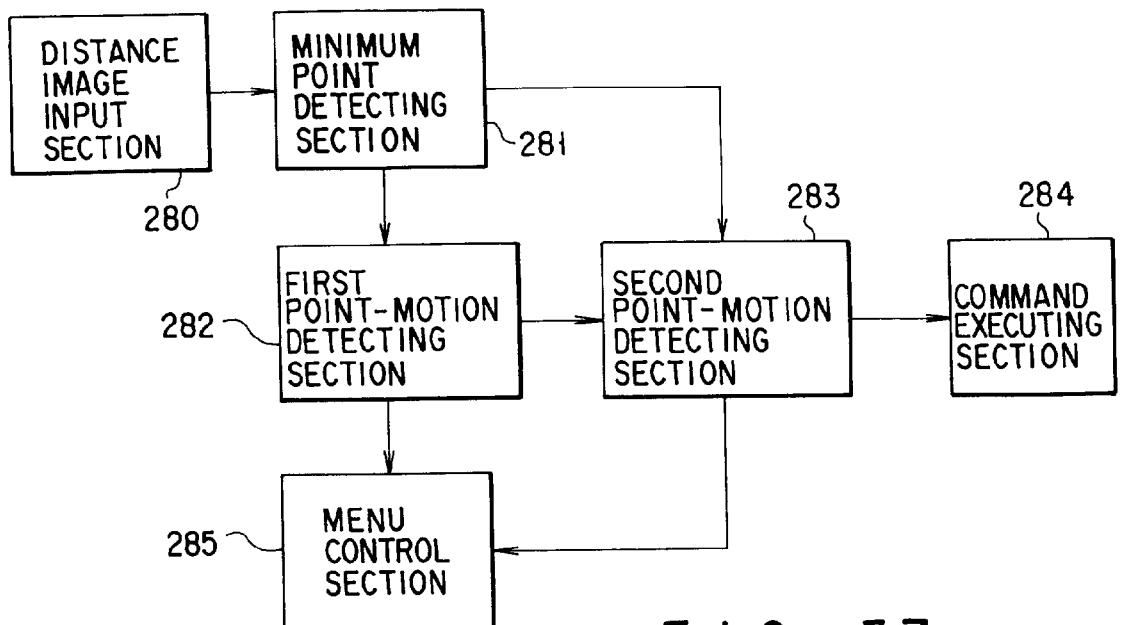
FIG. 37 is another view showing an arrangement of the data input apparatus for selecting a menu selection according to the third embodiment.

As shown in FIG. 37, the fourth embodiment comprises a distance image input section 280, a minimum point detecting section 281, a first point-motion detecting section 282, a second point-motion detecting section 283, a command executing section 284, and a menu control section 285. Of these sections the distance image input section 280 and the minimum point detecting section 281 are basically the same in function as their equivalents of the embodiments described above.

The minimum point detecting section 281 detects several minimum points and generates data representing the minimum points detected. The data is input to both point-motion detecting sections 282 and 283. The first point-motion detecting section 282 finds that one of the minimum points corresponds to the user's finger tip. The section 282 can find the minimum point in the various methods which have been explained above. The section 282 generates data representing the minimum point thus found. This data is supplied to the second point-motion detecting section 283. From the motion of the minimum point which corresponds to the finger tip, the second point-motion detecting section 283 determines whether or not the user has moved the finger as if to depress a button, thereby selecting a desired menu item. More precisely, the section 283 determines that the finger tip has been moved to depress the button, if the minimum point first move forward and then backward a little.

Alternatively, the second point-motion detecting section 283 may determine that the user selects a desired menu item, if the user moves the finger as if to write a tick or draw a circle. If the user moves the finger this way, the cursor may move away from the desired menu item to select any other menu item. To prevent the cursor from so moving, it suffices to select the menu item located or displayed at the position defined by the coordinates which the selected minimum point have before the user moves the finger as if to write a tick or draw a circle.

The menu items provided on the electronic apparatus the user wishes to remote-control may be bars extending horizontally. In this case, the user can select the desired menu item to execute it, by moving his or her finger horizontally to the desired menu item and then either upwards or downwards faster than a prescribed speed. The menu control section 285 controls the displaying of the menu items in accordance with the signals output from both point-motion detecting sections 282 and 283. More specifically, the section 285 causes the display (not shown) to display the cursor at the position corresponding to the position of the finger tips when the first point-motion detecting sections 282 detects the position of the finger tip. When the cursor moves to any menu item as the user moves the finger, the section 285 changes the color in which the menu item is displayed, telling the user that this menu item is being designated. When the second point-motion detecting section 283 outputs a signal indicating that the designated menu item has been executed, the menu control section 285 further changes the color of the menu item, informing the user that the menu item has been executed.

The menu control section 285 changes the color of the menu items, thus generating visual messages. Furthermore, the section 285 may generate audio messages to inform the user that the menu item is being designated and that the designated menu item has been executed.

Figure 38:
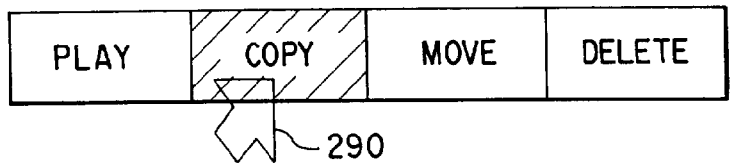
FIG. 38 is a view showing the menu according to the third embodiment.

FIG. 38 shows a set of menu items which can be selected by the data input device (FIG. 37) according to the fifth embodiment. As can be understood from FIG. 38, four menu bars are horizontally arranged, forming a row. When the user moves his finger horizontally until the cursor 290 moves to the desired one of the menu bars, for example the bar "COPY," the desired menu bar is displayed in a color different from that of all other menu bars. This indicates that the desired menu item has just been selected. To execute the menu item, thus selected, the user moves the finger downwards. At this time, the color of the selected menu bar may be further changed. It is desirable that the user moves the finger downwards faster than a predetermined speed so that the menu control section 285 may respond reliably.

Figure 39:
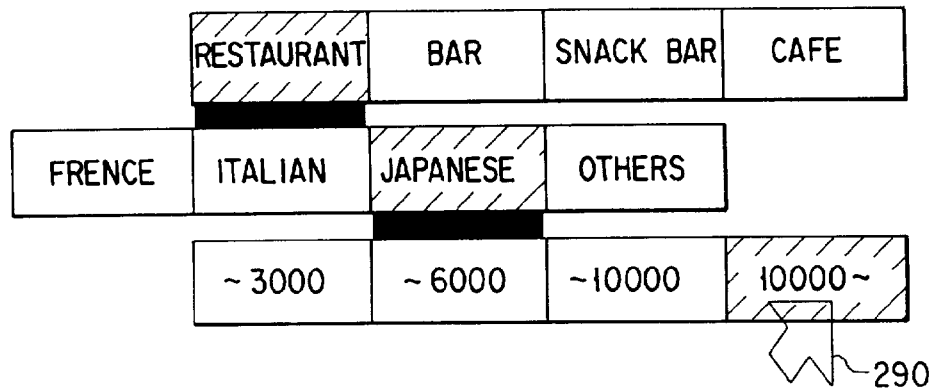
FIG. 39 illustrates three sets of menu items which the menu control section incorporated in the third embodiment displays, so that one of the menu items of each set may be selected.

FIG. 39 illustrates another set of menu items which may be selected by the fifth embodiment. The menu items, or menu bars, shown in FIG. 39 form three hierarchical rows. The top row is first displayed, consisting of four menu bars "RESTAURANT," "BAR," "SNACK BAR" and "CAFE." The user moves his or her finger horizontally until the cursor 290 reaches the desired one of these four menu bars, e.g., the menu bar "RESTAURANT." As a result, the menu bar "RESTAURANT" is displayed in a color different from the other menu bars "BAR," "SNACK BAR" and "CAFE," whereby the user understands that "RESTAURANT" is now selected. Next, the user moves the finger downwards. The middle row is then displayed, consisting of four menu bars "FRENCH," "ITALIAN," "JAPANESE" and "OTHERS." The user moves the finger horizontally to select one of these menu bars, and moves the finger downwards to select one of the four price menu bars displayed, i.e., "3,000 yen at most," "6,000 yen at most," "10,000 yen at most" and "more than 10,000 yen." In this case, it is more desirable to move the finger downwards farther than a threshold value, than to move it faster than a predetermined speed, so that the menu control section 285 may respond reliably.

It is desirable that the cursor 290 be moved upward, to the upper row of menu bars, so that the user can select any menu bar in place of another that he or she has already selected.

Figure 40:
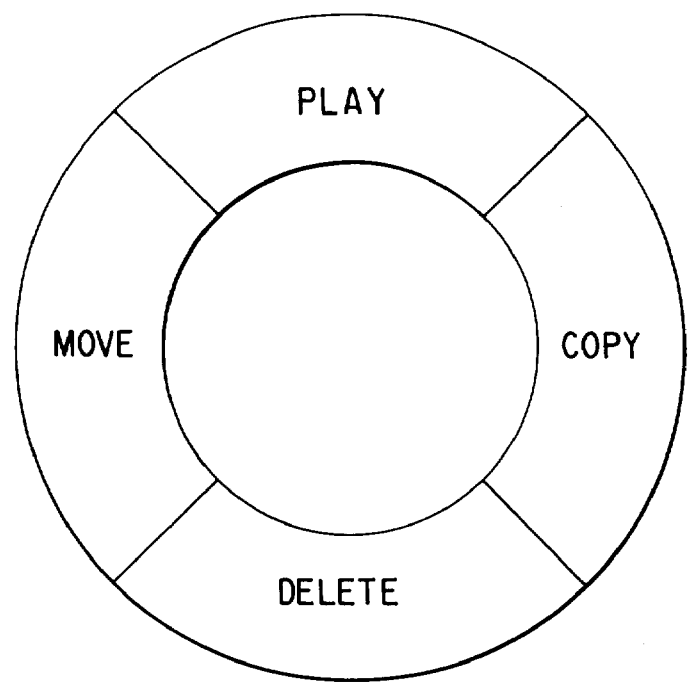
FIG. 40 illustrates an arrangement of four menu items which may be displayed in the third embodiment by the menu control section.
Figure 41:
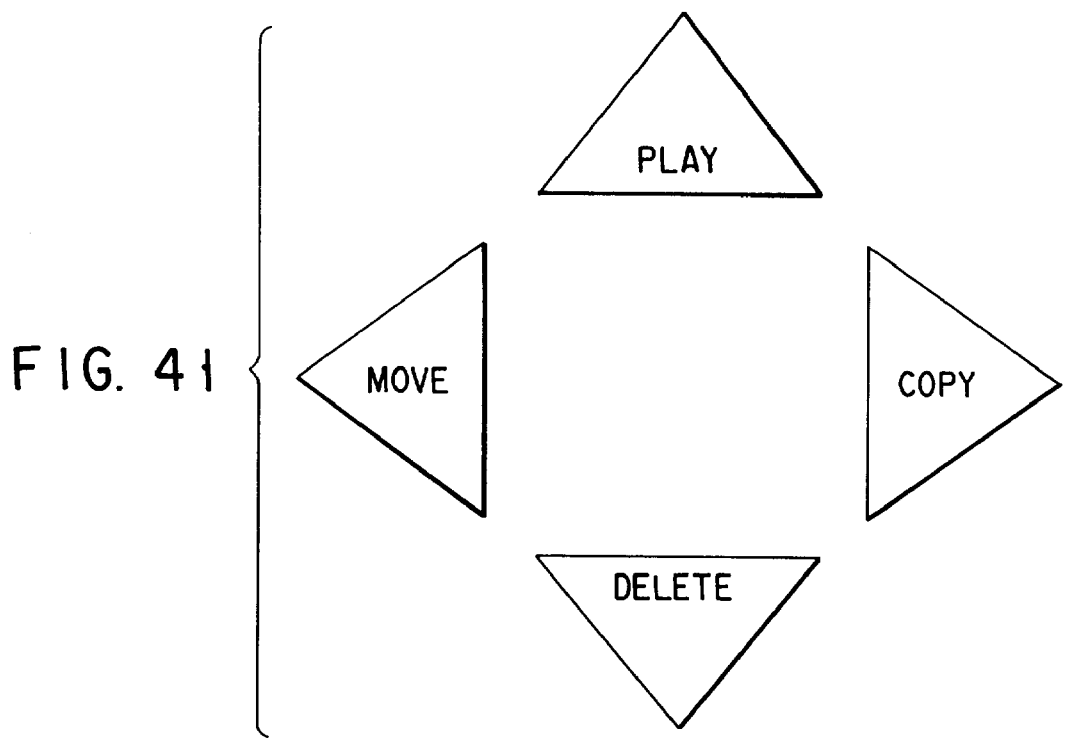
FIG. 41 shows another arrangement of four menu items which may be displayed in the third embodiment by the menu control section.

In the fifth embodiment shown in FIG. 26, the menu control section 285 may display four arcuate menu bars which form a ring as shown in FIG. 40, or four menu triangles which are located, defining corners of a square, as illustrated in FIG. 41. More correctly, the section 285 causes the display to display either the menu-bar ring (FIG. 40) or the four menu triangles (FIG. 41) and a cursor in the menu-bar ring or among the menu triangles, when the first point-motion detecting section 282 detects the position of the finger tip. As the user moves the finger upwards, downwards, leftward or rightward, thus moving the cursor to the desired menu item, the desired menu item is selected and executed. Namely, the second point-motion detecting section 283 detects the direction in which the finger is moved.

The several minimum points are monitored in order to determine which minimum point corresponds to the finger tip. Instead, an object analyzing section of the type used in the third modification (FIG. 31) of the fourth embodiment may be utilized so that the minimum point corresponding to the finger tip may be determined more accurately A data input device, which is the first embodiment of this invention, will be described with reference to the accompanying drawings.

A fourth embodiment according to the present invention will now be described.

Figure 42:
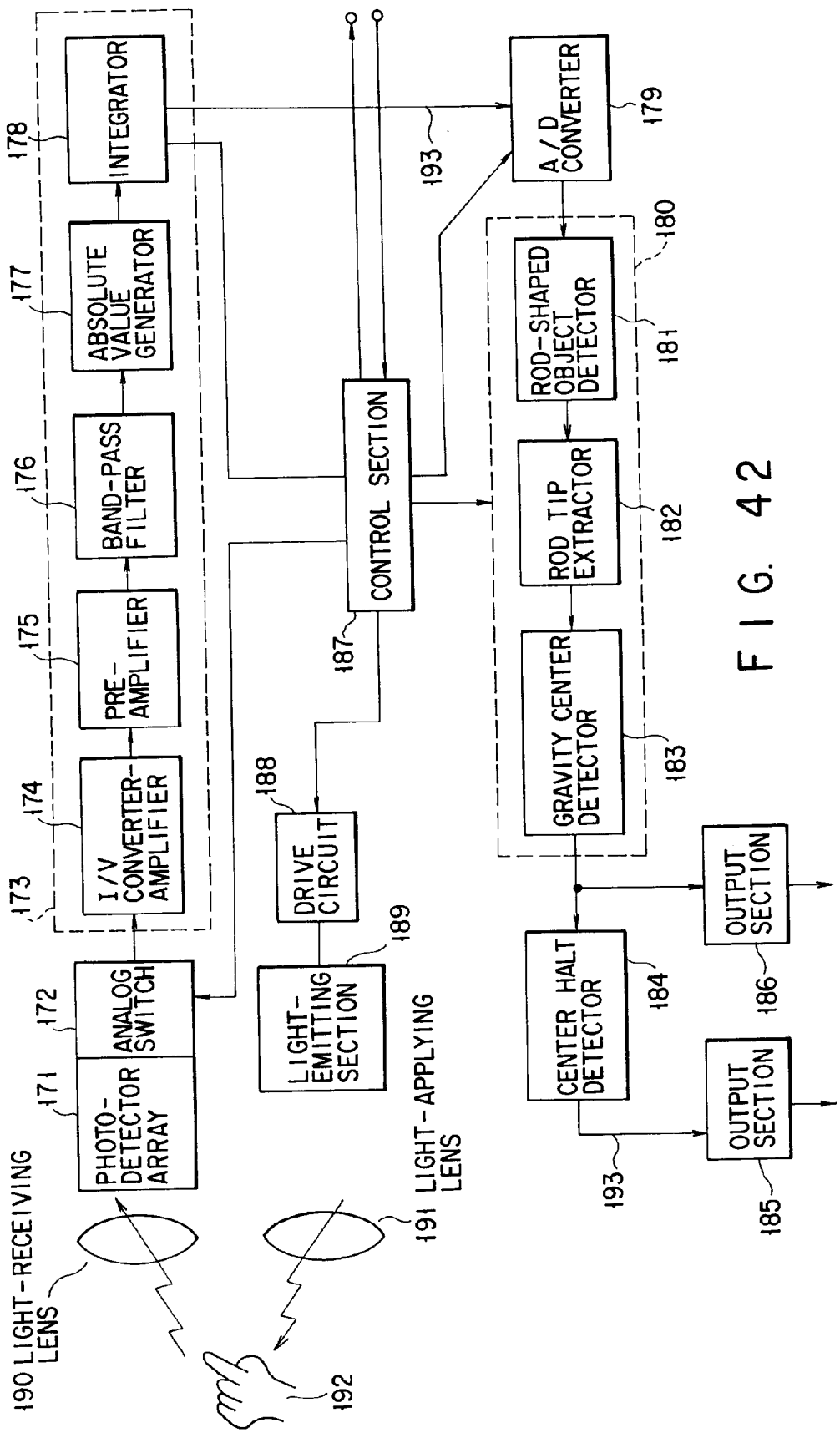
FIG. 42 is a block diagram showing a fourth embodiment of the present invention.

FIG. 42 shows the entire data input device, and FIG. 43 illustrates a portable computer which incorporates the data input device and a user who is operating the computer. As shown in FIG. 42, the data input device comprises a light-emitting section 189 and a photodetector array 171. When the user places his hand in front of the display screen of the computer, the hand reflects the light emitted from the light-emitting section. The light reflected is applied onto the light-receiving section. As the user moves his finger as shown in FIG. 43, the device generates data representing a two-dimensional image of the fingers from the light received at the light-receiving section.

To be more specifics the user raises his hand a little from the computer keyboard and moves the fore-fingers thereby pointing one of menu items displayed on the display screen. The data input device then moves the cursor on the display screen to the menu item pointed. As soon as the cursor reaches the menu item, the menu item is reverse-displayed. Seeing the menu item reverse-displayed, the user confirms that the menu item has been selected.

The data input device has a light-receiving lens and a light-applying lens 191 as shown in FIG. 42. As indicated by two circles in FIG. 43, these lenses 190 and 191 are located on the keyboards near the hinge connecting the display to the main body of the portable computer. The light-emitting section 189 and the light-receiving section 101 are provided in the main body, right below the light-applying lens 191 and the light-receiving lens 190, respectively.

As seen from FIG. 42, the data input device comprises a drive circuit 188, an analog switch 172, an analog signal processing section 173, an A/D converter 179 a digital signal processing section 180 a center halt detector 184 two output sections 185 and 186, and a control section 187. The drive circuit 188 is designed to drive the light-emitting section 189. The control section 187 is provided to control the drive circuit 188, the analog switch 172, the analog signal processing section 173, the A/D converter 179, and the digital signal processing section 180.

In operation, the control section 187 controls the drive circuit 188, which drives the light-emitting section 189 including an LED or the like. Driven by the circuit 188, the section 189 emits a modulated light beam, which illuminates the user's hand 192. The hand 192 reflects the light beam A part of the light beam passes through the light-receiving lens 190 and reaches the photodetector array 171 which is an array of photodiodes. The photodiodes generate signals, which are supplied to the analog switch 172. The switch 172 selects some of these signals and supplies the selected signals to the analog signal processing section 173.

As shown in FIG. 42, the analog signal processing section 173 comprises, an I/V converter-amplifier, a preamplifier 175, a band-pass filter 176, an absolute value generator 177, and an integrator 178. The I/V converter-amplifier 174 receives from the analog switch 172 the currents generated by the photodiodes of the photodetector array 171. The I/V converter-amplifier 174 then converts the currents into voltages and amplifies these voltages. The amplified voltages are further amplified by the preamplifier 175. The output currents of the preamplifier 175 are input to the band-pass filter 176. The filter 176 removes from each input voltage the noise corresponding to the sunlight, incandescent-lamp light or fluorescent-lamp light which has reached the photodiode, along with the light emitted from the LED of the light-emitting section 189. The output voltage of the filter 176, free of the noise, is passed through the absolute value generator 177 and the integrator 178. As a result, the analog signal processing section 173 generates a signal 193 which is proportional to the intensity of the modulated light reflected from the user's hand 192.

Figure 44:
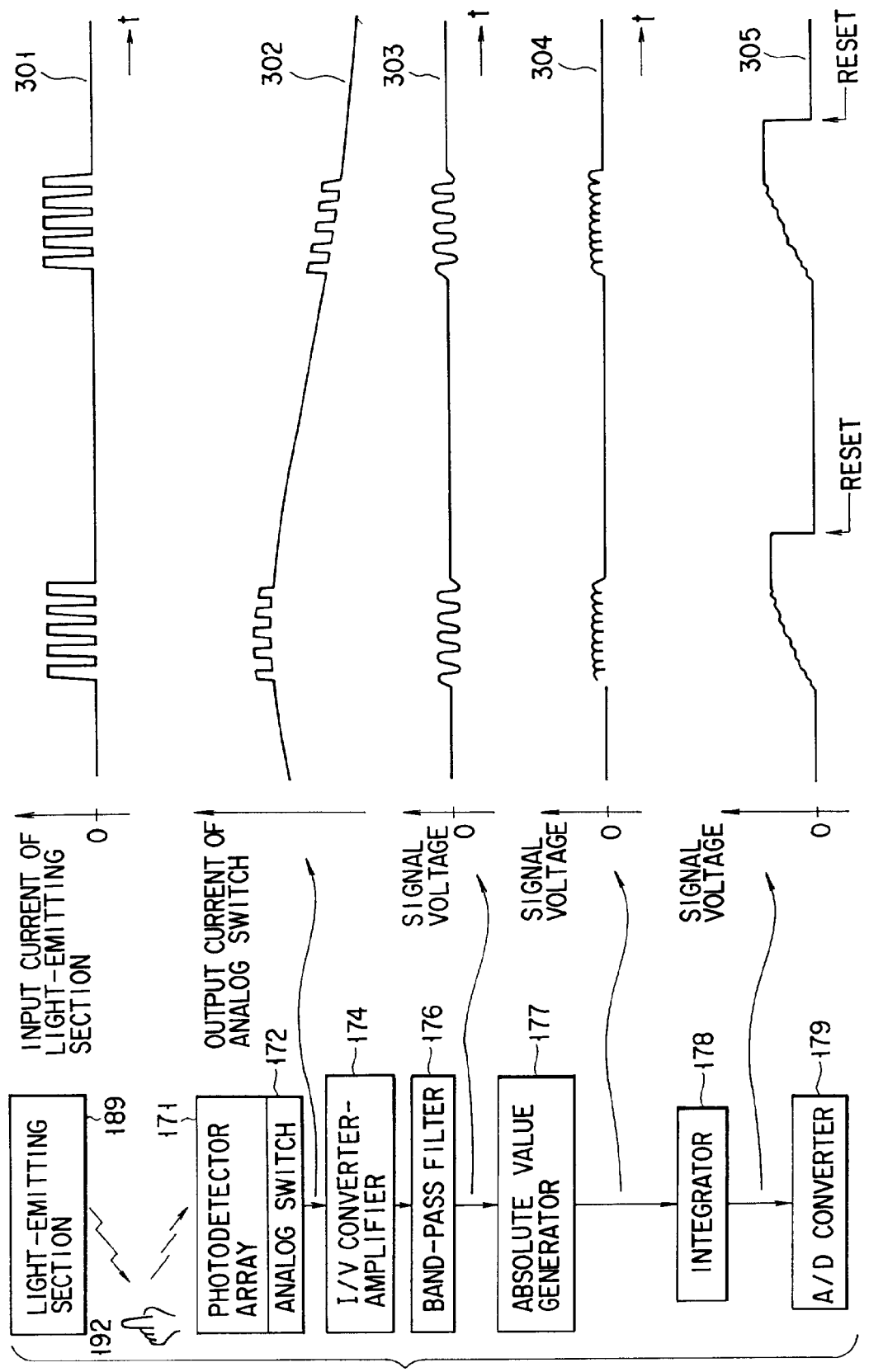
FIG. 44 is a timing chart showing various signals generated in the analog signal processing section used in the data input apparatus.

With reference to FIG. 44 it will be described how various signals are generated in the analog signal processing section 173. The section 173 receives the current corresponding to the light pulses emitted by the light-emitting section 189 and reflected from the hand 192, at regular time intervals. Each light pulse has a noise component, i.e., a continuous ambient light beam such as a sunlight beam or a discrete ambient light beam such as a fluorescent-lamp beam. Therefore, the current supplied from the light-receiving section 101 to the section 103 via the analog switch 102 has the waveform 302 shown in FIG. 44. The current is converted into a voltage signal by the I/V converter-amplifier 174, which is amplified by the preamplifier 175 before it is input to the band-pass filter 176, which filters out the noise component. The output signal of the filter 176 consists of light-pulse components only having the waveform 303 shown in FIG. 44. This signal is supplied to the absolute value generator 177. The generator 177 generates a voltage signal having the waveform 304 illustrated in FIG. 44. The output signal of the generator 177 is supplied to the integrator 178. The integrator 178 outputs a voltage signal having the waveform 305. Since the waveform 303 changes with the intensity of the light the photodetector array 171, the output signal of the integrator 305 changes in level. Thus, the output of the integrator 178, i.e., the output signal of the analog signal processing section 173, reliably represents the magnitude of the modulated light pulse.

In the embodiment shown in FIG. 42, a plurality of light pulses the light-emitting section 189 emits at a predetermined frequency are converted into a single output of the photodetector array 171. Instead, the output of the array 171 may be obtained from shorter light pulses, provided that the analog signal processing section 173 can generate a signal having high S/N ratio.

The signal output by the section 173, which is proportional to the intensity of the modulated light, is supplied to the A/D converter 179. The converter 109 converts the signal to a digital data item. When the A/D converter 179 converts the signals generated from the currents output from all the photodiodes of the photodetector array 171, into digital data items, there is acquired a one-frame image data.

The photodetector array 171 need not have so many photodiodes as a CCD, a light sensor array of another type, which has tens of thousands of photodiodes. Rather, it is more important that each photodiode accurately detects the intensity of the light reflected from the hand 192. The intensity of the light detected by each photodiode shall be hereinafter referred to as "detected light intensity." The function of the photodetector array 171 is not to determine the shape of the user's hand 192, but to provide data sufficient to detect the position of the finger tip.

More precisely, the photodetector array 171 has 520 photodiodes, which are arranged in the form of a 20×26 matrix. Each photodiode receives light coming from a unit region of about 10 mm×10 mm. The array 171 monitors a region of about 200 mm×260 mm. So long as the user's finger tip remains in the region the array 171 monitors, the cursor can be moved on the display screen, in the same way the user moves the finger tip.

FIG. 45 shows the positional relation between the user's hand 402 and the region monitored by the photodetector array 171. Each of the squares shown in FIG. 45 is the unit region monitored by one photodiode. As mentioned above, the unit region has sides which are 10 mm long each. The length of each side, 10 mm, is slightly less than the width of the user's finger. Hence, the finger tip fully occupies one unit region 403 when the finger assumes an appropriate position with respect to any one of the photodiodes. Were any side of each unit region less than 10 mm long, it would be impossible to move the cursor smoothly on the display screen. The light intensity detected depends on the size of that part of the unit region 403 which is occupied by the finger tip and on how far the unit region 403 is from the light-receiving lens 190.

In other words, the detected light intensity is maximal if the finger tip occupies the entire unit region 403, and is half the maximum value if the finger tip occupies a half of the unit region 403. In the instance illustrated in FIG. 45, the light intensity detected by the photodiode monitoring the unit region 403 is a maximum value, while the light intensity detected by the photodiode monitoring the unit region 404 is about half the maximum value.

FIG. 46 is a three-dimensional graph representing the light intensities the photodiodes of the photodetector array 171 have detected when the user's hand 192 is located as shown in FIG. 45 with respect to the 200 mm×260 mm region. Here, the detected light intensities are plotted along the vertical axis. The light intensities detected by the photodiodes are pixel values, which form a coarse black-and-white image of the hand 192. This image shall be called "reflected image."

The one-frame image data generated by the A/D converter 179 is supplied to the digital signal processing section 180. The section 180 detects the finger tip. When the user points any menu item displayed on the display screen, his forefinger extends toward the display screen. Above the forefinger there is no object that reflects the light beams emitted from the light-emitting section 189 via the light-applying lens 191. The user's head certainly reflects the light beams, but the light reflected from the head scarcely affects the accuracy of detecting the finger tip. This is because the light intensity detected by any photodiode is inversely proportional to the fourth power of the distance between the photodiode and the object which reflects light to the photodiode. In the case where the user's head is four times as remote from the photodetector array 171 as the user's hand 192, the light intensity the photodiode detects is 256 times lower than the intensity of the light beam emitted from the light-emitting section 189. Even if the user's head is twice as remote from the array 171 as the hand 192, the light intensity detected by the photodiode is 16 times lower than the intensity of the light beam emitted from the light-emitting section 189. In this case, too, the light reflected from the head scarcely reduces the accuracy of detecting the finger tip.

Figure 47:
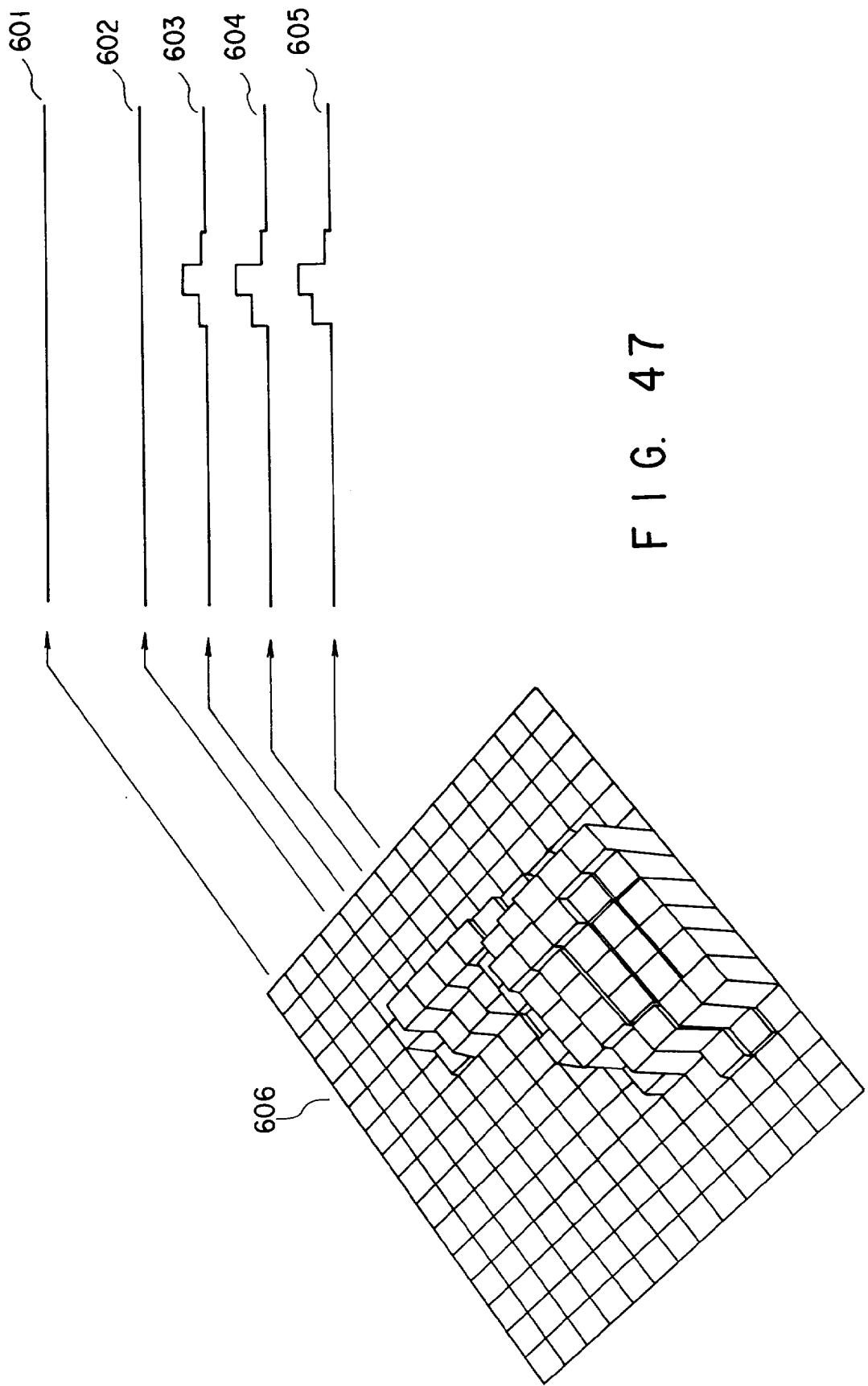
FIG. 47 is a diagram explaining how to scan the horizontal lines of the image.

With reference to FIG. 47, it will be explained how the digital signal processing section 180 scans the one-frame image represented by the data produced by the A/D converter 179. As can be understood from FIG. 47, the section 180 scans the one-frame image along horizontal lines, from the top to the bottom. In the case of the image illustrated in FIG. 47, the section 180 detects rows of pixels, each row consisting of pixels having a value of almost zero and generates signals 601 to 602. Then, the section 180 detects four consecutive rows of pixels, each row including a few pixels having large values, and generates signals 603 to 605. If the pixels having large values exist in the same positions in each of the four rows, as shown in FIG. 47, this indicates a rod-shaped object extending vertically in the 200 mm×260 mm region. This object is identified as the user' forefinger. Then, a point for designating a desired menu item displayed on the screen is extracted from the data representing the finger tip.

It is generally considered that the finger tip should be used as the point for designating a desired menu item. The unit region 701, in which the finger tip is located, can therefore be used as the designating point. If so, only 520 (=20×26) candidates for the designating point exist in the one-frame image, and the accuracy of pointing the desired menu item is inevitably low. It is required that the digital signal processing section 110 should detect the finger tip with a higher accuracy.

To detect the finger tip with a high accuracy, the section 180 scans the one-frame image at a resolution higher than the resolution of the image, thereby to detect the center of gravity of the finger tip. How to detect the gravity center by scanning the one-frame image which has a relatively low resolution will be explained below.

As shown in FIG. 42, the digital signal processing section 180 comprises a rod-shaped object detector 181, a rod tip extractor 182, and a gravity center detector 183. The rod-shaped object detector 181 detects a rod-shaped object, or the user's forefinger which extends upwards. The rod tip extractor 182 extracts that part of the one-frame image data which represents the tip of the forefinger detected by the detector 181. The gravity center detector 183 detects the center of gravity of the finger tip. More correctly, the detector 183 determines the gravity center 702 of the finger tip illustrated in FIG. 48. As can be seen from FIG. 48, the gravity center 702 is not, in most cases, identical with the center of the 10 mm×10 mm unit region occupied by the finger tip. Obviously, the center of such a unit region cannot be used as the gravity center of the finger tip. Thus, the rod tip extractor 182 extracts some adjacent pixels and adjusts the values of these pixels so that the total pixel value may meet specific requirements.

The components of the digital signal processing section 180 will be described in detail. The rod-shaped object detector 181 will be first described.

When the user extends the forefinger, pointing a desired menu item on the display screen, the image of the forefinger extends upwards in the one-frame image output from the A/D converter 179. Therefore, if the user holds out a closed fist, the rod-shaped object detector 181 cannot detect the forefinger.

The detector 181 scans the one-frame image along horizontal lines, from the top to the bottom. As can be understood from FIG. 47, the detector 181 first detects rows of pixels, each row consisting of pixels having a value of almost zero and generates signals 601 to 602. The detector 181 then detects four consecutive rows of pixels, each row including a few pixels having large values. The detector 181 generates signals 603 to 605. The pixels having large values exist in the same positions in each of the four rows, as shown in FIG. 47. This means that a rod-shaped object extends vertically in the 200 mm×260 mm region. The object is identified as the users forefinger.

Thereafter, the rod tip extractor 182 extracts some adjacent pixels including those pixels defining the image of the finger tip. More specifically, as shown in FIG. 49, the extractor 182 extracts adjacent 25 pixels forming a 5×5 matrix 802, among which are eight pixels which define the finger tips from the one-frame image 801.

Of the pixels forming the 5×5 matrix 802, the upper-left pixel has coordinates (1, 1), the upper-right pixel has coordinates (n, 1), the lower-left pixel has coordinates (1, n), and the lower-right pixel has coordinates (n, n). A threshold pixel value TH is set, which is as follows:

$$TH = \sum_{n=1}^{n} \sum_{y=1}^{k-1} (x, y) + a \sum_{x=1}^{n} P(x, k) \quad (1)$$
$$(0 < a \le 1)$$

Then, the values k and a in this equation are obtained. Using the value a, the extractor 182 adjusts the values of the pixels P(1, k) to P(n, k). In other words, it changes the values of these pixels, P'(1, k) to P'(n, k), to the following:

$$P(x, k) = a\, P(x, k) \quad (2)$$
$$(x=1, 2, \ldots, n)$$

The rod tip extractor 182 then extracts the pixels having their values adjusted to P(1, k) to P(n, k), from the 5×5 matrix 802. The pixels extracted from the matrix 802 forms a 3×5 matrix 803 Of the three rows of the matrix part 803, the upper two are identical with the upper two rows of the matrix 802, and the lowest differs from the third row of the matrix 802 in that each pixel value is a times the original value.

The gravity center detector 183 determines the center of gravity of the finger tip, from the pixels P(1, 1) to P(n, k) extracted by the rod tip extractor 112. The gravity center (xx, yy) is determined as follows:

$$xx = \frac{\sum_{x=1}^{n} \sum_{y=1}^{k} X \cdot P(x, y)}{\sum_{x=1}^{n} \sum_{y=1}^{k} P(x, y)} \quad (3)$$

$$yy = \frac{\sum_{x=1}^{n} \sum_{y=1}^{k} Y \cdot P(x, y)}{\sum_{x=1}^{n} \sum_{y=1}^{k} P(x, y)} \quad (4)$$

The coordinates (xx, yy) are virtually identical to the gravity center of the upper end portion of the forefinger, shown in FIG. 45. (The length of this upper end portion is related to the threshold pixel value TH.) Since the image resolution of the forefinger is far lower than TV image resolution, the values of the pixels P(1, k) to P(n, k) must be adjusted as described above, in order to extract the upper end portion of the forefinger which has a desired length. The more accurately the coordinates P(1, k) to P(n, k) are obtained, the more accurate will be the gravity center (xx, yy) detected.

Figures 50A, 50B:
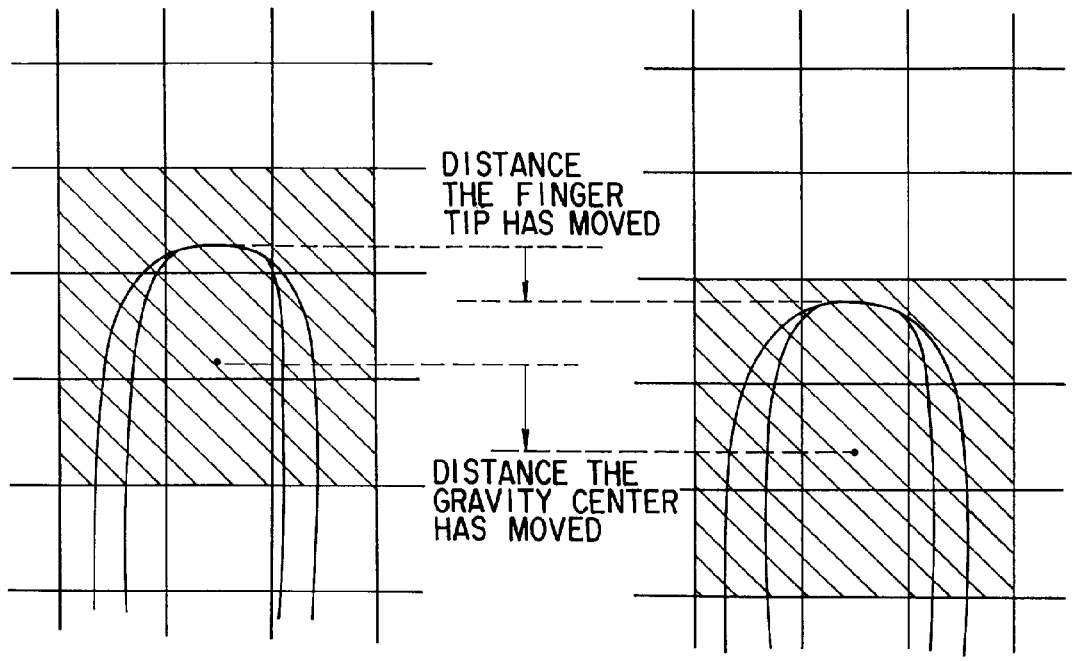
FIGS. 50A and 50B illustrate a diagram for explaining why a linear relation would not exist between the calculated and actual positions of the user's forefinger, if the rod tip extractor were not provided.

Referring to FIG. 50, it will be explained what would happen if the values of the pixels P(1, k) to P(n, k) were not adjusted at all. Assume that adjacent nine of the 520 pixels, which forms a 3×3 matrix (shaded), represent the upper end portion of the forefinger, as shown in FIG. 50A. The values of these nine pixels are then used to determine the gravity center of the finger tip. When the user moves the forefinger from a position in FIG. 50A to a position in FIG. 50B, the gravity center (xx, yy) moves for a longer distance than the tip of the forefinger, as illustrated in FIGS. 50A and 50B.

Figures 51A, 51B:
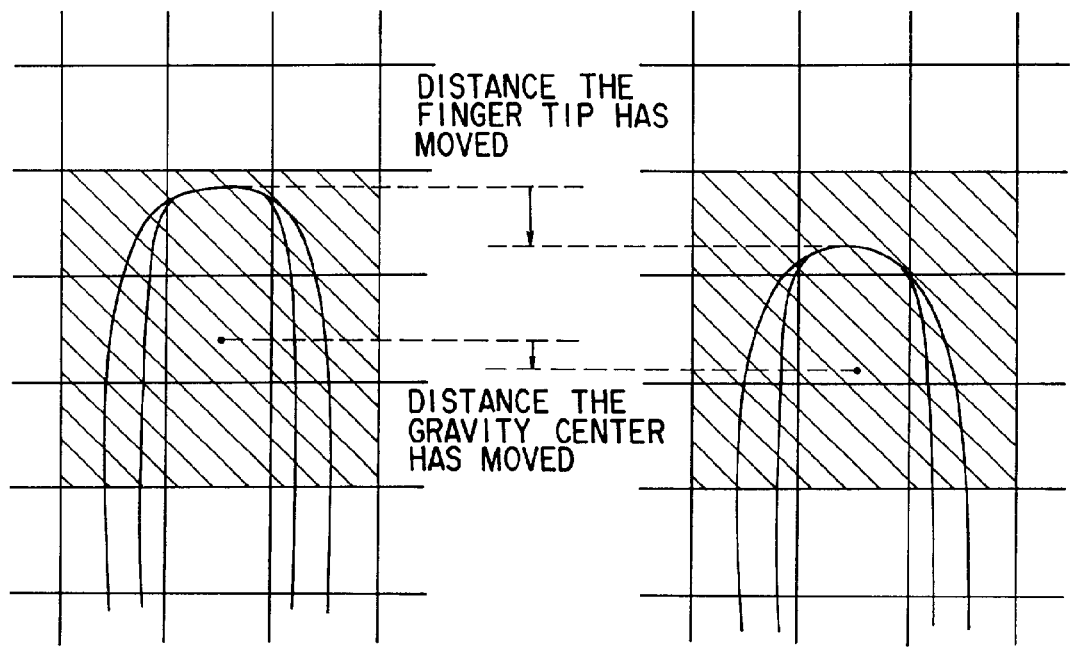
FIGS. 51A and 51B illustrate another diagram for explaining why a linear relation would not exist between the calculated and actual positions of the user s forefinger, if the rod tip extractor were not provided.

The adjacent nine pixels, which forms a 3×3 matrix, may represent the upper end portion of the user's forefinger as shown in FIG. 51A. Also in this case, the values of these nine pixels are applied to determine the gravity center of the finger tip. When the user moves the forefinger from a position in FIG. 51A to a position in FIG. 51B, the gravity center (xx, yy) moves for a shorter distance than the tip of the forefinger, as illustrated in FIGS. 51A and 51B.

In other words, the calculated position (xx, yy) of the forefinger has no linear relationship with the actual position of the forefinger. The values of the pixels must therefore be adjusted such that the sum of all values is fixed before the pixel values are used to determine the gravity center of the finger tip.

Figure 52A:
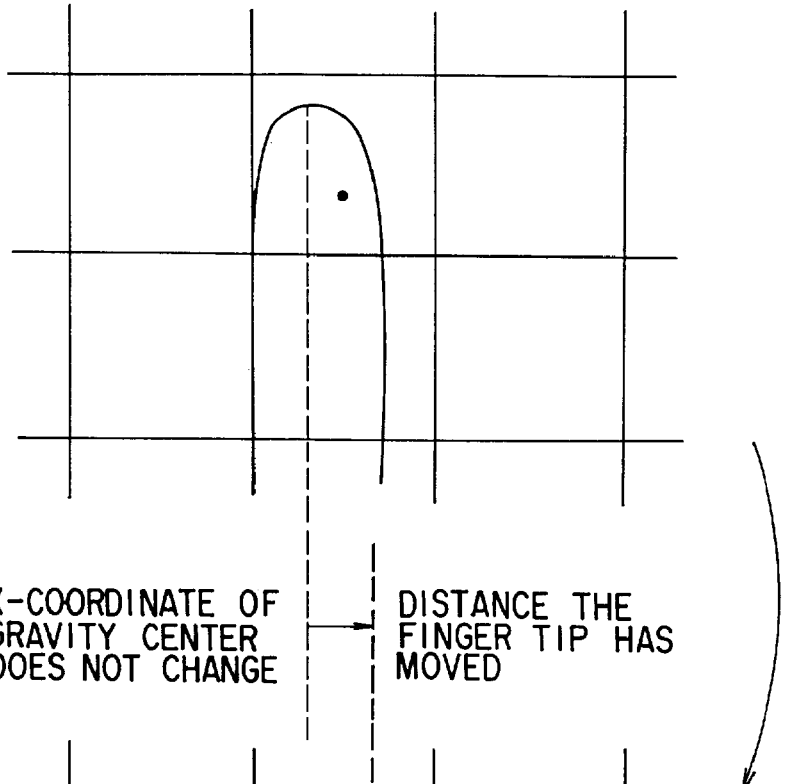
FIGS. 52A and 52B illustrate a diagram explaining why a linear relation will not exist between the calculated and actual positions of the user's forefinger, if each unit region is broader than the width of the finger.
Figure 52B:
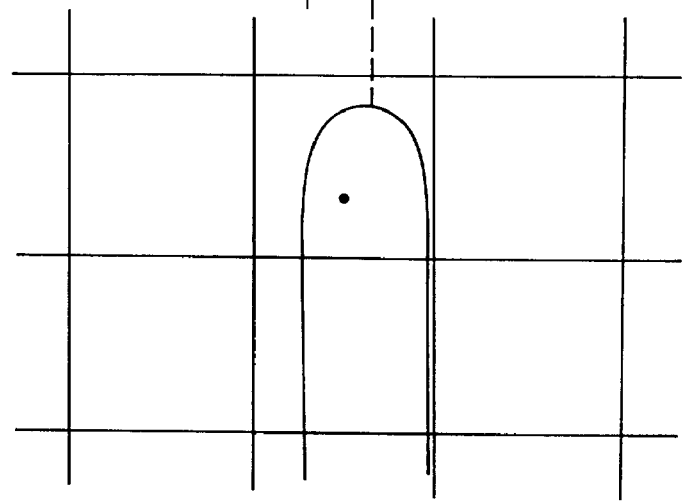

As indicated above, the finger tip must fully occupy one unit region 403 when the finger assumes an appropriate position with respect to any one of the photodiodes. Why this condition should be satisfied will be explained here. When the sides of each unit region are longer than the finger is wide, the gravity center (xx, yy) of the finger tip does not move even if the user moves the finger slightly as shown in FIGS. 52A and 52B. Also, in this case, the calculated position (xx, yy) of the forefinger no longer has a linear relationship with the actual position of the user's forefinger.

The coordinates (xx, yy) thus calculated are supplied from the digital signal processing section 180 to the center halt detector 184. The coordinates (xx, yy) are used to control the cursor. When the user points a desired menu item on the display screen with his forefinger, the cursor is displayed on the display screen at the menu item. When he moves his hand, the cursor moves on the screen in the same way as the hand. When the user draws the forefinger away from the display screen, the cursor disappears. To select any desired menu item as if by clicking a mouse, the center halt detector 184 outputs a click signal. More specifically, the detector 184 monitors the motion of the gravity center of the finger tip. If the gravity center moves less than a prescribed distance during a predetermined time, the detector 184 determines that the cursor stands still and generates a clock signal.

To select a desired one of the menu items in a pull-down menu, the user extends the forefinger toward the display screen, whereby the cursor appears on the screen. He moves the finger, pointing the pull-down menu, and then keeps pointing it longer than the predetermined time. As a result, the pull-down menu appears on the screen. The user then moves the finger downwards, moving the cursor downwards over the pull-down menu. As the cursor reaches any menu item, the menu item changes in color. Finally, when the cursor reaches the desired menu item, the user keeps pointing the desired menu item longer than the predetermined time. The center halt detector 184 therefore generates a click signal, whereby the command identified by the desired menu item is executed.

It may appear that this method of "clicking" a desired menu item fails more often than the clicking performed by operating a mouse. On the contrary, the method works fairly well, because no cursor appears unless the user extends the forefinger toward the display screen and also because the cursor would not stop moving before it reaches the menu item which the user wants to select.

How the digital signal processing section 180 performs its function will be explained with reference to FIGS. 59 to 60B. The section 180 is not necessarily hardware. It may be a program illustrated by the flow chart of FIGS. 60A and 60B. Alternatively, the section 180 may be partly hardware and partly software.

Figure 60A:
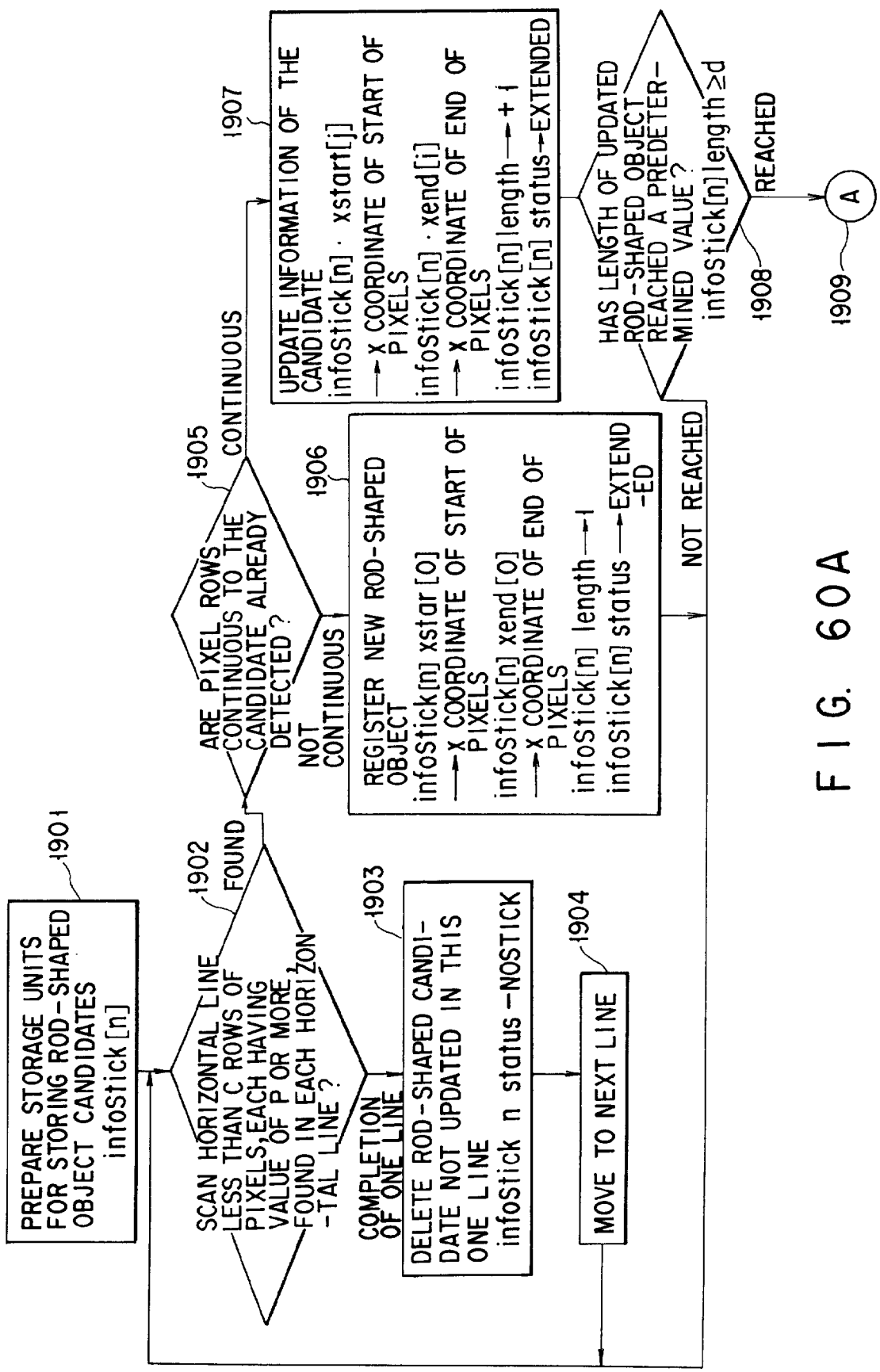
FIGS. 60A and 60B illustrate a flow chart for the rod tip extractor and the gravity center detector, both incorporated in the digital signal processing section.
Figure 60B:
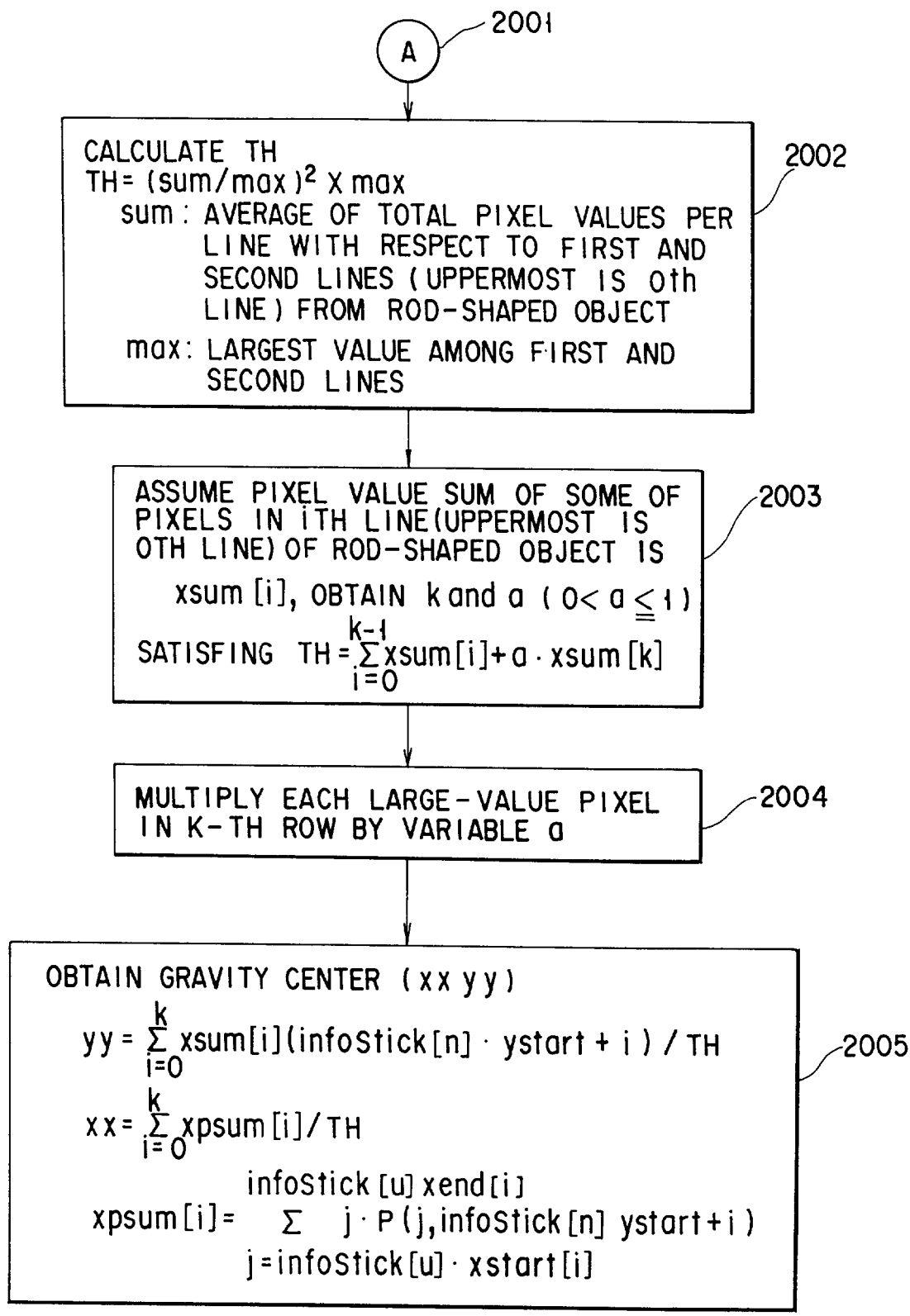

FIG. 60A explains how to detect a rod-shaped object. As mentioned above, the rod-shaped object detector 181 scans the one-frame image along horizontal lines. When the detector 181 detects pixels of great values in some consecutive horizontal lines, only a few in each line, it determines that a rod-shaped object exists in front of the display screen. More correctly, upon detecting such pixels in one horizontal lines the detector 181 determines there is an object which may be a rod-shaped object (hereinafter called "candidate for a rod-shaped object"). As the detector 181 scans the following horizontal lines, it will determine that the candidate is really a rod-shaped object.

As shown in FIG. 60A, a plurality of storage unit infoStick[n] are prepared in Step 1901, for storing candidates for a rod-shaped object (Two or more storage units are necessary since, in most cases, there are detected two or more candidates.) Each storage unit infoStick has five members, two of which store the data representing the position of a candidate for a rod-shaped object. As shown at 2102 in FIG. 61B, the five members are:

ystart: The y-coordinate of the first line found to have large-value pixels xstart[i]: The x-coordinate of the first large-value pixel found in the i-th line xend[i]: The x-coordinate of the last large-value pixel found in the i-th line length: The length of the candidate for a rod-shaped objects measured vertically status: One of three conditions (STICK, NOSTICK and EXTENDED) the candidate may have at present (later described in detail)

Of these members, the first twos ystart and xstart[i], exist in each horizontal line and, therefore, represent the position of a candidate for a rod-shaped object.

It will be explained how the rod-shaped object detector 111 detects a rod-shaped object, with reference to not only FIGS. 60A and 60B but also FIGS. 61A through 61E. In FIGS. 61A through 61E, box 2101 indicates a one-frame image output from the A/D converter 179. The density of each pixel of this image represents the value of the pixel. The numbers plotted on the x and y axes show the x- and y-coordinates of the pixels. Box 2102 shows one of the storage units. Boxes 2103 to 2105 shown on the right side in FIGS. 61A through 61E are the data items the storage unit store at various stages of the process of detecting a rod-shaped object.

In Step 1902, it is determined whether or not there are rows of pixels, not exceeding c rows, each pixel having a value greater than s, as the rod-shaped object detector 181 scans the one-frame image along horizontal lines. If Yes, the process goes to Step 1905, in which it is determined whether or not these rows of pixels are continuous or not to the candidate for an rod-shaped object, hitherto detected. If Yes, the rows of pixels are added in Step 1907 to the candidate, thus renewing the candidate for a new rod-shaped object. If No in Step 1902, a row of pixels having a value greater than s is found while the detector 111 is scanning the image along the third (y=3) horizontal line. This row of pixels is registered as a new candidate for a row-shaped object in Step 1906.

The y-coordinate of this line, i.e., "3," is set at infoStick [0] ystart. Since the row of pixels having a value greater than s has a length of "1," "6" is set at infoStick[0] xstart[0] and also at infoStick[0] xend[0].

For the new candidate for a rod-shaped objects "1" is set at infoStick[0] length, and EXTENDED is stored at infoStick[0] status. (It should be noted that EXTENDED is used to register a new candidate, too, for the reason which will be given later.)

The pixels having a value larger than s, if found on the fourth (y=4) line, can be connected to the candidate already detected. Whether or not these pixels can be connected depends upon the positional relation the large-value pixels have with the large-value pixels of the last row of the candidate, along the x axis.

In the present instance, infoStick[0] xstart[0]=6, and infoStick[0] xend[0]=6.

The row of large-value pixels, found anew, has an x-coordinate ranging from 5 to 7. This row is hence determined to be continuous to the detected candidate for a rod-shaped object. Therefore, this candidate is renewed to one which is illustrated in box 2104.

The position the pixel rows newly found takes along the x axis is obtained has follows:

infoStick[0] xstart[1]=5 infoStick[0] xend [1]=7

The length of the candidate for a rod-shaped object is increased by 1. Namely:

infoStick[0] length=2

Further, the row of large-value pixels found on the next horizontal line (y=5), is connected to the candidate for a rod-shaped object. The candidate is therefore transformed to one which is shown in box 2105 and comes to have a length of 3. In Step 1908, it is determined whether or not the renewed candidate has a length equal to or greater than a predetermined value d. If d=3, the decision made in Step 1908 is affirmative. Therefore, the rod-shaped object detector 111 detects a rod-shaped object existing in front of the display screen. If No in Step 1908, Steps 1902, 1905, 1907 and 1908 are repeated until the detector 111 scans the last horizontal line of the one-frame image. If the renewed candidate is shorter than the value d, there will be detected no rod-shaped object.

Now, the status members of the storage units infoStick[n] will be described in detail. The status member of each storage unit can assume three alternative values, STICK, NOSTICK and EXTENDED.

NOSTICK indicates the data stored in each storage unit does not represent a rod-shaped object. At the start of the process of detecting a rod-shaped object, the status member of each storage unit prepared has the value NOSTICK. When the status member changes to STICK, it indicates that the storage unit stores data representing a candidate for a rod-shaped object.

Like STICK, EXTENDED indicates the data stored in each storage unit represents a candidate for a rod-shaped object. But the value EXTENDED is used in a different way. At the beginning of scanning each horizontal line, the status member of any storage unit that stores the data representing a rod-shaped object has the value of STICK. The status member changes from STICK to EXTENDED if the candidate is connected to any row of large-value pixels that is found during the scanning of the horizontal line. The status member of any storage unit changes to EXTENDED if the candidate stored in the unit is connected to a large-value pixel row newly detected during the scanning of the line. On the other hand, any storage unit, the status member of which still has value STICK at the time the line is completely scanned, is regarded as storing no candidate for a rod-shaped object.

Upon completion of the scanning of each line, the status member of any storage unit, whose value remains STICK, is changed to NOSTICK, and the value STICK is applied to the status member of any other storage unit, whose value is still EXTENDED. As a result of this, a pixel 2201 isolated from any other as shown in FIG. 62A is registered at infoStick[0] as a candidate for a rod-shaped object, as seen from box 2203, and then canceled as such as seen from box 2204, in Step 1903 shown in FIG. 60A.

The data representing the user's finger tip is registered at infoStick[1]. To cancel the isolated pixel 2201 (FIG. 62A) as a candidate, the status member is changed to NOSTICK. In Step 1905 carried out during the scanning of the next horizontal line, only the storage units whose status member have value STICK are monitored; the storage units whose status members have value NOSTICK are not monitored at all. Any storage unit can be used again to store data representing a candidate for a rod-shaped object, after its status member has acquired the value NOSTICK. This helps to save storage capacity.

The pixel 2201 may be one resulting from noise, e.g., a sunlight beam or a fluorescent-lamp beam. In view of this, the rod-shaped object detector 181 can detect a rod-shaped object, even if the output currents of the photodetector array 171 contain noise components. Step 1905 shown in FIG. 60A is performed on only the storage units whose status members are STICK. Any candidate for a rod-shaped object, if detected, is registered in a storage unit whose status member has the value NOSTICK.

Referring to the flow chart of FIG. 60B, it will be described how the rod tip extractor 182 and the gravity center detector 183 perform their functions. If Yes in Step 1902 (FIG. 60A), the process goes to Step 2001 and then to Step 2002. In Step 2002, a threshold pixel value TH is obtained, which will be used to extract the end portion of the rod-shaped object detected by the rod-shaped object detector 181. The threshold pixel value TH may either be a fixed one or a variable one. If a variable one, it is determined in accordance with the size and pixel value of the end portion of the rod-shaped object.

The threshold pixel value TH is given as follows:

$$TH = (sum/max) 2 \times max$$

where sum is the average total pixel value for the second and third upper rows of large-value pixels, and max is the value of the greatest pixel found in the second and third upper rows. The values of the pixels forming the uppermost row (i.e., the 0-th row) are not applied to calculate the threshold pixel value TH. This is because the uppermost row of pixels is tangent to the tip of the rod-shaped object, and the pixels forming this row do not serve to find the width of the end portion of the rod-shaped object.

As may be understood from this equation, the length and width of the extracted tip of the rod-shaped object does not change much even if the pixels which form the second and third upper rows vary in value. The threshold pixel value TH can be obtained by any other method.

Thereafter, in Step 2003, the threshold pixel value TH, thus obtained, is used to calculate the variables a and k in the equation (1). The equation (1) shows that the value TH is calculated from the values of all pixels forming a rectangular part of the one-frame image. Here, by contrast, the value TH is calculated from the values of some of the pixels which define the end portion of the rod-shaped object. Obviously, the threshold pixel value TH is free of the influence of noise which the output currents of the photodetector array 171 have. (More specifically, the value TH is not affected by a pixel 2301 which may be generated when the user's finger extends slantwise and which is isolated from any other pixel as shown in FIG. 63.)

In Step 2004, the large-value pixels in the k-th row are multiplied by the variable a obtained in Step 2003. Steps 2002 to 2004 are performed by the rod tip extractor 182. It is the gravity center detector 183 that performs Step 2005. In Step 2005, the variables a and k are applied to find the center of gravity of the user's finger tip. First, the x-coordinate xx and y-coordinate yy of the gravity center are calculated as follows:

$$yy = \sum_{i=0}^{K} xsum[i](infostick[n] \cdot ystartti)/TH \qquad (I)$$

$$xx = \sum_{i=0}^{K} xpsum[i]/TH \qquad (II)$$

$$xpsum[i] = \sum_{j=infostick[n] \cdot xstart[i]}^{infostick[n] \cdot xend[i]} j \cdot P(j \, infostick[n] \cdot ystartti)$$

As may be seen from the equation (II), the x-coordinate xx is obtained, first by multiplying the all large-value pixels in the second to k-th rows by the x-coordinates of these pixels, respectively, and then by dividing the sum of the resultant products by the threshold pixel value TH. Similarly, the y-coordinate yy is obtained, first by multiplying the all large-value pixels in the second to k-th rows by the y-coordinates of these pixels, respectively, and then by dividing the sum of the resultant products by the threshold pixel value TH. Here, xsum[i], which are known values, are multiplied by y-coordinates (infoStick[n] ystart+i), respectively, and the resultant products are divided by the threshold pixel value TH, thereby calculating the y-coordinate yy of the gravity center of the user's finger tip. (The value xsum[k] is, of course, calculated from the corrected pixel values.) The value xpsum[i] is the sum of the products obtained by multiplying the large-value pixels in the i-th row by their x-coordinates, respectively. Thus, the x-coordinate xx of the gravity center of the finger tip, is obtained by the use of equation (II).

As can be understood from the above, the data input device according to the first embodiment of the invention enables the user to move the cursor on the display screen of a portable data-processing apparatus such as a notebook computer or a PDA, merely by extending his finger toward the display screen and moving it.

The second embodiment of the invention, which is a data input device, too, will be described. This device is basically identical to the first embodiment, but is designed to be manufactured at lower cost and in smaller size than the first embodiment. The second embodiment has an IC containing a light sensor, an analog switch, an analog signal processing section and an A/D converter. The IC will be described in detail.

Figure 53:
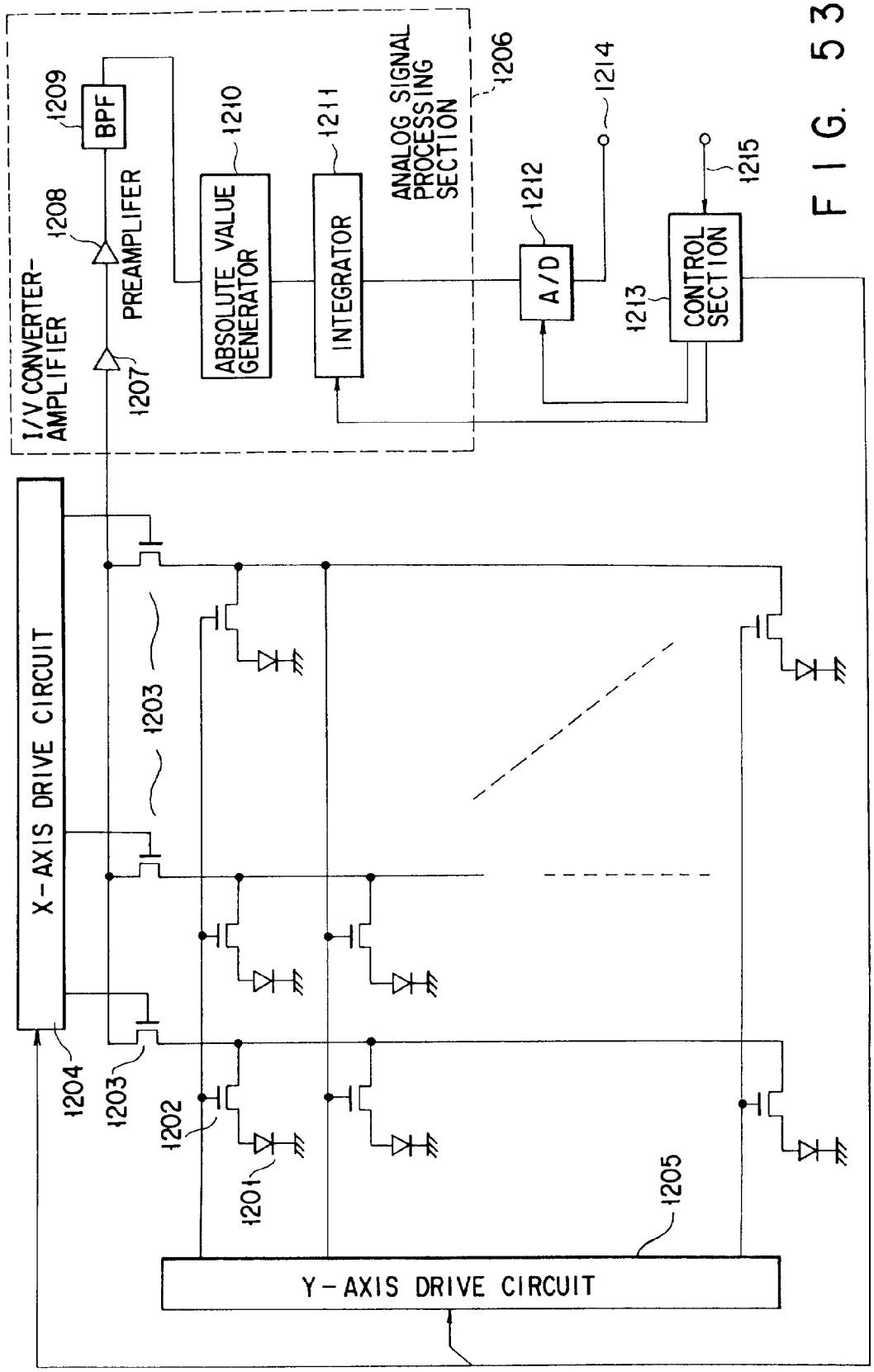
FIG. 53 is a circuit diagram of the integrated circuit (IC) incorporated in a data input apparatus according to a second embodiment of the invention.

To be more specific, the IC includes a light sensor, analog switches, an analog signal processing section 1206, an A/D converter 1212, and a control section 1213, as illustrated in FIG. 53. The light sensor comprises a plurality of light-receiving elements, switching MOS transistors 1203, an x-axis drive circuit 1204 and a y-axis drive circuit 1205.

The light-receiving elements are arranged in rows and columns, each consisting of a photodiode 1201 and a switching MOS transistor 1202. In each light-receiving element, the photodiode 1201 receives light and converts it into a pixel current S, and the switching MOS transistor 1202 outputs this pixel current S. The pixel currents S generated by the light-receiving elements forming one column are supplied to the analog signal processing section 1206 through one switching MOS transistor 1203.

The switching MOS transistors 1203 are controlled by the x-axis drive circuit 1204. The MOS transistors 1202 of the light-receiving elements forming one row are connected, at their gates, to the y-axis drive circuit 1205 and are controlled by this circuit 1205. The x-axis drive circuit 1204 turns on one of the column control lines, each connected to one switching MOS transistor 1203 and connecting the switching MOS transistors 1202 forming one column. On the other hand, the y-axis drive circuit 1205 turns on one of the row control lines, each connecting the switching MOS transistors 1202 forming one row. Hence, when the drive circuits 1204 and 1205 turn on a column control line and a row control line, the pixel current generated by one photodiode is supplied to the analog signal processing section 1206.

The analog signal processing section 1206 has an I/V converter-amplifier 1207, a preamplifier 1208, a band-pass filter 1209, an absolute value generator 1210, and an integrator 1211. These components 1206 to 1211 of the section 1206 are almost identical in function to their counterparts 174 to 178 of the section 173 used in the first embodiment (FIG. 42). The digital data generated by the A/D converter 1212 is output from an output terminal 1214. The control section 1213 receives a control signal 1215 from an external device and controls the drive circuits 1204 and 1205, the conversion timing in the A/D converter 1212, and the resetting (discharging) of the integrator 191.

As mentioned above, the light sensor, the processing section 1206, the A/D converter 1212 and the control section 1213 are packed within a single IC. The data input device can therefore not only be miniaturized but also have increased anti-noise properties. The IC may be used in combination with digital signal processing ICs (e.g., a CPU, a DSP, or a special-purpose LSI), and these processing ICs may be of the same type as the CPU of the portable computer (or a PDA) in which the data input device is to be incorporated. In this case, the data input device can be made still smaller at lower cost.

Figure 54:
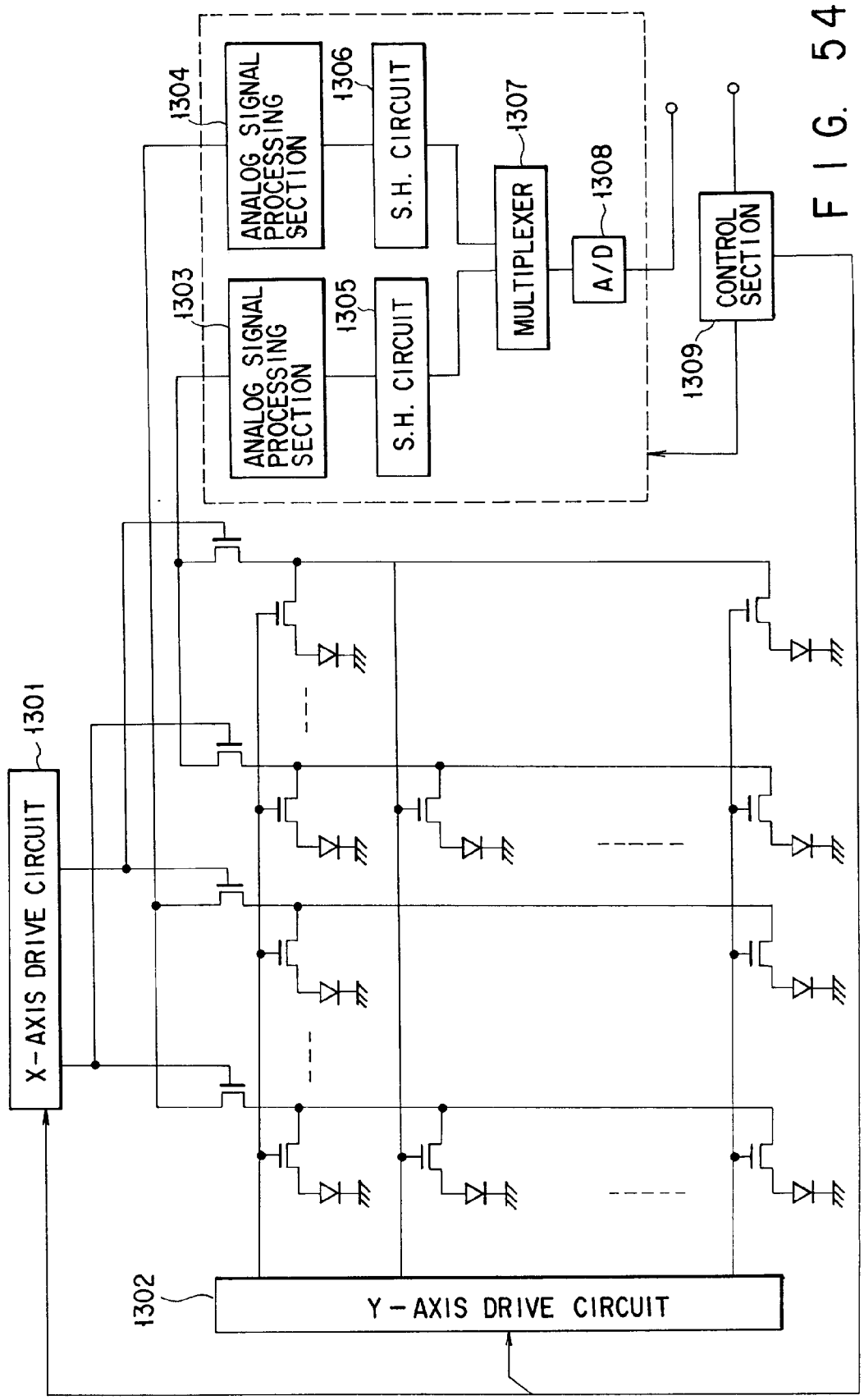
FIG. 54 is a circuit diagram of an IC which may be used in the second embodiment, in place of the IC of FIG. 53, for performing parallel processing of analog signals.

The IC shown in FIG. 53 may be replaced by an IC illustrated in FIG. 54, As is seen from FIG. 54, this IC is characterized in two respects. First, the light sensor has two arrays of light-receiving elements. Second, two analog signal sections 1303 and 1304 are used, one for processing the signals output from the first part of the light sensor, and the other for processing the signals output from the second part thereof. The sections 1303 and 1304 are identical to the analog signal processing section 1206 (FIG. 53), each comprising an I/V converter-amplifier, a preamplifier, a band-pass filter, an absolute value generator and an integrator. Each gate control signal output by an x-axis drive circuit 1301 controls two switching MOS transistors simultaneously, one provided for the first light-emitting element array and the other provided for the second light-emitting element array.

When the x-axis drive circuit 1301 and the y-axis drive circuit 1302 turn on one column control line and one row control line, respectively, the pixel current generated by one light-receiving element in the first array is supplied to the first analog signal processing section 1303, while the pixel current generated by one light-receiving element in the second array is supplied to the second analog signal processing section 1304.

As FIG. 54 shows, the IC further comprises two sample-and-hold circuits 1305 and 1306, a multiplexer 1307, an A/D converter 1308, and a control section 1309. The sample-and-hold circuits 1305 and 1306 latch the outputs of the analog signal processing sections 1303 and 1304, respectively. The signals output from the sample-and-hold circuits 1305 and 1306 are supplied to the multiplexer 1307. The output of the multiplexer 1307 is input to the A/D converter 1308. The A/C converter 1308 converts the input in time-dividing fashion, into digital data.

The control section 1309 controls not only the drive circuits 1301 and 1302, but also both sample-and-hold circuits 1305 and 1306 and the multiplexer 1307. Provided with two analog signal processing sections, the IC shown in FIG. 54 can perform parallel processing of analog signals. Hence, the IC consumes less power than otherwise. Furthermore, since the light sensor can output two pixel currents upon receipt of a single light beam, the light-emitting section (not shown) of the data input device needs only to emit light at half the frequency it should emit light otherwise. This means that the power which the device consumes to emit light is exactly half the power the first embodiment consumes for the same purpose.

In the IC shown in FIG. 54, the light sensor has two light-receiving elements arrays. Instead, the light sensor may have three or more light-receiving element arrays. The more element arrays, the more light-emitting power saved.

CCD area image sensors, each having an array of photodiodes, like the light sensor, are more common. A CCD area image sensor cannot be used in the second embodiment in place of the light sensor. This is because the CCD area image sensor accumulates electric charges for a certain time and outputs these charges sequentially at intervals of a thirtieth of a second, and cannot detect the modulated component of an input light beam as the light sensor. Used as means to detect the position of the user's finger, the light sensor need not have so many photodiodes arranged so densely or be driven at so high a speed, as in a CCD area image sensor. Therefore, the light sensor is advantageous for a CCD area image sensor in terms of power consumption.

In the first embodiment, the digital data generated by the A/D converter 179 and representing a one-frame image are processed to extract some of the adjacent pixels defining an image of the finger tip and then to determine the gravity center of the finger tip. In the second embodiment, the center of gravity of the user's finger tip is detected in a different method. More precisely, the digital data is processed to determine how the finger tip moves in a plane parallel to the display screen of the apparatus in which the device is incorporated. The digital data is processed also to determine whether the user moves his finger tip toward or away from the display screen. In other words, the second embodiment has a digital signal processing section which can generate three-dimensional position data.

For examples the device can generate a click signal upon determining that the user moves his finger a little toward the display screen as if to push a fake button displayed on the screen and then a little away from the screen as if to release the finger from the button. Thus, the data input device enables the user to select any desired menu item, merely by moving the finger to move the cursor to the menu item and then moving the finger a little toward and away from the screen as if to touch the menu item.

Although the second embodiment cannot input data representing the distance between the finger tip and the display screen of the apparatus, it can detect whether the finger tip has moved toward or away from the display screen. Hence, it can input three-dimensional position data to the apparatus, if it receives signals fed back from the display of the apparatus.

Figure 55A:
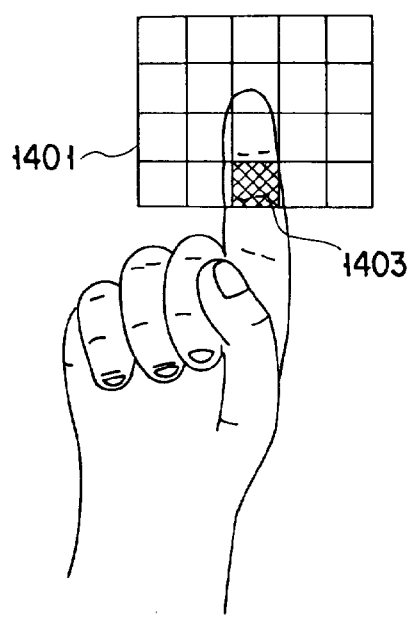
FIGS. 55A and 55B illustrate a diagram explaining how the image changes when the user's finger is moved a little toward or away from the display screen of the apparatus incorporating the second embodiment.
Figure 55B:
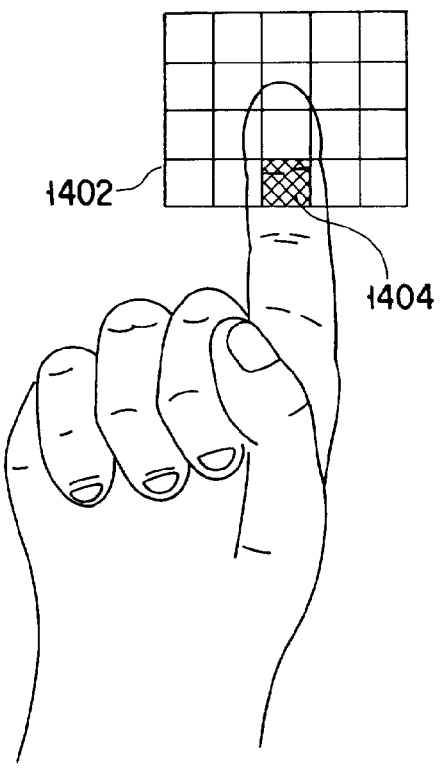

As has been indicated, the light intensity any photodiode of the light sensor detects is inversely proportional to the fourth power of the distance between the photodiode and the finger tip which has reflected the light to the photodiode. Therefore, the output current of any photodiode receiving the light reflected from the finger tip increases rapidly as the user moves the finger toward the display screen and rapidly decreases as he moves the finger away from the screen. Moreover, as shown in FIGS. 55A and 55B, the image of the finger tip becomes larger as the user moves the finger toward the screen, from the position in FIG. 55A to the position in FIG. 55B. As a result, the light sensor generates more pixel current. The opposite is true. The sensor generates less pixel current as the user moves the finger away from the screens from the position in FIG. 55B to the position in FIG. 55A.

That is, the image of the finger tip covers only about 1.1 pixels in the third horizontal line 1401 when the finger tip is at the position in FIG. 55A, and covers about 1.5 pixels in the third horizontal line 1402 when the user moves the finger tip toward the screen, from the position in FIG. 55A to the position in FIG. 55B. In addition, the pixel current the photodiode located at position 1404 generates when the finger tip is at the position in FIG. 55B is about 1.5 times as much as the current the same photodiode (located at position 1403) generates when the finger tip is at the position in FIG. 55A, assuming that the user moves the finger tip about 1 cm toward the display screen. As illustrated in FIGS. 55A and 55B, the sum of the values of pixels forming one horizontal line of the one-frame image is proportional to the distance between the user's finger tip and the display screen.

Figure 56:
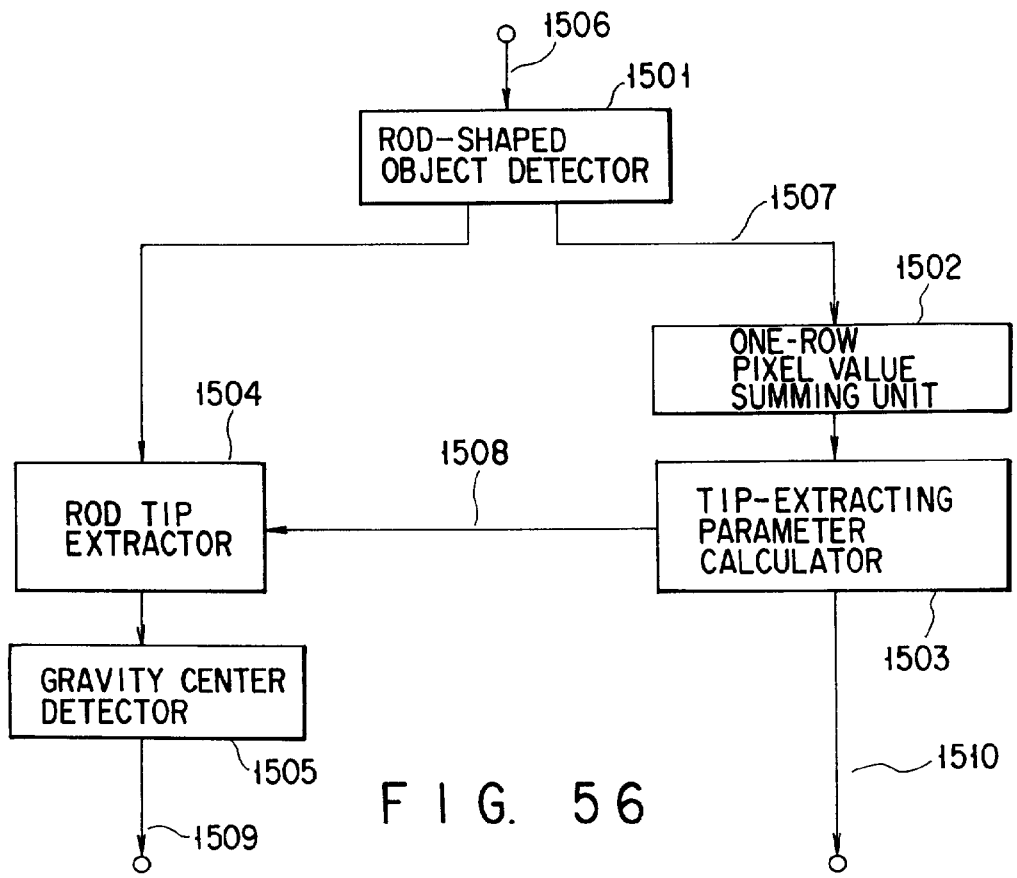
FIG. 56 is a block diagram showing the digital signal processing section incorporated in the second embodiment.

The digital signal processing section incorporated in the second embodiment will be described in detail, with reference to FIG. 56. As shown in FIG. 56, the digital signal processing section comprises a rod-shaped object detector 1501, a one-row pixel value summing unit 1502, a tip-extracting parameter calculator 1503, a rod tip extractor 1504, and a gravity center detector 1505.

In operation, the rod-shaped object detector 1501 detects the user's finger tip from the input one-frame image data, exactly in the same way as the rod-shaped object detector 181 used in the first embodiment. The detector 1501 generates image data 1507 representing the rod-shaped object. This image data 1507 is input to the one-row pixel value summing unit 1502. The calculator 1502 adds the values of all pixels forming each horizontal row of the image and outputs the data representing the sum of the pixel values. The output data of the summing unit 1502 is supplied to the tip-extracting parameter calculator 1503.

The tip-extracting parameter calculator 1503 obtains a threshold pixel value TH 1508, which is supplied to the rod tip extractor 1504. The extractor 1504 uses the value TH, extracting some adjacent pixels including those pixels defining the image of the finger tip. The values of the pixels thus extracted are input to the gravity center detector 1505. The detector 1505 operates in the same way as the gravity center detector 183 incorporated in the first embodiment, generating gravity center data 1509. The gravity center data 1509 and the threshold pixel value 1510 are output from the digital signal processing section.

This digital signal processing section is advantageous not only in that it provides a signal whose magnitude is proportional to the distance between the user's finger tip and the display screen of the apparatus. Further, since the threshold pixel value TH is fixed, the nearer the finger tip to the screen, the greater the sum of the values of pixels forming one horizontal line of the one-frame image and, hence, the less the sum of the values of the pixels forming a vertical line. To maintain a high pointing accuracy, it is desired that the total value of the pixels forming a vertical line be approximately equal to the total values of pixels forming a horizontal line.

Therefore, the threshold pixel value TH should be such that the total value of the pixels forming a vertical line becomes almost the same as the total values of pixels forming a horizontal line.

The digital signal processing section may be designed to generate a clicking signal only. If this is the case, a detector for detecting a clicking motion is connected to the output of the tip-extracting parameter calculator 1503. This detector monitors the threshold pixel value TH and generates a click signal upon detecting that the user moves his finger as if to push a button.

A data input device according to the third embodiment of the present invention will be described, with reference to FIG. 58. The third embodiment is designed to detect various motions of a user's finger tip and generate various commands in accordance with the motions detected. For example, the user first moves his finger, moving the cursor to an icon displayed on the display screen. He then moves the finger as if to draw a tick, thus executing the command related to the icon selected. Alternatively, he may then move the finger as if drawing a circle, encircling an object displayed on the screen, whereby the object encircled is selected.

Figure 58:
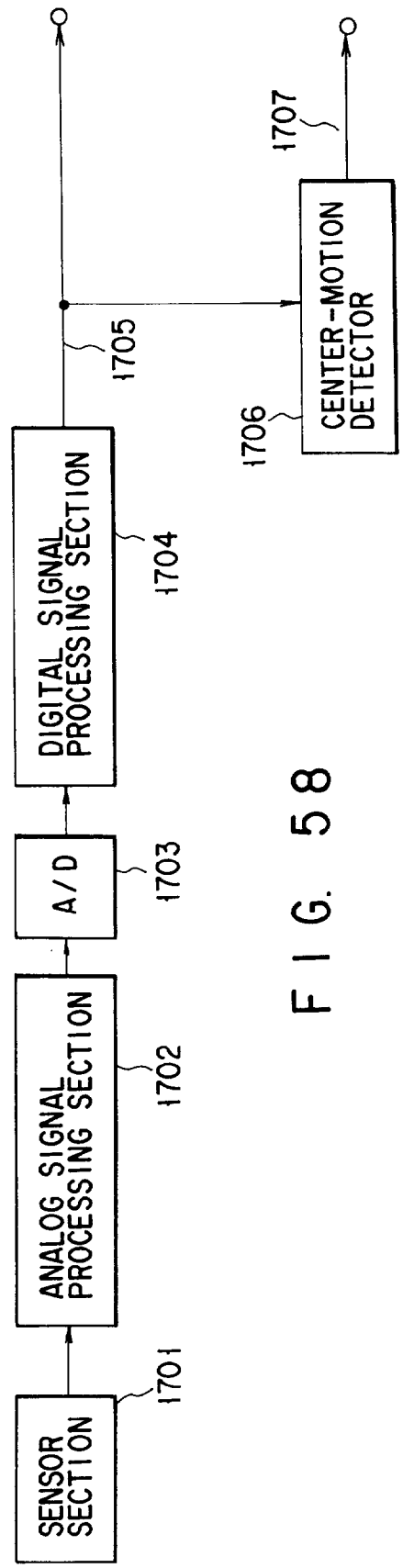
FIG. 58 is a block diagram showing a data input apparatus according to a third embodiment of the invention, which can convert the motion of a user's finger tip into a command.

As shown in FIG. 58, the third embodiment comprises a sensor section 1701, an analog signal processing section 1702, an A/D converter 1703, a digital signal processing section 1704, and a center-motion detecting section 1706. The sensor section 1701 is equivalent to a combination of the photodetector array 171 and the analog switch 172, both used in the first embodiment (FIG. 42). The analog signal processing section 1702, the A/D converter 1703 and the digital signal processing section 1704 are identical in function with their counterparts shown in FIG. 42. The section 1704 generates gravity center data 1705. The center-motion detecting section 1706 monitors the motion of the gravity center of the user's finger tip. It outputs a signal when the motion of the gravity center is found to be the same as a reference motion registered.

A data input device according to the fourth embodiment of this invention will be described, with reference to FIG. 57. The fourth embodiment has a push button 1606. When a user moves his finger, pointing a desired menu item displayed on the display screen of the computer (not shown) incorporating the data input device, the cursor moves to the desired item. Seeing the cursor displayed at the item, the user pushes the push button 1606. The menu item is thereby selected. The user may further move the finger while depressing the button 1606. Then, an icon is dragged in the same way as in the case the user drags the icon by operating a mouse.

Figure 57:
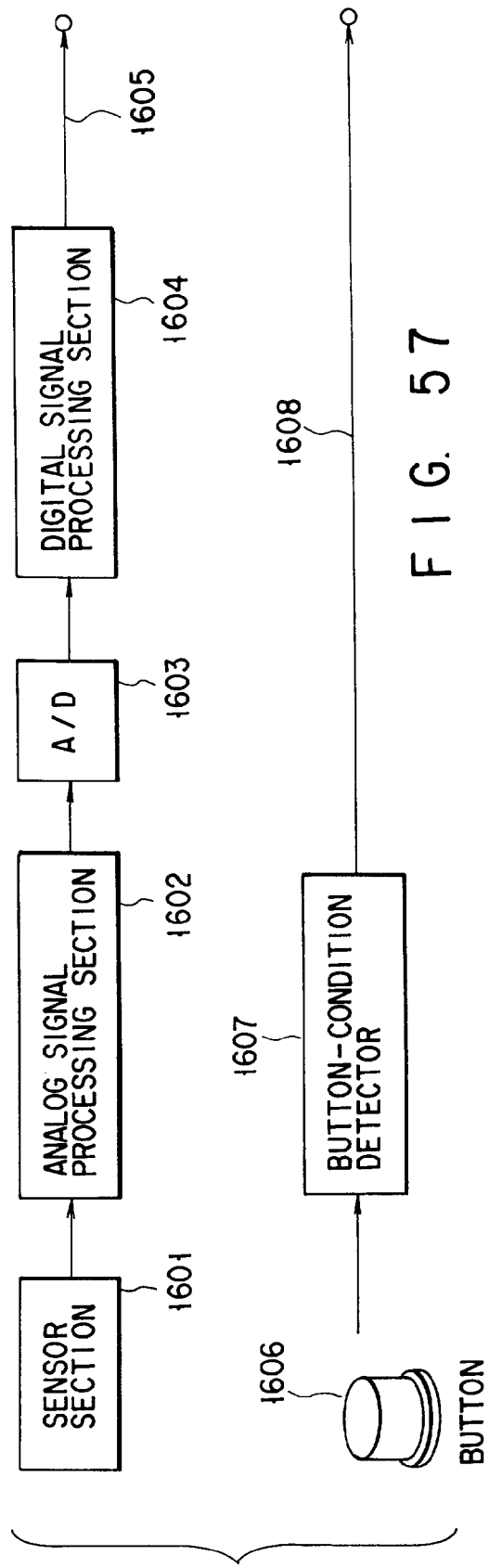
FIG. 57 is a block diagram showing a data input apparatus according to a fourth embodiment, which determines the relation between a push button and the gravity center of a user's finger tip.

As illustrated in FIG. 57, the fourth embodiment comprises, a sensor section 1601, an analog signal processing section 1602, an A/D converter 1603, a digital signal processing section 1604, and a button-condition detector 1607—in addition to the push button 1606. The sensor section 1601 is a combination of the photodetector array 171 and the analog switch 172, both used in the first embodiment (FIG. 42). The analog signal processing section 1602, the A/D converter 1603 and the digital signal processing section 1604 are identical in function with their counterparts shown in FIG. 42. The section 1604 generates gravity center data 1605, which is input to the computer. The fourth embodiment further comprises a light-emitting section (not shown). The push button 1606 is located so that the user may push it by one hand while pointing the display screen by the other hand. The button-condition detector 1607 detects whether the button 1606 has been pushed or remains in the depressed condition, and outputs a signal 1608 indicating the condition the button 1606 takes. The signal 1608 is input to the computer.

The computer processes the gravity center data 1605 and the signal 1608, both input from the data input device, whereby the cursor is moved on the display screen, a command identified by the menu item selected is executed, and the menu item selected is dragged. Since the device has a push button, it can generate a click signal more quickly than in the case the user moves his finger toward the display screen as if to push a button displayed on the screen. By operating the button 1606, the user can more reliably select a desired menu item and drag the menu item.

The fourth embodiment is particularly advantageous when the user can use both hands to input data to the computer. When the user controls the cursor with the right hand, while wearing a watch-shaped PDA on the left wrist or while holding a small PDA in the left hand, it would be desirable to input a click signal by using the left hand. The push button 1606 may be replaced by one of the operating elements on the keyboard of the computer, in the case where the computer is a book-type portable one.

If the button 1606 is replaced by, for example, the space bar, the device outputs a click signal when the user depresses the space bar after moving the finger, moving the cursor to the a desired menu item, or drags the menu item when the user further moves the finger while depressing the space bar.

The fourth embodiment may be modified such that it operates only while the user keeps depressing the push button 1606. In other words, the user moves his fingers while depressing the button 1606, thereby moving the cursor on the display screen. Thus, the cursor is not moved at all even if the user moves his finger unconsciously in front of the display screen. To enable the user to input data to the computer by moving a finger as little as possible, the device may be modified to input data only when the user moves his finger at or near the home position on the keyboard. In the fourth embodiment, the light-emitting section emits light only when the push bottom 1606 is depressed. Thus, the fourth embodiment consumes less power than otherwise.

Two types of PDAs, each incorporating the data input device according to the third embodiment, will be described with reference to FIGS. 59 and 64.

FIG. 59 shows a hand-held PDA which incorporates the third embodiment. The PDA only needs to have a small window 1801 though which light can be applied to the light-receiving section of the data input device. When a user moves a finger 1803 in front of the window 1801, the cursor 1804 is moved in the same way as the user moves the finger. Since the window 1801 is small, the display screen 1802 can occupy a greater part of the front of the hand-held PDA.

FIG. 64 shows a watch-type PDA which incorporates the third embodiment. The cursor 2402 is moved on the display screen as a user moves his finger in front of the windows 2403 and 2404 exposing the light-emitting and -receiving sections of the data input device, respectively. Since this PDA is too small to have a space for holding a pen, the data input device is especially desirable. Since both windows 2403 and 2404 are located below the display screen of the PDA, his finger tip remains does not conceal the display screen as long as the user is pointing any item displayed on the screen. Hence, the user can see well anything displayed on the screen.

What is claimed is:

1. A data input apparatus comprising:

distance image input means for inputting a distance image representing a distribution of distances measured between the apparatus and a plurality of conceivable points existing on an object;

point determining means for determining a designating point in the distance image input by said distance image input means, wherein said designating point is one of the plurality of conceivable points on the object which has least distance value; and system control means for controlling a system in accordance with motion of the designating point determined by said point determining means.

2. A data input apparatus according to claim 1, wherein said distance image input means comprises:

light-emitting means comprising an array of light-emitting elements;

light emission control means for controlling said array of light-emitting elements such that light beams are emitted, one after another, from the light-emitting elements to an object;

light-detecting means for detecting a position which each light beam reflected from the object assumes;

distance calculating means for calculating a distance between the apparatus and the object from the position of the light beam detected by said light-detecting means and a position of the light-emitting element which has emitted the light beam; and minimum point detecting means for detecting a plurality of minimum points in the distance image input by said distance image input means, wherein said plurality minimum points is a group of the plurality of conceivable points on the object which has smaller distance values than other ones of the plurality of conceivable points.

3. A data input apparatus according to claim 2, wherein said distance calculating means includes means for preventing the outputs of said light detecting means from being used, when a difference between the outputs of said light detecting means falls outside a predetermined range.

4. A data input apparatus according to claim 1, wherein said system control means comprises:

cursor controlling means for displaying and controlling a cursor at a position on a display screen, which corresponds to the designating point determined by said point determining means;

conversion means for converting a locus of the cursor moving on the display screen into a command for controlling the system; and command executing means for executing the command generated by said conversion means.

5. A data input apparatus according to claim 1, further comprising filter means for filtering coordinate values or distance value, or both, of the designating point determined by said point determining means.

6. A data input apparatus according to claim 1, further comprising:

point-halting time detecting means for detecting a time for which the designating point determined by said point determining means remains within a predetermined region;

point-menu correspondence detecting means for associating a position of the designating point with any one of menu items displayed on a display screen; and command executing means for executing the menu item detected by said point-menu correspondence detecting means, when an output of said point-halting time detecting means satisfies specific conditions.

7. A data input apparatus comprising:

distance image generating means for generating a distance image, representing a distribution of distances measured between the apparatus and a plurality of conceivable points existing on an object, from an output which a light-receiving means generates while a light-emitting means is emitting a light beam and from an output which said light-receiving means generates while said light-emitting means is emitting no light beam;

minimum point detecting means for detecting a plurality of minimum points in the distance image generated by said distance image generating means, wherein said plurality of minimum points is a group of the plurality of conceivable points on the object which has smaller distance values than other ones of the plurality of conceivable points;

point determining means for determining at least one designating point for designating a command to a system in accordance with a specific rule, wherein said at least one designating point is at least one of the plurality of minimum points detected by said minimum point detecting means; and system control means for controlling the system in accordance with motion of said at least one designating point determined by said point determining means.

8. The data input apparatus according to claim 7, further comprising:

time difference detecting means for detecting time differences, each representing a change which each point in the distance image assumes as time passes, wherein said point determining means includes means for determining a designating point for designating a command to the system, said designating point being one of the plurality of minimum points which has changed in the time differences detected by said time difference detecting means.

9. The data input apparatus according to claim 8, wherein said system control means comprises:

cursor controlling means for displaying and controlling a cursor at a position on a display screen, which corresponds to the designating point determined by said point determining means;

conversion means for converting a locus of the cursor moving on the display screen into a command for controlling the systems; and command executing means for executing the command generated by said conversion means.

10. The data input apparatus according to claim 7, further comprising:

time difference detecting means for detecting time differences, each representing a change which each point in the distance image assumes as time passes, wherein said point determining means includes means for determining a designating point for designating a command to the system, said designating point being one of the plurality of minimum points which has least time difference falling within a predetermined range.

11. A data input apparatus according to claim 10, wherein said system control means comprises:

cursor controlling means for displaying and controlling a cursor at a position on a display screen, which corresponds to the designating point determined by said point determining means;

conversion means for converting a locus of the cursor moving on the display screen into a command for controlling the system; and command executing means for executing the command generated by said conversion means.

12. A data input apparatus according to claim 7, wherein said distance image generating means comprises:

light-emitting means comprising an array of light-emitting elements;

light emission control means for controlling said light-emitting elements such that light beams are emitted, one after another, from the light-emitting elements to the object;

light-detecting means for detecting a position which each light beam reflected from the object assumes; and distance calculating means for calculating a distance between the apparatus and the object from the position of the light beam detected by said light-detecting means and a position of the light-emitting element which has emitted the light beam.

13. The data input apparatus according to claim 7, wherein said minimum point detecting means comprises:

means for detecting motion of each one of said plurality of minimum points; and means for selecting at least one of the minimum points in accordance with an output of said means for detectings aid motion of said each one of said plurality of minimum points.

14. The data input apparatus according to claim 7, wherein said minimum point detecting means comprises:

means for analyzing entities existing near each one of said plurality of minimum points; and means for selecting at least one of the plurality of minimum points in accordance with an output of said means for analyzing entities existing near each one of said plurality of minimum points.

15. A data input apparatus according to claim 7, further comprising filter means for filtering at least one of coordinate values and a distance value of the designating point designated by said point designating means.

16. A data input apparatus according to claim 7, further comprising:

point-halting time detecting means for detecting a time for which the designating point determined by said point determining means remains within a predetermined region;

point-menu correspondence detecting means for associating a position of the designating point with any one of menu items displayed on a display screen; and command executing means for executing the menu item detected by said point-menu correspondence detecting means, when an output of said point-halting time detecting means satisfies specific conditions.

17. A data input apparatus according to claim 7, further comprising:

first point-motion detecting means for detecting one of the plurality of minimum points which corresponds to a finger tip; and second point-motion detecting means for detecting movement of the finger tip to select a menu item.

18. A data input apparatus, comprising:

light emitting means for emitting a light;

means for obtaining as an image a magnitude of a reflected light obtained by the light emitted by the light emitting means being reflected by an object;

extraction means for extracting geometrical data of the object by processing the obtained image; and system control means for controlling an operation of a system to be operated by using the geometrical data.

19. The data input apparatus according to claim 18, wherein said means for obtaining comprises a photodetector array.

20. The data input apparatus according to claim 18, further comprising:
  light-receiving means for receiving a modulated light beam reflected by an object;
  extracting means for extracting a modulated component of the light beam received by said light-receiving means; and
  measuring means for measuring a magnitude of the modulated component extracted by said extracting means.

21. The data input apparatus according to claim 18, further comprising:
  light-receiving means for receiving a light beam reflected by an object;
  extracting means for extracting a component of the light beam received by said light-receiving means;
  measuring means for measuring a magnitude of the component, which has been extracted by said extracting means;
  image generating means for generating an image of the object from the magnitude of the component, which has been measured by said measuring means;
  correcting means for correcting a plurality of values of a plurality of pixels to cause a sum of the plurality of values to meet a predetermined condition, wherein said plurality of pixels defines a part of the image generated by said image generating means, which is a tip of a rod-shaped object; and
  gravity center detecting means for detecting a center of gravity of the tip of the rod-shaped object, from the values of the plurality of pixels, which have been corrected by said correcting means.

22. An image processing method comprising the steps of:
  correcting a plurality of values of a plurality of pixels to cause a sum of the plurality of values to meet a predetermined condition, wherein said plurality of pixels defines a part of an image of a rod-shaped object;
  detecting a center of gravity of a tip of the rod-shaped object, from the corrected values of the plurality pixels; and
  calculating a position of the tip of the rod-shaped object, from the center of gravity detected.

23. An article of manufacture comprising a computer usable medium having computer readable program code means embodied therein for causing information to be input, the computer readable program code means in said article of manufacture comprising:
  computer readable program code means for correcting a plurality of values of a plurality of pixels to cause a sum of the plurality of values to meet a predetermined condition, wherein said plurality of pixels defines a part of an image of a rod-shaped object;
  computer readable program code means for detecting a center of gravity of the tip of the rod-shaped object, from the corrected plurality values of the pixels; and
  computer readable program code means for calculating a position of the tip of the rod-shaped object, from the center of gravity detected.

24. A data input method, comprising the computer steps of:
  a) inputting a distance image;
  b) obtaining a minimum point having a shortest distance value among the input distance images;
  c) controlling a system to be operated by using the obtained minimum point.

25. A data input method, comprising the computer steps of:
  a) inputting a distance image representing a distribution of distances measured between an apparatus and a plurality of conceivable points existing on an object;
  b) determining a designating point in the input distance image, wherein said designating point is one of the plurality of conceivable points on the object which has least distance value; and
  c) controlling a system in accordance with motion of the determined designating point.

26. A data input method, comprising the computer steps of:
  a) inputting a distance image representing a distribution of distances measured between an apparatus and a plurality of conceivable point existing on an object;
  b) detecting a plurality of minimum points in the input distance image, wherein said plurality of minimum points is a group of the plurality of conceivable points on the object which has smaller distance values than the other ones of the plurality of conceivable points;
  c) detecting time differences, each one of the time differences representing a change which each point in the distance image assumes as time passes;
  d) determining a designating point for designating a command to a system, wherein said designating point is one of the plurality minimum points which has changed in the detected time differences; and
  e) controlling the system in accordance with motion of the determined designating point.

27. A data input method, comprising the computer steps of:
  a) inputting a distance image representing a distribution of distances measured between an apparatus and a plurality of conceivable points existing on an object;
  b) detecting a plurality of minimum points in the input distance image, wherein said plurality of minimum points is a group of the plurality conceivable points on the object which has smaller distance values than other ones of the plurality of conceivable points;
  c) detecting time differences, each one of the time differences representing a change which each point in the distance image assumes as time passes;
  d) determining a designating point for designating a command to a system, wherein said designating point is one of the plurality of minimum points which has least time difference falling within a predetermined range; and
  e) controlling the system in accordance with motion of the determined designating point.

28. A data input method, comprising the computer steps of:
  a) generating a distance image, representing a distribution of distances measured between the apparatus and a plurality of conceivable points existing on an object, from an output which a light-receiving means generates while a light-emitting means is emitting a light beam and from an output which said light-receiving means generates while said light-emitting means is emitting no light beam;
  b) detecting a plurality of minimum points in the generated distance image, wherein said plurality of minimum points is a group of a plurality of conceivable points on an object which has smaller distance values than other ones of the plurality of conceivable points;

c) determining at least one designating point for designating a command to a system in accordance with a specific rule, wherein said at least one designating point is at least one of the detected plurality of minimum points; and d) controlling the system in accordance with motion of said at least one designating point determined.

29. A computer data input method, comprising the steps of:

a) emitting a light;

b) obtaining as an image a magnitude of a reflected light obtained by the light emitted by a light emitting means being reflected by an object;

c) extracting geometrical data of the object by processing the obtained image; and d) controlling an operation of a system to be operated by using the geometrical data.

30. An article of manufacture comprising a computer usable medium having computer readable program code means embodied therein for causing information to be input, the computer readable program code means in said article of manufacture, comprising:

computer readable program code means for inputting a distance image which is a distribution between an object and a distance;

computer readable program code means for obtaining a minimum point whose distance is minimum among input distance images; and computer readable program code means for controlling a system by using the obtained minimum point.

31. An article of manufacture comprising a computer usable medium having computer readable program code means embodied therein for causing information to be input, the computer readable program code means in said article of manufacture comprising:

computer readable program code means for inputting a distance image which is a distribution between an object and a distance;

computer readable program code means for determining, among input distance images, a point having minimum distance value as an instructing point for instructing a system to be operated; and computer readable program code means for controlling an operation of the system to be operated based on movement of the determined instructing point.

32. An article of manufacture comprising a computer usable medium having computer readable program code means embodied therein for causing information to be input, the computer readable program code means in said article of manufacture, comprising:

computer readable program code means for inputting a distance image which is a distribution between an object and a distance;

computer readable program code means for obtaining a minimum point whose distance value is locally minimum among input distance images;

computer readable program code means for detecting time difference which is a variable amount of the distance value corresponding to a time of the input distance image;

computer readable program code means for determining among a plurality of detected minimum points, one minimum point in which the detected time difference is varied as an instructing point for instructing a system to be operated; and computer readable program code means for controlling an operation of the system to be operated based on the operation of the determined instructing point.

33. An article of manufacture comprising a computer usable medium having computer readable program code means embodied therein for causing information to be input, the computer readable program code means in said article of manufacture comprising:

computer readable program code means for inputting a distance image which is a distribution between an object and a distance;

computer readable program code means for obtaining a minimum point whose distance value is locally minimum among input distance images;

computer readable program code means for detecting time difference which is a variable amount of the distance value corresponding to a time of the input distance image;

computer readable program code means for determining, among plurality of detected minimum points, one minimum point in which the time difference of the distance has a certain range of values and which has a minimum value, as an instructing point for instructing a system to be operated; and computer readable program code means for controlling an operation of the system to be operated based on the operation of the determined instructing point.

* * * * *